United States Patent
Hammond

(10) Patent No.: US 10,917,444 B1
(45) Date of Patent: Feb. 9, 2021

(54) METHOD AND SYSTEM FOR ENABLING A COMMUNICATION DEVICE TO REMOTELY EXECUTE AN APPLICATION

(71) Applicant: Hammond Development International, Inc., Dallas, TX (US)

(72) Inventor: Daniel D. Hammond, Dallas, TX (US)

(73) Assignee: Hammond Development International, Inc., Dallas, TX (US)

(*) Notice: Subject to any disclaimer, the term of this patent is extended or adjusted under 35 U.S.C. 154(b) by 0 days.

(21) Appl. No.: 16/912,280

(22) Filed: Jun. 25, 2020

Related U.S. Application Data

(63) Continuation of application No. 16/389,170, filed on Apr. 19, 2019, now Pat. No. 10,749,914, which is a
(Continued)

(51) Int. Cl.
*H04L 29/06* (2006.01)
*G06F 16/951* (2019.01)
(Continued)

(52) U.S. Cl.
CPC .......... *H04L 65/1069* (2013.01); *G06F 16/22* (2019.01); *G06F 16/245* (2019.01);
(Continued)

(58) Field of Classification Search
CPC ............ H04L 63/0272; H04L 63/0281; H04M 2203/105
See application file for complete search history.

(56) References Cited

U.S. PATENT DOCUMENTS 3,278,685 A 10/1966 Harper
4,425,099 A 1/1984 Naden
(Continued)

FOREIGN PATENT DOCUMENTS

EP 1 074 017 B1 3/2002
EP 1 363 187 A1 5/2002
(Continued)

OTHER PUBLICATIONS

USPTO File History of U.S. Appl. No. 11/779,722 for "Method and System for Enabling a Communication Device to Remotely Execute an Application," filed in *Google LLC* v. *Hammond Development International, Inc.*; U.S. Pat No. 9,264,483, Case No. IPR2020-00020, filed Oct. 11, 2019, 269 pages.
Declaration of Leonard Forys, PH.D., filed in *Google LLC* v. *Hammond Development International, Inc.*; U.S. Pat. No. 9,264,483, Case No. IPR2020-00020, filed Oct. 11, 2019, 116 pages.
The Forys Consulting Group, Inc., "Curriculum Vitae—Dr. Leonard J. Forys," filed in *Google LLC* v. *Hammond Development International, Inc.*; U.S. Pat. No. 9,264,483, Case No. IPR2020-00020, filed Oct. 11, 2019, 12 pages.
(Continued)

*Primary Examiner* — Joshua L Schwartz
(74) *Attorney, Agent, or Firm* — Fogarty LLP

(57) ABSTRACT

A communication system capable of enabling one or more communication devices to remotely execute one or more applications includes one or more communication devices that are coupled to a data connection. At least one of the one or more communication devices is operable to communicate a request to establish a communication session over the data connection. The system also includes one or more application servers that are coupled to the data connection. At least one of the one or more application servers is adapted to execute an application to establish the requested communication session with the at least one communication device. The at least one application server resides at a location remote from the at least one communication device. The at least one application server communicates a request for processing service to the at least one communication device. The request for processing service is communicated to the at least one communication device over the data connection.

28 Claims, 3 Drawing Sheets

Related U.S. Application Data continuation of application No. 16/193,532, filed on Nov. 16, 2018, now Pat. No. 10,270,816, application No. 16/912,280, which is a continuation of application No. 16/193,532, filed on Nov. 16, 2018, now Pat. No. 10,270,816, which is a continuation of application No. 15/613,756, filed on Jun. 5, 2017, now Pat. No. 10,193,935, which is a continuation of application No. 15/236,644, filed on Aug. 15, 2016, now Pat. No. 9,705,937, which is a continuation of application No. 14/975,747, filed on Dec. 19, 2015, now Pat. No. 9,420,011, which is a continuation of application No. 11/779,722, filed on Jul. 18, 2007, now Pat. No. 9,264,483.

(51) Int. Cl.
*G06F 16/25* (2019.01)
*G06F 16/245* (2019.01)
*G06F 16/22* (2019.01)
*H04W 4/60* (2018.01)
*H04L 29/08* (2006.01)
*H04M 11/00* (2006.01)

(52) U.S. Cl.
CPC .......... *G06F 16/252* (2019.01); *G06F 16/951* (2019.01); *H04L 67/02* (2013.01); *H04L 67/10* (2013.01); *H04L 67/1097* (2013.01); *H04L 67/141* (2013.01); *H04L 67/18* (2013.01); *H04L 67/42* (2013.01); *H04M 11/007* (2013.01); *H04W 4/60* (2018.02); *H04M 2203/1016* (2013.01)

(56) References Cited

U.S. PATENT DOCUMENTS

| | | |
|---|---|---|
| 4,783,803 A | 11/1988 | Baker et al. |
| 4,799,171 A | 1/1989 | Cummings |
| 5,253,341 A | 10/1993 | Rozmanith et al. |
| 5,442,749 A | 8/1995 | Northcutt et al. |
| 5,495,610 A | 2/1996 | Shing et al. |
| 5,546,538 A | 8/1996 | Cobbley et al. |
| 5,561,705 A | 10/1996 | Allard et al. |
| 5,642,515 A | 6/1997 | Jones et al. |
| 5,652,908 A | 7/1997 | Douglas et al. |
| 5,708,780 A | 1/1998 | Levergood et al. |
| 5,761,673 A | 6/1998 | Bookman et al. |
| 5,802,526 A | 9/1998 | Fawcett et al. |
| 5,835,724 A | 11/1998 | Smith |
| 5,845,077 A | 12/1998 | Fawcett |
| 5,848,273 A | 12/1998 | Fontana et al. |
| 5,859,972 A | 1/1999 | Subramaniam et al. |
| 5,860,012 A | 1/1999 | Luu |
| 5,862,329 A | 1/1999 | Aras et al. |
| 5,878,432 A | 3/1999 | Misheski et al. |
| 6,009,387 A | 12/1999 | Ramaswamy et al. |
| 6,049,671 A | 4/2000 | Slivka et al. |
| 6,135,646 A | 10/2000 | Kahn et al. |
| 6,157,944 A | 12/2000 | Pedersen |
| 6,163,878 A | 12/2000 | Kohl |
| 6,195,357 B1 | 2/2001 | Polcyn |
| 6,202,070 B1 | 3/2001 | Nguyen et al. |
| 6,269,336 B1 | 7/2001 | Ladd et al. |
| 6,269,337 B1 | 7/2001 | Desmond et al. |
| 6,301,590 B1 | 10/2001 | Siow et al. |
| 6,327,363 B1 | 12/2001 | Henderson et al. |
| 6,343,318 B1 | 1/2002 | Hawkins et al. |
| 6,360,279 B1 | 3/2002 | Woods et al. |
| 6,362,836 B1 | 3/2002 | Shaw et al. |
| 6,408,272 B1 | 6/2002 | White et al. |
| 6,418,199 B1 | 7/2002 | Perrone |
| 6,430,174 B1 | 8/2002 | Jennings et al. |
| 6,487,534 B1 | 11/2002 | Thelen et al. |
| 6,490,564 B1 | 12/2002 | Dodrill et al. |
| 6,507,817 B1 | 1/2003 | Wolfe et al. |
| 6,512,818 B1 | 1/2003 | Donovan et al. |
| 6,539,445 B1 | 3/2003 | Krum |
| 6,553,563 B2 | 4/2003 | Ambrose et al. |
| 6,556,997 B1 | 4/2003 | Levy |
| 6,598,067 B1 | 7/2003 | Wydra et al. |
| 6,643,690 B2 | 11/2003 | Duursma et al. |
| 6,671,259 B1 | 12/2003 | He et al. |
| 6,721,705 B2 | 4/2004 | Kurganov et al. |
| 6,753,884 B1 | 6/2004 | Finch, II et al. |
| 6,766,298 B1 | 7/2004 | Dodrill et al. |
| 6,807,574 B1 | 10/2004 | Partovi et al. |
| 6,854,009 B1 | 2/2005 | Hughes |
| 6,859,834 B1 | 2/2005 | Arora et al. |
| 6,862,689 B2 | 3/2005 | Bergsten et al. |
| 6,885,736 B2 | 4/2005 | Uppaluru |
| 6,922,411 B1 | 7/2005 | Taylor |
| 6,934,756 B2 | 8/2005 | Maes |
| 6,963,859 B2 | 11/2005 | Stefik et al. |
| 6,970,915 B1 | 11/2005 | Partovi et al. |
| 6,990,662 B2 | 1/2006 | Messer et al. |
| 7,016,348 B2 | 3/2006 | Laursen et al. |
| 7,024,364 B2 | 4/2006 | Guerra et al. |
| 7,028,306 B2 | 4/2006 | Boloker et al. |
| 7,054,637 B2 | 5/2006 | Weigand |
| 7,068,643 B1 | 6/2006 | Hammond |
| 7,072,328 B2 | 7/2006 | Shen et al. |
| 7,092,370 B2 | 8/2006 | Jiang et al. |
| 7,111,006 B2 | 9/2006 | Vange et al. |
| 7,111,060 B2 | 9/2006 | Araujo et al. |
| 7,137,126 B1 | 11/2006 | Coffman et al. |
| 7,139,930 B2 | 11/2006 | Mashayekhi et al. |
| 7,185,094 B2 | 2/2007 | Marquette et al. |
| 7,191,233 B2 | 3/2007 | Miller |
| 7,200,390 B1 | 4/2007 | Henager et al. |
| 7,216,351 B1 | 5/2007 | Maes |
| 7,219,136 B1 | 5/2007 | Danner et al. |
| 7,383,303 B1 | 6/2008 | Bort |
| 7,430,610 B2 | 9/2008 | Pace et al. |
| 7,469,293 B1 | 12/2008 | Yoakum et al. |
| 7,519,536 B2 | 4/2009 | Maes et al. |
| 7,552,054 B1 | 6/2009 | Stifelman et al. |
| 7,685,252 B1 | 3/2010 | Maes et al. |
| 7,685,253 B1 | 3/2010 | Valia |
| 7,730,157 B2 | 6/2010 | Baratto et al. |
| 7,870,535 B2 | 1/2011 | Rippert, Jr. et al. |
| 7,881,285 B1 | 2/2011 | Hammond |
| 7,889,852 B2 | 2/2011 | Whitehead |
| 7,912,966 B2 | 3/2011 | Witkowski et al. |
| 7,986,301 B2 | 7/2011 | Griffin et al. |
| 8,060,624 B1 | 11/2011 | McKinney et al. |
| 8,108,899 B2 | 1/2012 | Shoff et al. |
| 8,151,323 B2 | 4/2012 | Harris et al. |
| 8,265,932 B2 | 9/2012 | Dunsmuir |
| 8,272,045 B2 | 9/2012 | Azeez et al. |
| 8,346,818 B2 | 1/2013 | DeAnna et al. |
| 8,392,464 B2 | 3/2013 | Bloesch et al. |
| 8,402,115 B2 | 3/2013 | Franco et al. |
| 8,442,221 B2 | 5/2013 | Yoakum et al. |
| 8,495,724 B2 | 7/2013 | Devine et al. |
| 8,532,000 B2 | 9/2013 | Bolliero et al. |
| 8,613,048 B2 | 12/2013 | Braddy et al. |
| 8,694,322 B2 | 4/2014 | Snitkovskiy et al. |
| 8,719,375 B2 | 5/2014 | Hildreth et al. |
| 8,910,187 B2 | 12/2014 | Liang et al. |
| 9,015,297 B2 | 4/2015 | Putman et al. |
| 9,038,162 B2 | 5/2015 | Hagiu et al. |
| 9,049,272 B2 | 6/2015 | Saleskey et al. |
| 9,183,321 B2 | 11/2015 | Murthy |
| 9,264,483 B2 | 2/2016 | Hammond |
| 9,418,132 B2 | 8/2016 | Visalli et al. |
| 9,420,011 B2 | 8/2016 | Hammond |
| 9,456,040 B2 | 9/2016 | Hammond |
| 9,705,937 B2 | 7/2017 | Hammond |
| 9,716,732 B2 | 7/2017 | Hammond |
| 9,729,482 B2 | 8/2017 | Liang |
| 9,955,205 B2 | 4/2018 | Covell et al. |
| 10,193,935 B2 | 1/2019 | Hammond |

(56) References Cited

U.S. PATENT DOCUMENTS

| | | |
|---|---|---|
| 10,264,032 B1 | 4/2019 | Hammond |
| 10,270,816 B1 | 4/2019 | Hammond |
| 2001/0034771 A1 | 10/2001 | Hutsch et al. |
| 2001/0047406 A1 | 11/2001 | Araujo |
| 2002/0016814 A1 | 2/2002 | Convent et al. |
| 2002/0026495 A1 | 2/2002 | Arteaga |
| 2002/0046286 A1 | 4/2002 | Caldwell et al. |
| 2002/0073211 A1 | 6/2002 | Lin et al. |
| 2002/0091825 A1 | 7/2002 | Shuster |
| 2002/0095459 A1 | 7/2002 | Laux et al. |
| 2002/0103881 A1 | 8/2002 | Granade et al. |
| 2002/0107910 A1 | 8/2002 | Zhao |
| 2002/0120719 A1 | 8/2002 | Lee et al. |
| 2002/0130900 A1 | 9/2002 | Davis |
| 2002/0164000 A1 | 11/2002 | Cohen et al. |
| 2002/0174010 A1 | 11/2002 | Rice, III |
| 2003/0007609 A1 | 1/2003 | Yuen et al. |
| 2003/0041125 A1 | 2/2003 | Salomon |
| 2003/0060896 A9 | 3/2003 | Hulai et al. |
| 2003/0065715 A1 | 4/2003 | Burdick, Jr. et al. |
| 2003/0074393 A1 | 4/2003 | Peart |
| 2003/0078779 A1 | 4/2003 | Desai et al. |
| 2003/0105820 A1 | 6/2003 | Haims et al. |
| 2003/0143991 A1 | 7/2003 | Minear et al. |
| 2003/0149728 A1 | 8/2003 | Wewalaarachchi |
| 2003/0167316 A1 | 9/2003 | Bramnick et al. |
| 2003/0182463 A1 | 9/2003 | Valk |
| 2003/0182652 A1 | 9/2003 | Custodio |
| 2003/0192040 A1 | 10/2003 | Vaughan |
| 2003/0192041 A1 | 10/2003 | Mentze et al. |
| 2003/0202504 A1 | 10/2003 | Dhara et al. |
| 2003/0204562 A1 | 10/2003 | Hwang |
| 2003/0216923 A1 | 11/2003 | Gilmore et al. |
| 2004/0002326 A1 | 1/2004 | Maher |
| 2004/0080504 A1 | 4/2004 | Salesky et al. |
| 2004/0098368 A1 | 5/2004 | Sugawara et al. |
| 2004/0101122 A1 | 5/2004 | Da Palma et al. |
| 2004/0110504 A1 | 6/2004 | Kenagy et al. |
| 2004/0120479 A1 | 6/2004 | Creamer et al. |
| 2004/0122941 A1 | 6/2004 | Ohara et al. |
| 2005/0033582 A1 | 2/2005 | Gadd et al. |
| 2005/0070262 A1 | 3/2005 | Weigand |
| 2005/0108708 A1 | 5/2005 | Im |
| 2005/0135306 A1 | 6/2005 | McAllen et al. |
| 2005/0183143 A1 | 8/2005 | Anderholm et al. |
| 2005/0198493 A1 | 9/2005 | Bartas |
| 2005/0234727 A1* | 10/2005 | Chiu .............. H04M 3/4936 704/270.1 |
| 2005/0256923 A1 | 11/2005 | Adachi |
| 2005/0276391 A1 | 12/2005 | Ibbotson et al. |
| 2005/0278207 A1 | 12/2005 | Ronnewinkel |
| 2006/0020937 A1 | 1/2006 | Schaefer |
| 2006/0037071 A1* | 2/2006 | Rao .............. H04L 12/2856 726/13 |
| 2006/0043164 A1 | 3/2006 | Dowling et al. |
| 2006/0085562 A1 | 4/2006 | Blaho |
| 2006/0130124 A1 | 6/2006 | Richardson et al. |
| 2006/0165105 A1 | 7/2006 | Shenfield et al. |
| 2006/0182103 A1 | 8/2006 | Martini et al. |
| 2006/0256950 A1 | 11/2006 | Patel et al. |
| 2006/0271959 A1 | 11/2006 | Jacoby et al. |
| 2006/0282521 A1 | 12/2006 | Anderson et al. |
| 2007/0032247 A1 | 2/2007 | Shaffer et al. |
| 2007/0118534 A1 | 5/2007 | Hayes et al. |
| 2007/0135096 A1 | 6/2007 | Sampath |
| 2007/0156765 A1 | 7/2007 | Hubbard et al. |
| 2007/0168352 A1 | 7/2007 | Satyanarayana |
| 2007/0220009 A1 | 9/2007 | Morris et al. |
| 2008/0040441 A1 | 2/2008 | Maes |
| 2008/0071544 A1 | 3/2008 | Beaufays et al. |
| 2008/0075049 A1 | 3/2008 | Xie |
| 2008/0148336 A1 | 6/2008 | Walter et al. |
| 2008/0201330 A1 | 8/2008 | Bloesch |
| 2014/0364110 A1 | 12/2014 | Rao et al. |
| 2019/0268641 A1 | 8/2019 | Peters et al. |

FOREIGN PATENT DOCUMENTS

| | | |
|---|---|---|
| EP | 1 569 130 A1 | 2/2004 |
| EP | 1885096 A1 | 6/2008 |
| GB | 2 377 784 A | 2/2002 |
| JP | 2006-502496 A | 1/2006 |
| JP | 2007274105 A | 10/2007 |
| KR | 10-0824121 B1 | 4/2008 |
| WO | 98/52320 | 11/1998 |
| WO | 00/20962 | 4/2000 |
| WO | 00/21075 | 4/2000 |
| WO | 00/21232 | 4/2000 |
| WO | 01/10082 A2 | 2/2001 |
| WO | 0157691 A1 | 8/2001 |
| WO | 01/91482 A1 | 11/2001 |
| WO | 01/92973 A2 | 12/2001 |
| WO | 0206963 A1 | 1/2002 |
| WO | 02/23337 A2 | 3/2002 |
| WO | 2005/022882 A1 | 3/2005 |
| WO | 2005/055560 A1 | 6/2005 |
| WO | 2006/012533 A2 | 2/2006 |
| WO | 2007/062258 A2 | 5/2007 |
| WO | 2007050642 A2 | 5/2007 |
| WO | 2008/038280 A2 | 4/2008 |

OTHER PUBLICATIONS

Original Complaint for Patent Infringement, *Hammond Development International, Inc.* v. *Google LLC*, Civil Action No. 6:19-cv-00356 in the U.S. District Court for the Western District of Texas, Waco Division, filed Jun. 6, 2019, 23 pages.

Petitioners Power of Attorney and Designation of Counsel; *Google LLC* v. *Hammond Development International, Inc.*; U.S. Pat. No. 9,264,483, Case No. IPR2020-00020, filed Oct. 8, 2019, 2 pages.

Scott McGlashan, et al., "Voice Extensible Markup Language (VoiceXML) Version 2.0," W3C Recommendation Mar. 16, 2004, Sep. 29, 2019, 148 pages, publisher W3C® (MIT, ERCIM, Keio), All Rights Reserved. W3C liablity, trademark, document use and software licensing rules apply, available at https://www.w3.org/TR/2004/REC-voicexml20-20040316/.

"Voice eXtensible Markup Language (VoiceXML™) version 1.0," W3C Note May 5, 2000, Sep. 29, 2019, 115 pages, publisher Copyright © 2000 VoiceXML Forum. All rights reserved, available at https://www.w3.org/TR/2000/NOTE-voicexml-20000505/.

Defendant Google LLC's Preliminary Invalidity Disclosure of Invalidity Contentions, "Exhibit D24"—claim chart citing The Open Agent Architecture™ by Stanford Research Institute ("OAA"), Dec. 23, 2019, (29 Pages).

Defendant Google LLC's Preliminary Invalidity Disclosure of Invalidity Contentions, "Exhibit D25"—claim chart citing BeVocal system (2002) ("BeVocal"), Dec. 23, 2019, (39 Pages).

Defendant Google LLC's Preliminary Invalidity Disclosure of Invalidity Contentions, "Exhibit D26"—claim chart citing Prody Parrot™ by Mindmaker, Ltd. ("Prody Parrot"), Dec. 23, 2019, (33 Pages).

Defendant Google LLC's Preliminary Invalidity Disclosure of Invalidity Contentions, "Exhibit D27"—claim chart citing HAL2000, HAL Voice Portal, and HAL Deluxe by Home Automated Living ("HAL2000"), Dec. 23, 2019, (24 Pages).

Defendant Google LLC's Preliminary Invalidity Disclosure of Invalidity Contentions, "Exhibit E1"—claim chart citing U.S. Patent App. Pub. No. 2003/0216923 to Gilmore et al. (published Nov. 20, 2003) ("Gilmore"), Dec. 23, 2019, (55 Pages).

Defendant Google LLC's Preliminary Invalidity Disclosure of Invalidity Contentions, "Exhibit E2"—claim chart citing U.S. Patent App. Pub. No. 2003/0202504 A1 (published Oct. 30, 2003) ("Dhara"), Dec. 23, 2019, (27 Pages).

Defendant Google LLC's Preliminary Invalidity Disclosure of Invalidity Contentions, "Exhibit E3"—claim chart citing U.S. Patent App. Pub. No. 2004/0122941 A1, (published Jun. 24, 2004) ("Creamer") and/or U.S. Patent App. Pub. No. 2004/0120479 A1 (published Jun. 24, 2004) ("Creamer II"), Dec. 23, 2019, (18 Pages).

(56) References Cited

OTHER PUBLICATIONS

Defendant Google LLC's Preliminary Invalidity Disclosure of Invalidity Contentions, "Exhibit E4"—claim chart citing U.S. Pat. No. 6,269,336 B1 (issued Jul. 31, 2001) ("Ladd"), Dec. 23, 2019, (27 Pages).
Defendant Google LLC's Preliminary Invalidity Disclosure of Invalidity Contentions, "Exhibit E5"—claim chart citing U.S. Pat. No. 6,766,298 to Dodrill et al. (issued Jul. 20, 2004) ("Dodrill"), Dec. 23, 2019, (20 Pages).
Defendant Google LLC's Preliminary Invalidity Disclosure of Invalidity Contentions, "Exhibit E6"—claim chart citing U.S. Patent App. Pub. No. 2006/0256950 to Patel et al. (published Nov. 16, 2006) ("Patel"), Dec. 23, 2019, (12 Pages).
Defendant Google LLC's Preliminary Invalidity Disclosure of Invalidity Contentions, "Exhibit E7"—claim chart citing U.S. Patent Publication No. 2004/0071275 A1 to Bowater et al. (published Apr. 15, 2004) ("Bowater"), Dec. 23, 2019, (15 Pages).
Defendant Google LLC's Preliminary Invalidity Disclosure of Invalidity Contentions, "Exhibit E8"—claim chart citing U.S. Pat. No. 7,303,474 to Anderson et al. (published Dec. 30, 2004) ("Anderson"), Dec. 23, 2019, (17 Pages).
Defendant Google LLC's Preliminary Invalidity Disclosure of Invalidity Contentions, "Exhibit E9"—claim chart citing U.S. Pat. No. 8,073,697 to Cross, Jr. et al. (filed Sep. 12, 2006) ("Cross"), Dec. 23, 2019, (16 Pages).
Defendant Google LLC's Preliminary Invalidity Disclosure of Invalidity Contentions, "Exhibit E10"—claim chart citing TellMe Voice Portal (2000) ("TellMe Voice Portal system"), Dec. 23, 2019, (48 Pages).
Defendant Google LLC's Preliminary Invalidity Disclosure of Invalidity Contentions, "Exhibit E11"—claim chart citing HeyAnita system ("HeyAnita"), Dec. 23, 2019, (31 Pages).
Defendant Google LLC's Preliminary Invalidity Disclosure of Invalidity Contentions, "Exhibit E12"—claim chart citing Auburn University Research system (2003), Dec. 23, 2019, (24 Pages).
Defendant Google LLC's Preliminary Invalidity Disclosure of Invalidity Contentions, "Exhibit E13"—claim chart citing General Magic Portico (a.k.a. "Serengeti") system (1998) ("General Magic system"), Dec. 23, 2019, (55 Pages).
Defendant Google LLC's Preliminary Invalidity Disclosure of Invalidity Contentions, "Exhibit E14"—claim chart citing Voxeo Prophecy Interactive Voice Response (IVR) Platform and/or VoiceCenter IVR Platform (1999) ("Voxeo system"), Dec. 23, 2019, (37 Pages).
Defendant Google LLC's Preliminary Invalidity Disclosure of Invalidity Contentions, "Exhibit E15"—claim chart citing Genesys Voice Platform 7.0 (2004) ("GVP system"), Dec. 23, 2019, (58 Pages).
Defendant Google LLC's Preliminary Invalidity Disclosure of Invalidity Contentions, "Exhibit E17"—claim chart citing IBM Websphere Voice Server and Platform, and Related Systems ("IBM Websphere") and Kempny et al., IBM Websphere Voice Systems Solutions (Redbooks 2003) ("Kempny"), Dec. 23, 2019, (36 Pages).
Defendant Google LLC's Preliminary Invalidity Disclosure of Invalidity Contentions, "Exhibit E18"—claim chart citing OneVoice by InterVoice-Brite ("OneVoice"), Dec. 23, 2019, (18 Pages).
Defendant Google LLC's Preliminary Invalidity Disclosure of Invalidity Contentions, "Exhibit E19"—claim chart citing Nuance Voice Platform 3.0 ("Nuance Voice Platform"), Dec. 23, 2019, (16 Pages).
Defendant Google LLC's Preliminary Invalidity Disclosure of Invalidity Contentions, "Exhibit E20"—claim chart citing Avaya Voice Portal by Avaya Inc. ("Avaya Voice Portal"), Dec. 23, 2019, (44 Pages).
Defendant Google LLC's Preliminary Invalidity Disclosure of Invalidity Contentions, "Exhibit E21"—claim chart citing Cisco iOS VoiceXML Gateway and VoiceXML Solution Infrastructure ("Cisco VoiceXML Gateway"), Dec. 23, 2019, (22 Pages).
Defendant Google LLC's Preliminary Invalidity Disclosure of Invalidity Contentions, "Exhibit E22"—claim chart citing VeraServ system by Verascape, Inc. ("VeraServ"), Dec. 23, 2019, (23 Pages).
Defendant Google LLC's Preliminary Invalidity Disclosure of Invalidity Contentions, "Exhibit E23"—claim chart citing TuVox voice applications platform including CVR ("TuVox"), Dec. 23, 2019, (15 Pages).
Defendant Google LLC's Preliminary Invalidity Disclosure of Invalidity Contentions, "Exhibit E24"—claim chart citing TuVox voice applications platform including CVR ("TuVox"), Dec. 23, 2019, (20 Pages).
Defendant Google LLC's Preliminary Invalidity Disclosure of Invalidity Contentions, "Exhibit E25"—claim chart citing BeVocal system (2002) ("BeVocal"), Dec. 23, 2019, (32 Pages).
Defendant Google LLC's Preliminary Invalidity Disclosure of Invalidity Contentions, "Exhibit E26"—claim chart citing Prody Parrot™ by Mindmaker, Ltd. ("Prody Parrot"), Dec. 23, 2019, (19 Pages).
Defendant Google LLC's Preliminary Invalidity Disclosure of Invalidity Contentions, "Exhibit E27"—claim chart citing HAL2000, HAL Voice Portal, and HAL Deluxe by Home Automated Living ("HAL2000"), Dec. 23, 2019, (17 Pages).
Defendant Google LLC's Preliminary Invalidity Disclosure of Invalidity Contentions, "Exhibit F1"—claim chart citing U.S. Patent App. Pub. No. 2003/0216923 to Gilmore et al. (published Nov. 20, 2003) ("Gilmore"), Dec. 23, 2019, (74 Pages).
Defendant Google LLC's Preliminary Invalidity Disclosure of Invalidity Contentions, "Exhibit F2"—claim chart citing U.S. Patent App. Pub. No. 2003/0202504 A1 (published Oct. 30, 2003) ("Dhara"), Dec. 23, 2019, (55 Pages).
Defendant Google LLC's Preliminary Invalidity Disclosure of Invalidity Contentions, "Exhibit F3"—claim chart citing U.S. Patent App. Pub. No. 2004/0122941 A1, (published Jun. 24, 2004) ("Creamer") and/or U.S. Patent App. Pub. No. 2004/0120479 A1 (published Jun. 24, 2004) ("Creamer II"), Dec. 23, 2019, (35 Pages).
Defendant Google LLC's Preliminary Invalidity Disclosure of Invalidity Contentions, "Exhibit F4"—claim chart citing U.S. Pat. No. 6,269,336 B1 (issued Jul. 31, 2001) ("Ladd"), Dec. 23, 2019, (51 Pages).
Defendant Google LLC's Preliminary Invalidity Disclosure of Invalidity Contentions, "Exhibit F5"—claim chart citing U.S. Pat. No. 6,766,298 to Dodrill et al. (issued Jul. 20, 2004) ("Dodrill"), Dec. 23, 2019, (38 Pages).
Defendant Google LLC's Preliminary Invalidity Disclosure of Invalidity Contentions, "Exhibit F6"—claim chart citing U.S. Patent App. Pub. No. 2006/0256950 to Patel et al. (published Nov. 16, 2006) ("Patel"), Dec. 23, 2019, (21 Pages).
Defendant Google LLC's Preliminary Invalidity Disclosure of Invalidity Contentions, "Exhibit F7"—claim chart citing U.S. Patent Publication No. 2004/0071275 A1 to Bowater et al. (published Apr. 15, 2004) ("Bowater"), Dec. 23, 2019, (33 Pages).
Defendant Google LLC's Preliminary Invalidity Disclosure of Invalidity Contentions, "Exhibit F8"—claim chart citing U.S. Pat. No. 7,303,474 to Anderson et al. (published Dec. 30, 2004) ("Anderson"), Dec. 23, 2019, (37 Pages).
Defendant Google LLC's Preliminary Invalidity Disclosure of Invalidity Contentions, "Exhibit F9"—claim chart citing U.S. Pat. No. 8,073,697 to Cross, Jr. et al. (filed Sep. 12, 2006) ("Cross"), Dec. 23, 2019, (33 Pages).
Defendant Google LLC's Preliminary Invalidity Disclosure of Invalidity Contentions, "Exhibit F10"—claim chart citing TellMe Voice Portal (2000) ("TellMe Voice Portal system"), Dec. 23, 2019, (76 Pages).
Defendant Google LLC's Preliminary Invalidity Disclosure of Invalidity Contentions, "Exhibit F11"—claim chart citing HeyAnita system ("HeyAnita"), Dec. 23, 2019, (60 Pages).
Defendant Google LLC's Preliminary Invalidity Disclosure of Invalidity Contentions, "Exhibit F12"—claim chart citing Auburn University Research system (2003), Dec. 23, 2019, (45 Pages).
Defendant Google LLC's Preliminary Invalidity Disclosure of Invalidity Contentions, "Exhibit F13"—claim chart citing General Magic Portico (a.k.a. "Serengeti") system (1998) ("General Magic system"), Dec. 23, 2019, (98 Pages).
Defendant Google LLC's Preliminary Invalidity Disclosure of Invalidity Contentions, "Exhibit F14"—claim chart citing Voxeo

(56) References Cited

OTHER PUBLICATIONS

Prophecy Interactive Voice Response (IVR) Platform and/or VoiceCenter IVR Platform (1999) ("Voxeo system"), Dec. 23, 2019, (62 Pages).
Defendant Google LLC's Preliminary Invalidity Disclosure of Invalidity Contentions, "Exhibit F15"—claim chart citing Genesys Voice Platform 7.0 (2004) ("GVP system"), Dec. 23, 2019, (99 Pages).
Defendant Google LLC's Preliminary Invalidity Disclosure of Invalidity Contentions, "Exhibit F17"—claim chart citing IBM Websphere Voice Server and Platform, and Related Systems ("IBM Websphere") and Kempny et al., IBM Websphere Voice Systems Solutions (Redbooks 2003) ("Kempny"), Dec. 23, 2019, (54 Pages).
Defendant Google LLC's Preliminary Invalidity Disclosure of Invalidity Contentions, "Exhibit F18"—claim chart citing OneVoice by InterVoice-Brite ("OneVoice"), Dec. 23, 2019, (28 Pages).
Defendant Google LLC's Preliminary Invalidity Disclosure of Invalidity Contentions, "Exhibit F19"—claim chart citing Nuance Voice Platform 3.0 ("Nuance Voice Platform"), Dec. 23, 2019, (35 Pages).
Defendant Google LLC's Preliminary Invalidity Disclosure of Invalidity Contentions, "Exhibit F20"—claim chart citing Avaya Voice Portal by Avaya Inc. ("Avaya Voice Portal"), Dec. 23, 2019, (59 Pages).
Defendant Google LLC's Preliminary Invalidity Disclosure of Invalidity Contentions, "Exhibit F21"—claim chart citing Cisco iOS VoiceXML Gateway and VoiceXML Solution Infrastructure ("Cisco VoiceXML Gateway"), Dec. 23, 2019, (42 Pages).
Original Complaint for Patent Infringement, *Hammond Development International, Inc.* v. *Amazon.com, Inc. et al.*; Civil Action No. 6:19-cv-00355 in the U.S. District Court for the Western District of Texas, Waco Division, filed Jun. 6, 2019 (21 pages).
Defendants' Answer to Complaint, *Hammond Development International, Inc.* v. *Amazon.com, Inc. et al.*; Civil Action No. 6:19-cv-00355 in the U.S. District Court for the Western District of Texas, Waco Division, filed Aug. 19, 2019 (25 pages).
Defendant Google LL's Answer to Plaintiffs Original Complaint for Patent Infringement, *Hammond Development International, Inc.* v. *Google LLC*; Civil Action No. 6:19-cv-00356 in the U.S. District Court for the Western District of Texas, Waco Division, filed Sep. 18, 2019 (26 pages).
Citrix, "Best Practices for Citrix XenDesktop with Provisioning Server," 2008, AMZN_HDI_020496, (19 Pages).
Blackberry, "Getting Started Guide," 2005, AMZN_HDI_005715, (28 Pages).
Blackberry, "BlackBerry Wireless Handheld Getting Started Guide," 2005, AMZN_HDI_003844, (11 Pages).
Craig James Johnston, et al., "Professional BlackBerry®," 2005, AMZN_HDI_022019, (333 Pages).
Blackberry, "BlackBerry Mobile Data System Version 4.1," Technical Overview, 2006, AMZN_HDI_005755, (20 Pages).
Blackberry, "BlackBerry 8700f—GSM—BlackBerry smartphone Specs," BlackBerry 8700f—GSM—BlackBerry smartphone, AMZN_HDI_006611, downloaded Oct. 25, 2019, (6 Pages).
Blackberry, "BlackBerry Pearl 8220 Smartphone," User Guide, 2008, AMZN_HDI_005801, (277 Pages).
Mitesh Desai, et al., "BlackBerry Enterprise Server for Microsoft® Exchange Installation and Administration," 2007, AMZN_HDI_021832, (pp. 183).
Blackberry, BlackBerry Development : The BlackBerry Mobile Data System—The BlackBerry Enterprise Server, BlackBerry MDS overview, AMZN_HDI_005651, downloaded Oct. 21, 2019, (4 Pages).
David Pogue, "A BlackBerry for Collars of All Colors," The New York Times, May 10, 2007, AMZN_HDI_024578, (4 Pages).
Tomas Kozel, et al., "Mobile Devices and Web Service," The WSEAS International Conference on Applied Computer Science, Venice, Italy, Nov. 21-23, 2007, AMZN_HDI_008886, (5 Pages).
Blackberry, "BlackBerry Professional Software for Microsoft Exchange Version 4.1," 2008, AMZN_HDI_003787, (53 Pages).
"BlackBerry 7270," AMZN_HDI_004005, downloaded Dec. 10, 2019, available at https://www.cnet.com/pictures/a-decade-or-so-of-blackberry-smartphones-pictures/7, (2 Pages).
Blackberry, "BlackBerry Mobile Data System v4.1," downloaded Sep. 27, 2019, AMZN_HDI_005649, (2 Pages).
Blackberry, "BlackBerry Enterprise Server for Microsoft Exchange, Version 4.0," Installation Guide, 2006, AMZN_HDI_005655, (54 Pages).
Blackberry, Reference Document: BlackBerry for WLAN, 2006, AMZN_HDI_005739, (16 Pages).
Blackberry, "BlackBerry Mobile Data System," 2006, AMZN_HDI_005775, (6 Pages).
Blackberry, "BlackBerry Universal Headset HS-250," User Guide and Safety Information, 2012, AMZN_HDI_005781, (20 Pages).
Paul Steel, et al., "Develop Mobile Applications using Domino 7 Web Services and MDS 4.1," 2006, AMZN_HDI_010100, (24 pages).
Blackberry, "BlackBerry Enterprise Server for MDS Applications," Administration Guide, Jan. 11, 2010, AMZN_HDI_012360, (122 Pages).
Qusay H. Mahmound, "Programming the BlackBerry With J2ME," Oracle Technology Network, Apr. 2005, AMZN_HDI_012555, (5 Pages).
"Popular BlackBerry Download Link," AMZN_HDI_012697, downloaded Dec. 10, 2019, available at https://forums.crackberry.com/general-blackberry-discussion-f2/popular-blackberry-download-links-21096, (6 Pages).
Nancy Gohring, "RIM Plans Wi-Fi/Cell Phone BlackBerry," CIO, May 25, 2007, AMZN_HDI_013679, downloaded Dec. 10, 2019, available at https://www.cio.com/article/2438905/rim-plans-wi-fi-cell-phone-blackberry.html, (3 Pages).
Lindsay Morio, "VoiceStream Announces Voice Enabled Blackberry and PC Data Card Available," T-Mobile USA Media Relations, Mar. 3, 2002, AMZN_HDI_022896, (5 Pages).
Blackberry, "BlackBerry Enterprise Server for Microsoft Exchange Version 4.1.4," Installation Guide, Aug. 10, 2007, AMZN_HDI_022911, (40 Pages).
Tony Zhang, "BlackBerry 8800," MobileTechReview, Reviewed Mar. 25, 2007, AMZN_HDI_022951, (7 Pages).
Palm, Inc., Palm@ Treo, "Palm@ TREOrM 700W Smartphone Overview," 2005, AMZN_HDI_003909, (96 Pages).
"Palm Treo 700 specs," CNET, AMZN_HDI_011432, (6 Pages).
"Palm Tungsten T5 Specifications," PC World Australia, Oct. 3, 2019, AMZN_HDI_011438, (4 Pages).
Palm Computing, Inc., "Palm Pilot™ Professional Handbook," 3Com, 1997, AMZN_HDI_011442, (75 Pages).
"Palm Tungsten T3—handheld—Palm OS 5.2.1—256 MB Specs," CNET, Oct. 10, 2019, AMZN_HDI_011517, (6 pages).
"Palm Z22—handheld—Palm OS Garnet 5.4 Series Specs," CNET, Oct. 3, 2019, AMZN_HDI_011523, (6 Pages).
Palm, Inc., "Handbook for the Palm™ Tungsten™ T3 Handheld," 1998-2003, AMZN_HDI_013714 (408 Pages).
Palm, Inc., "Getting Started Guide," 2005, AMZN_HDI_015220, (172 Pages).
Palm, Inc., "Using Your Palm® Treo™ 700w Smartphone," 2005, AMZN_HDI_015394, (268 Pages).
Nuance, "Products Overview, Dragon NaturallySpeaking 8," 2006, AMZN_HDI_022895, (1 Page).
Nuance, "Guidelines for Developing Windows Applications Compatible with Dragon® Naturally Speaking and Dragon® Medical," 2009, AMZN_HDI_006617, (8 Pages).
Nuance Professional Group, "Dragon Speech Recognition," Client Installation Guide, 1991-2019, AMZN_HDI_006519, (92 Pages).
"Dragon User Manual—Using Natural Punctuation," AMZN_HDI_015392,(2 Pages).
"Dragon User Manual—Correcting and Editing," AMZN_HDI_015662,(1 Page).
Nuance, "Products Overview, Dragon NaturallySpeaking 9," 2006, AMZN_HDI_022910, (1 Page).
Avaya, "Avaya IP Agent Release 6.0 Installation and User Guide for Citrix," May 2006, AMZN_HDI_005233, (168 Pages).
Avaya, "Avaya IP Telephony Implementation Guide," Communication Manager 3.1, May 2006, AMZN_HDI_005524, (81 Pages).

(56) References Cited

OTHER PUBLICATIONS

Avaya, "Name Dialing," Dec. 5, 2019, AMZN_HDI_008900, (2 Pages).
Nortel Norstar, "Norstar Voice Mail Speech Recognition Automated Attendant Set Up and Operation Guide," PO886635 Issue 1.0, Speech Recognition Automated Attendant Set Up and Operation Guide, AMZN_HDI_005469, (29 Pages).
Aruba Wieless Networks, Inc., "Aruba Networks ans Avaya: Providing Best-of-Breed Mobile Convergence," Partner Solution Sheet, 2006, AMZN_HDI_004774, (2 Pages).
Avaya, "Administering Voice Portal," Jan. 2008, AMZN_HDI_004814, (419 Pages).
Avaya, "Downloads," Download Name: Client Software for one-X Mobile Blackberry Devices, Software, Jul. 22, 2008, AMZN_HDI_005401, (2 Pages).
Avaya, "Applications," CascadeTel, Dec. 10, 2019, AMZN_HDI_005709, (2 Pages).
Geekzone, "Blackbeny to have VoIP framework from Avaya," Jun. 16, 2005, AMZN_HDI_007117, (1 Page).
Defendant Google LLC's Preliminary Invalidity Disclosure of Invalidity Contentions, "Exhibit F22"—claim chart citing VeraServ system by Verascape, Inc. ("VeraServ"), Dec. 23, 2019, (44 Pages).
Defendant Google LLC's Preliminary Invalidity Disclosure of Invalidity Contentions, "Exhibit F23"—claim chart citing TuVox voice applications platform including CVR ("TuVox"), Dec. 23, 2019, (25 Pages).
Defendant Google LLC's Preliminary Invalidity Disclosure of Invalidity Contentions, "Exhibit F24"—claim chart citing The Open Agent Architecture™ by Stanford Research Institute ("OAA"), Dec. 23, 2019, (41 Pages).
Defendant Google LLC's Preliminary Invalidity Disclosure of Invalidity Contentions, "Exhibit F25"—claim chart citing BeVocal system (2002) ("BeVocal"), Dec. 23, 2019, (55 Pages).
Defendant Google LLC's Preliminary Invalidity Disclosure of Invalidity Contentions, "Exhibit F26"—claim chart citing Prody Parrot™ by Mindmaker, Ltd. ("Prody Parrot"), Dec. 23, 2019, (55 Pages).
Defendant Google LLC's Preliminary Invalidity Disclosure of Invalidity Contentions, "Exhibit F27"—claim chart citing HAL2000, HAL Voice Portal, and HAL Deluxe by Home Automated Living ("HAL2000"), Dec. 23, 2019, (28 Pages).
Defendant Google LLC's Preliminary Invalidity Disclosure of Invalidity Contentions, "Exhibit G1"—claim chart citing U.S. Patent App. Pub. No. 2003/0216923 to Gilmore et al. (published Nov. 20, 2003) ("Gilmore"), Dec. 23, 2019, (97 Pages).
Defendant Google LLC's Preliminary Invalidity Disclosure of Invalidity Contentions, "Exhibit G2"—claim chart citing U.S. Patent App. Pub. No. 2003/0202504 A1 (published Oct. 30, 2003) ("Dhara"), Dec. 23, 2019, (82 Pages).
Defendant Google LLC's Preliminary Invalidity Disclosure of Invalidity Contentions, "Exhibit G3"—claim chart citing U.S. Patent App. Pub. No. 2004/0122941 A1, (published Jun. 24, 2004) ("Creamer") and/or U.S. Patent App. Pub. No. 2004/0120479 A1 (published Jun. 24, 2004) ("Creamer II"), Dec. 23, 2019, (57 Pages).
Defendant Google LLC's Preliminary Invalidity Disclosure of Invalidity Contentions, "Exhibit G4"—claim chart citing U.S. Pat. No. 6,269,336 B1 (issued Jul. 31, 2001) ("Ladd"), Dec. 23, 2019, (68 Pages).
Defendant Google LLC's Preliminary Invalidity Disclosure of Invalidity Contentions, "Exhibit G5"—claim chart citing U.S. Pat. No. 6,766,298 to Dodrill et al. (issued Jul. 20, 2004) ("Dodrill"), Dec. 23, 2019, (47 Pages).
Defendant Google LLC's Preliminary Invalidity Disclosure of Invalidity Contentions, "Exhibit G6"—claim chart citing U.S. Patent App. Pub. No. 2006/0256950 to Patel et al. (published Nov. 16, 2006) ("Patel"), Dec. 23, 2019, (36 Pages).
Defendant Google LLC's Preliminary Invalidity Disclosure of Invalidity Contentions, "Exhibit G7"—claim chart citing U.S. Patent Publication No. 2004/0071275 A1 to Bowater et al. (published Apr. 15, 2004) ("Bowater"), Dec. 23, 2019, (41 Pages).
Defendant Google LLC's Preliminary Invalidity Disclosure of Invalidity Contentions, "Exhibit G8"—claim chart citing U.S. Pat. No. 7,303,474 to Anderson et al. (published Dec. 30, 2004) ("Anderson"), Dec. 23, 2019, (53 Pages).
Defendant Google LLC's Preliminary Invalidity Disclosure of Invalidity Contentions, "Exhibit G9"—claim chart citing U.S. Pat. No. 8,073,697 to Cross, Jr. et al. (filed Sep. 12, 2006) ("Cross"), Dec. 23, 2019, (45 Pages).
Defendant Google LLC's Preliminary Invalidity Disclosure of Invalidity Contentions, "Exhibit G10"—claim chart citing TellMe Voice Portal (2000) ("TellMe Voice Portal system"), Dec. 23, 2019, (95 Pages).
Defendant Google LLC's Preliminary Invalidity Disclosure of Invalidity Contentions, "Exhibit G11"—claim chart citing HeyAnita system ("HeyAnita"), Dec. 23, 2019, (101 Pages).
Defendant Google LLC's Preliminary Invalidity Disclosure of Invalidity Contentions, "Exhibit G12"—claim chart citing Auburn University Research system (2003), Dec. 23, 2019, (73 Pages).
Defendant Google LLC's Preliminary Invalidity Disclosure of Invalidity Contentions, "Exhibit G13"—claim chart citing General Magic Portico (a.k.a. "Serengeti") system (1998) ("General Magic system"), Dec. 23, 2019, (132 Pages).
Defendant Google LLC's Preliminary Invalidity Disclosure of Invalidity Contentions, "Exhibit G14"—claim chart citing Voxeo Prophecy Interactive Voice Response (IVR) Platform and/or VoiceCenter IVR Platform (1999) ("Voxeo system"), Dec. 23, 2019, (95 Pages).
Defendant Google LLC's Preliminary Invalidity Disclosure of Invalidity Contentions, "Exhibit G15"—claim chart citing Genesys Voice Platform 7.0 (2004) ("GVP system"), Dec. 23, 2019, (118 Pages).
Defendant Google LLC's Preliminary Invalidity Disclosure of Invalidity Contentions, "Exhibit G17"—claim chart citing IBM Websphere Voice Server and Platform, and Related Systems ("IBM Websphere") and Kempny et al., IBM Websphere Voice Systems Solutions (Redbooks 2003) ("Kempny"), Dec. 23, 2019, (66 Pages).
Defendant Google LLC's Preliminary Invalidity Disclosure of Invalidity Contentions, "Exhibit G18"—claim chart citing OneVoice by InterVoice-Brite ("OneVoice"), Dec. 23, 2019, (37 Pages).
Defendant Google LLC's Preliminary Invalidity Disclosure of Invalidity Contentions, "Exhibit G19"—claim chart citing Nuance Voice Platform 3.0 ("Nuance Voice Platform"), Dec. 23, 2019, (46 Pages).
Defendant Google LLC's Preliminary Invalidity Disclosure of Invalidity Contentions, "Exhibit G20"—claim chart citing Avaya Voice Portal by Avaya Inc. ("Avaya Voice Portal"), Dec. 23, 2019, (77 Pages).
Defendant Google LLC's Preliminary Invalidity Disclosure of Invalidity Contentions, "Exhibit G21"—claim chart citing Cisco iOS VoiceXML Gateway and VoiceXML Solution Infrastructure ("Cisco VoiceXML Gateway"), Dec. 23, 2019, (58 Pages).
Defendant Google LLC's Preliminary Invalidity Disclosure of Invalidity Contentions, "Exhibit G22"—claim chart citing VeraServ system by Verascape, Inc. ("VeraServ"), Dec. 23, 2019, (63 Pages).
Defendant Google LLC's Preliminary Invalidity Disclosure of Invalidity Contentions, "Exhibit G23"—claim chart citing VTuVox voice applications platform including CVR ("TuVox"), Dec. 23, 2019, (35 Pages).
Defendant Google LLC's Preliminary Invalidity Disclosure of Invalidity Contentions, "Exhibit G24"—claim chart citing the Open Agent Architecture™ by Stanford Research Institute ("OAA"), Dec. 23, 2019, (60 Pages).
Defendant Google LLC's Preliminary Invalidity Disclosure of Invalidity Contentions, "Exhibit G25"—claim chart citing TBeVocal system (2002) ("BeVocal"), Dec. 23, 2019, (79 Pages).
Defendant Google LLC's Preliminary Invalidity Disclosure of Invalidity Contentions, "Exhibit G26"—claim chart citing Prody Parrot™ by Mindmaker, Ltd. ("Prody Parrot"), Dec. 23, 2019, (59 Pages).
Defendant Google LLC's Preliminary Invalidity Disclosure of Invalidity Contentions, "Exhibit G27"—claim chart citing HAL2000, HAL Voice Portal, and HAL Deluxe by Home Automated Living ("HAL2000"), Dec. 23, 2019, (36 Pages).

(56) References Cited

OTHER PUBLICATIONS

Defendant Google LLC's Preliminary Invalidity Disclosure of Invalidity Contentions, "Exhibit H1"—claim chart citing U.S. Patent App. Pub. No. 2003/0216923 to Gilmore et al. (published Nov. 20, 2003) ("Gilmore"), Dec. 23, 2019, (197 Pages).
Defendant Google LLC's Preliminary Invalidity Disclosure of Invalidity Contentions, "Exhibit H2"—claim chart citing U.S. Patent App. Pub. No. 2003/0202504 A1 (published Oct 30, 2003) ("Dhara"), Dec. 23, 2019, (131 Pages).
Defendant Google LLC's Preliminary Invalidity Disclosure of Invalidity Contentions, "Exhibit H3"—claim chart citing U.S. Patent App. Pub. No. 2004/0122941 A1, (published Jun. 24, 2004) ("Creamer") and/or U.S. Patent App. Pub. No. 2004/0120479 A1 (published Jun. 24, 2004) ("Creamer II"), Dec. 23, 2019, (122 Pages).
Defendant Google LLC's Preliminary Invalidity Disclosure of Invalidity Contentions, "Exhibit H4"—claim chart citing U.S. Pat. No. 6,269,336 B1 (issued Jul. 31, 2001) ("Ladd"), Dec. 23, 2019, (144 Pages).
Defendant Google LLC's Preliminary Invalidity Disclosure of Invalidity Contentions, "Exhibit H5"—claim chart citing U.S. Pat. No. 6,766,298 to Dodrill et al. ("Dodrill"), Dec. 23, 2019, (78 Pages).
Defendant Google LLC's Preliminary Invalidity Disclosure of Invalidity Contentions, "Exhibit H6"—claim chart citing U.S. Patent App. Pub. No. 2006/0256950 to Patel et al. (published Nov. 16, 2006) ("Patel"), Dec. 23, 2019, (69 Pages).
Defendant Google LLC's Preliminary Invalidity Disclosure of Invalidity Contentions, "Exhibit H7"—claim chart citing U.S. Patent Publication No. 2004/0071275 A1 to Bowater et al. (published Apr. 15, 2004) ("Bowater"), Dec. 23, 2019, (69 Pages).
Defendant Google LLC's Preliminary Invalidity Disclosure of Invalidity Contentions, "Exhibit H8"—claim chart citing U.S. Pat. No. 7,303,474 to Anderson et al. (published Dec. 30, 2004) ("Anderson"), Dec. 23, 2019, (101 Pages).
Defendant Google LLC's Preliminary Invalidity Disclosure of Invalidity Contentions, "Exhibit H9"—claim chart citing U.S. Pat. No. 8,073,697 to Cross, Jr. et al. (filed Sep. 12, 2006) ("Cross"), Dec. 23, 2019, (79 Pages).
Defendant Google LLC's Preliminary Invalidity Disclosure of Invalidity Contentions, "Exhibit H10"—claim chart citing TellMe Voice Portal (2000) ("TellMe Voice Portal system"), Dec. 23, 2019, (180 Pages).
Defendant Google LLC's Preliminary Invalidity Disclosure of Invalidity Contentions, "Exhibit H11"—claim chart citing HeyAnita system ("HeyAnita"), Dec. 23, 2019, (193 Pages).
Defendant Google LLC's Preliminary Invalidity Disclosure of Invalidity Contentions, "Exhibit H12"—claim chart citing Auburn University Research system (2003), Dec. 23, 2019, (172 Pages).
Defendant Google LLC's Preliminary Invalidity Disclosure of Invalidity Contentions, "Exhibit H13"—claim chart citing General Magic Portico (a.k.a. "Serengeti") system (1998) ("General Magic system"), Dec. 23, 2019, (250 Pages).
Defendant Google LLC's Preliminary Invalidity Disclosure of Invalidity Contentions, "Exhibit H14"—claim chart citing Voxeo Prophecy Interactive Voice Response (IVR) Platform and/or VoiceCenter IVR Platform (1999) ("Voxeo system") Dec. 23, 2019, (202 Pages).
Defendant Google LLC's Preliminary Invalidity Disclosure of Invalidity Contentions, "Exhibit H15"—claim chart citing Genesys Voice Platform 7.0 (2004) ("GVP system"), Dec. 23, 2019, (271 Pages).
Defendant Google LLC's Preliminary Invalidity Disclosure of Invalidity Contentions, "Exhibit H16"—claim chart citing IBM Websphere Voice Server and Platform, and Related Systems ("IBM Websphere") and Kempny et al., IBM Websphere Voice Systems Solutions (Redbooks 2003) ("Kempny"), Dec. 23, 2019, (140 Pages).
Defendant Google LLC's Preliminary Invalidity Disclosure of Invalidity Contentions, "Exhibit H17"—claim chart citing IBM Websphere Voice Server and Platform, and Related Systems ("IBM Websphere") and Kempny et al., IBM Websphere Voice Systems Solutions (Redbooks 2003) ("Kempny"), Dec. 23, 2019, (140 Pages).
Defendant Google LLC's Preliminary Invalidity Disclosure of Invalidity Contentions, "Exhibit H18"—claim chart citing OneVoice by InterVoice-Brite ("OneVoice"), Dec. 23, 2019, (79 Pages).
Defendants Disclosure of Invalidity Contentions, *Hammond Development International, Inc.* v. *Amazon.com, Inc. et al.*; Civil Action No. 6:19-cv-00355-ADA in the U.S. District Court for the Western District of Texas, Waco Division, filed Dec. 23, 2019 (164 pages).
Amazon.com, Inc., et al., Defendants Disclosure of Invalidity Contentions, "Exhibit A1"—Claim Chart for U.S. Pat. No. 9,264,483 based on International Application Pub. No. WO 01/91482 ("Bharedwaj"), '483 Patent, (60 pages).
Amazon.com, Inc., et al., Defendants Disclosure of Invalidity Contentions, "Exhibit A2"—Claim Chart for U.S. Pat. No. 9,264,483 based on Granade, '483 Patent, (73 pages).
Amazon.com, Inc., et al., Defendants Disclosure of Invalidity Contentions, "Exhibit A3"—Claim Chart for U.S. Pat. No. 9,264,483 based on the Citrix MetaFrame Presentation Server Environment, '483 Patent, (50 pages).
Amazon.com, Inc., et al., Defendants Disclosure of Invalidity Contentions, "Exhibit A4"—Claim Chart for U.S. Pat. No. 9,264,483 based on the BlackBerry Mobile Data System, '483 Patent, (51 pages).
Amazon.com, Inc., et al., Defendants Disclosure of Invalidity Contentions, "Exhibit A5"—Claim Chart for U.S. Pat. No. 9,264,483 based on U.S. Pat. No. 6,934,756 ("Maes"), '483 Patent, (162 pages).
Amazon.com, Inc., et al., Defendants Disclosure of Invalidity Contentions, "Exhibit B1"—Claim Chart for U.S. Pat. No. 9,420,011 based on International Application Pub. No. WO 01/91482 ("Bharedwaj"), '011 Patent, (25 pages).
Amazon.com, Inc., et al., Defendants Disclosure of Invalidity Contentions, "Exhibit B2"—Claim Chart for U.S. Pat. No. 9,420,011 based on Granade, '011 Patent, (47 pages).
Amazon.com, Inc., et al., Defendants Disclosure of Invalidity Contentions, "Exhibit B3"—Claim Chart for U.S. Pat. No. 9,420,011 based on the Citrix MetaFrame Presentation Server Environment, '011 Patent, (26 pages).
Amazon.com, Inc., et al., Defendants Disclosure of Invalidity Contentions, "Exhibit B4"—Claim Chart for U.S. Pat. No. 9,420,011 based on the BlackBerry Mobile Data System, '011 Patent, (21 pages).
Amazon.com, Inc., et al., Defendants Disclosure of Invalidity Contentions, "Exhibit B5"—Claim Chart for U.S. Pat. No. 9,420,011 based on U.S. Pat. No. 6,934,756 ("Maes"), '011 Patent, (71 pages).
Amazon.com, Inc., et al., Defendants Disclosure of Invalidity Contentions, "Exhibit C1"—Claim Chart for U.S. Pat. No. 9,456,040 based on International Application Pub. No. WO 01/91482 ("Bharedwaj"), '040 Patent, (40 pages).
Amazon.com, Inc., et al., Defendants Disclosure of Invalidity Contentions, "Exhibit C2"—Claim Chart for U.S. Pat. No. 9,456,040 based on Granade, '040 Patent, (49 pages).
Amazon.com, Inc., et al., Defendants Disclosure of Invalidity Contentions, "Exhibit C3"—Claim Chart for U.S. Pat. No. 9,456,040 based on the Citrix MetaFrame Presentation Server Environment, '040 Patent, (33 pages).
Amazon.com, Inc., et al., Defendants Disclosure of Invalidity Contentions, "Exhibit C4"—Claim Chart for U.S. Pat. No. 9,456,040 based on the BlackBerry Mobile Data System, '040 Patent, (29 pages).
Amazon.com, Inc., et al., Defendants Disclosure of Invalidity Contentions, "Exhibit C5"—Claim Chart for U.S. Pat. No. 9,456,040 based on U.S. Pat. No. 6,934,756 ("Maes"), '040 Patent, (73 pages).
Amazon.com, Inc., et al., Defendants Disclosure of Invalidity Contentions, "Exhibit D1"—Claim Chart for U.S. Pat. No. 9,705,937 based on International Application Pub. No. WO 01/91482 ("Bharedwaj"), '937 Patent, (69 pages).
Amazon.com, Inc., et al., Defendants Disclosure of Invalidity Contentions, "Exhibit D2"—Claim Chart for U.S. Pat. No. 9,705,937 based on Granade, '937 Patent, (98 pages).

(56) References Cited

OTHER PUBLICATIONS

Amazon.com, Inc., et al., Defendants Disclosure of Invalidity Contentions, "Exhibit D3"—Claim Chart for U.S. Pat. No. 9,705,937 based on the Citrix MetaFrame Presentation Server Environment, '937 Patent, (62 pages).
Amazon.com, Inc., et al., Defendants Disclosure of Invalidity Contentions, "Exhibit D4"—Claim Chart for U.S. Pat. No. 9,705,937 based on the BlackBerry Mobile Data System, '937 Patent, (63 pages).
Amazon.com, Inc., et al., Defendants Disclosure of Invalidity Contentions, "Exhibit D5"—Claim Chart for U.S. Pat. No. 9,705,937 based on U.S. Pat. No. 6,934,756 ("Maes"), '937 Patent, (163 pages).
Amazon.com, Inc., et al., Defendants Disclosure of Invalidity Contentions, "Exhibit E1"—Claim Chart for U.S. Pat. No. 9,716,732 based on International Application Pub. No. WO 01/91482 ("Bharedwaj"), '732 Patent, (34 pages).
Amazon.com, Inc., et al., Defendants Disclosure of Invalidity Contentions, "Exhibit E2"—Claim Chart for U.S. Pat. No. 9,716,732 based on Granade, '732 Patent, (39 pages).
Amazon.com, Inc., et al., Defendants Disclosure of Invalidity Contentions, "Exhibit E3"—Claim Chart for U.S. Pat. No. 9,716,732 based on the Citrix MetaFrame Presentation Server Environment, '732 Patent, (28 pages).
Amazon.com, Inc., et al., Defendants Disclosure of Invalidity Contentions, "Exhibit E4"—Claim Chart for U.S. Pat. No. 9,716,732 based on the BlackBerry Mobile Data System, '732 Patent, (28 pages).
Amazon.com, Inc., et al., Defendants Disclosure of Invalidity Contentions, "Exhibit E5"—Claim Chart for U.S. Pat. No. 9,716,732 based on U.S. Pat. No. 6,934,756 ("Maes"), '732 Patent, (67 pages).
Amazon.com, Inc., et al., Defendants Disclosure of Invalidity Contentions, "Exhibit F1"—Claim Chart for U.S. Pat. No. 10,193,935 based on International Application Pub. No. WO 01/91482 ("Bharedwaj"), '935 Patent, (49 pages).
Amazon.com, Inc., et al., Defendants Disclosure of Invalidity Contentions, "Exhibit F2"—Claim Chart for U.S. Pat. No. 10,193,935 based on Granade, '935 Patent, (57 pages).
Amazon.com, Inc., et al., Defendants Disclosure of Invalidity Contentions, "Exhibit F3"—Claim Chart for U.S. Pat. No. 10,193,935 based on the Citrix MetaFrame Presentation Server Environment, '935 Patent, (41 pages).
Amazon.com, Inc., et al., Defendants Disclosure of Invalidity Contentions, "Exhibit F4"—Claim Chart for U.S. Pat. No. 10,193,935 based on the BlackBerry Mobile Data System, '935 Patent, (47 pages).
Amazon.com, Inc., et al., Defendants Disclosure of Invalidity Contentions, "Exhibit F5"—Claim Chart for U.S. Pat. No. 10,193,935 based on U.S. Pat. No. 6,934,756 ("Maes"), '935 Patent, (139 pages).
Amazon.com, Inc., et al., Defendants Disclosure of Invalidity Contentions, "Exhibit G1"—Claim Chart for U.S. Pat. No. 10,264,032 based on International Application Pub. No. WO 01/91482 ("Bharedwaj"), '032 Patent, (147 pages).
Amazon.com, Inc., et al., Defendants Disclosure of Invalidity Contentions, "Exhibit G2"—Claim Chart for U.S. Pat. No. 10,264,032 based on Granade, '032 Patent, (119 pages).
Amazon.com, Inc., et al., Defendants Disclosure of Invalidity Contentions, "Exhibit G3"—Claim Chart for U.S. Pat. No. 10,264,032 based on the Citrix MetaFrame Presentation Server Environment, '032 Patent, (96 pages).
Amazon.com, Inc., et al., Defendants Disclosure of Invalidity Contentions, "Exhibit G4"—Claim Chart for U.S. Pat. No. 10,264,032 based on the BlackBerry Mobile Data System, '032 Patent, (130 pages).
Amazon.com, Inc., et al., Defendants Disclosure of Invalidity Contentions, "Exhibit G5"—Claim Chart for U.S. Pat. No. 10,264,032 based on U.S. Pat. No. 6,934,756 ("Maes"), '032 Patent, (313 pages).
Amazon.com, Inc., et al., Defendants Disclosure of Invalidity Contentions, "Exhibit H1"—Claim Chart for U.S. Pat. No. 10,270,816 based on International Application Pub. No. WO 01/91482 ("Bharedwaj"), '816 Patent, (169 pages).
Amazon.com, Inc., et al., Defendants Disclosure of Invalidity Contentions, "Exhibit H2"—Claim Chart for U.S. Pat. No. 10,270,816 based on Grenade, '816 Patent, (159 pages).
Amazon.com, Inc., et al., Defendants Disclosure of Invalidity Contentions, "Exhibit H3"—Claim Chart for U.S. Pat. No. 10,270,816 based on the Citrix MetaFrame Presentation Server Environment, '816 Patent, (107 pages).
Amazon.com, Inc., et al., Defendants Disclosure of Invalidity Contentions, "Exhibit H4"—Claim Chart for U.S. Pat. No. 10,270,816 based on the BlackBerry Mobile Data System, '816 Patent, (134 pages).
Amazon.com, Inc., et al., Defendants Disclosure of Invalidity Contentions, "Exhibit H5"—Claim Chart for U.S. Pat. No. 10,270,816 based on U.S. Pat. No. 6,934,756 ("Maes"), '816 Patent, (345 pages).
BCP 71, "TCP over Second (2.5G) and Third (3G) Generation Wireless Networks," The Internet Society, Feb. 2003, AMZN_HDI_005498, (26 pages).
Synress, "Deploying Citrix MetaFrame Presentation Server 3.0 with Windows Server 2003 Terminal Services" 2003, AMZN_HDI_008287, (593 pages).
Citrix Systems, Inc., et al., "Advanced Concepts Guide MetaFrame® Presentation Server for Windows® Version 3.0," May 24, 2004, AMZN_HDI_004007, (346 pages).
Brian Madden, "To Silo or not to Silo: What application installation strategy is best for you?," Nov. 22, 2004, (10 Pages).
Citrix Developer Network, "Readme Citrix Presentation Server MFCOM SDK 3.0," Aug. 12, 2008, AMZN_HDI_012560, (2 Pages).
Citrix Developer Network, "Readme Citrix Presentation Server MFCOM SDK 2.1," Aug. 12, 2008, AMZN_HDI_012562, (1 Page).
Citrix Systems, Inc., et al., "Citrix Presentation Server Administrator's Guide," Citrix Presentation Server™ 4.5 for Windows®, Feb. 21, 2007, AMZN_HDI_006078, (426 Pages).
Defendants Disclosure of Invalidity Contentions, YouTube, "Citrix Applications," AMZN_HDI_013323, (1 Page).
Defendants Disclosure of Invalidity Contentions, YouTube, "Citrix Applications," AMZN_HDI_020257, (1 Page).
Tellme.Studio, "An XML primer," Capture timestamp (UTC):Wed, Nov. 6, 2019, Capture URL: https://web.archive.org/web/20060325113748/https:/ /studio. tellme.com/general/xmlprimer.html, GOOGLE-HDI-PA-0000887, (2 Pages).
Tellme.Studio, "Blackjack," Capture timestamp (UTC):Wed, Nov. 6, 2019, Capture URL: https://web.archive.org/web/20060325114305/https://studio.tellme.com/library2/code/ex-106/, GOOGLE-HDI-PA-0000889, (5 Pages).
[24]7 Studio, "Building Applications Frequently Asked Questions," Capture timestamp (UTC): Wed, Oct. 16, 2019, capture URL: https://studio.tellme.com/mystudio/faq.pl?group=apps#client_server, GOOGLE-HDI-PA-0000894, (4 Pages).
Tellme.Studio, "Buildng VoiceXML applications," Capture timestamp (UTC): Wed, Nov. 6, 2019, Capture URL: https://web.archive.org/web/20060325113714/https://studio.tellme.com/vxml2/ovw/applications.html, GOOGLE-HDI-PA-0000898, (2 Pages).
John Borland, "Tellme, others open up the telephone Web," Jan. 2, 2002, C/Net Tech News, GOOGLE-HD I-PA-0000900, (5 Pages).
Andrea Hamilton, "Voice portals promise Net-via-phones, but are they all talk?," CNN.com, Apr. 28, 2000, GOOGLE-HDI-PA-0000905, (2 Pages).
Tellme.Studio, "Code Library," Capture timestamp (UTC): Wed, Nov. 6, 2019, Capture URL: https://web.archive.org/web/20060325113313/https://studio.tellme.com/library2/code/, GOOGLE-HDI-PA-0000907, (1 Page).
Tellme.Studio, "Getting Started with Tellme Studio," Capture timestamp (UTC): Wed, Nov. 6, 2019, Capture URL: https://web.archive.org/web/20060325113637 /https:/ /studio. tellme.com/help/gettingstarted.html, GOOGLE-HD I-PA-0000908, (1 Page).
Tellme.Studio, "Hello, World." Capture timestamp (UTC): Wed, Nov. 6, 2019, Capture URL: https://web.archive.org/web/

(56) References Cited

OTHER PUBLICATIONS

20060325114419/https://studio.tellme.com/library2/code/ex-101/, GOOGLE-HDI-PA-0000909, (1 Page).

Tellme.Studio, "Magic 8-Ball," Capture timestamp (UTC): Wed, Nov. 6, 2019, Capture URL: https://web.archive.org/web/20060325114358/https://studio.tellme.com/library2/code/ex-115/, GOOGLE-HDI-PA-0000910, (2 Pages).

Tellme.Studio, "Recognizing User Input," Capture timestamp (UTC): Wed, Nov. 6, 2019, Capture URL: https://web.archive.org/web/20060325114323/https://studio.tellme.com/library2/code/ex-102/, GOOGLE-HDI-PA-0000912, (2 Pages).

Tellme.Studio, "Rock-Paper-Scissors," Capture timestamp (UTC): Wed, Nov. 6, 2019, Capture URL: https://web.archive.org/web/20060325114350/https://studio.tellme.com/library2/code/ex-111/, GOOGLE-HDI-PA-0000914, (2 Pages).

Tellme.Studio, "Screen Scraping to Voice Enable the Internet," Capture timestamp (UTC): Wed, Nov. 6, 2019, capture URL: https://web.archive.org/web/20060325114259/https://studio.tellme.com/library2/code/ex-117/, GOOGLE-HDI-PA-0000916, (6 Pages).

Tellme.Studio, "Using XSL Transformations to produce VoiceXML," Capture timestamp (UTC): Wed, Nov. 6, 2019, Capture URL: https://web.archive.org/web/20060325114445/https://studio.tellme.com/library2/code/ex-118/, GOOGLE-HDI-PA-0001005, (3 Pages).

Tellme.Studio, "Voice XML 2.x Essentials," Capture timestamp (UTC): Wed, Nov. 6, 2019, Capture URL: https://web.archive.org/web/20060325113724/https://studio.tellme.com/vxml2/ovw/essentials.html, GOOGLE-HDI-PA-0001008, (2 Pages).

HeyAnita Inc., "Content Delivery Service™ (CDS™)", Version 1.0, GOOGLE-HDI-PA-0001010, (4 Pages).

Ideal Group, Inc., "Hey Anita," Capture timestamp (UTC): Mon, Nov. 4, 2019, Capture URL: https://web.archive.org/web/20050214152354/http://www.ideal-group.org/demonstrations/hey_anita.htm, GOOGLE-HDI-PA-0001014, (4 Pages).

HeyAnita Inc., "Net2Phone and Hey Anita Launch Voice Dialing Service for Global ISP," Case Study, Nov. 10, 2001,GOOGLE-HDI-PA-0001018, (3 Pages).

HeyAnita Inc., "RMS™—Rapid Message Service, Version 2.0," GOOGLE-HDI-PA-0001021, (4 Pages).

HeyAnita Inc., "Case Study: Tier 1 U.S. Wireless Carrier Delivers Voice-Enhanced Services Utilizing HeyAnita's Flexible Technology," GOOGLE-HD I-PA-0001025 , (6 Pages).

Sharon Cleary, "Speak and You Shall Receive," Sep. 18, 2000, Dow Jones & Company, Inc., GOOGLE-HDI-PA-0001057, (5 Pages).

Adam Guy, "HeyAnita's Text Messaging with Voice Service Is Useable, Elegant and Addictive," Apr. 16, 2004, the Yankee Group, GOOGLE-HDI-PA-0001062, (2 Pages).

Juan E. Gilbert, et al., "Speech User Interfaces for Information Retrieval," Auburn University, Jan. 2003, GOOGLE-HDI-PA-0001064, (6 Pages).

Yifang Gu, et al., "The Development of a Voice System That Interacts With a Student Information Database," 2004, Auburn University, GOOGLE-HDI-PA-0001070, (5 Pages).

Yapin Zhong, "Voice Information Retrieval for Course Resources," Jan. 2003, Auburn University, GOOGLE-HDI-PA-0001075, (4 Pages).

Kevin Surace, "General Magic Serengeti (Portico) Demo—YouTube," Aug. 20, 2017, GOOGLE-HDI-PA-0001079, (3 Pages).

Maus Harus, "Navigation Bar," 1997-1998, General Magic, Inc., GOOGLE-HDI-PA-0001126, (1 Page).

Andrew Miller, "General Magic, Intervoice-Brite Announce Plans to Partner In," Feb. 4, 2002, GOOGLE-HDI-PA-0001127, (2 Pages).

General Magic, Inc., "General Magic," MagicTalk Technology, Capture timestamp (UTC): Tue, Nov. 5, 2019, Capture URL: https://web.archive.org/web/19990428131145/http://www.generalmagic.com/technology/vui.html, GOOGLE-HDI-PA-0001129, (1 Page).

Kevin Surace, "General Magic in the News (1998)—YouTube," Mar. 24, 2007, GOOGLE-HDI-PA-0001130, (3 Pages).

General Magic, Inc., "Navigation Bar—Portico Area," 1997-1998, GOOGLE-HDI-PA-0001133, (1 Page).

General Magic, Inc., "Portico—FAQs," 1997-1998, Capture timestamp (UTC): Tue, Nov. 5, 2019, GOOGLE-HDI-PA-0001134, (2 Pages).

General Magic, Inc., "Portico—features," 1997-1998, Capture timestamp (UTC): Tue, Nov. 5, 2019, GOOGLE-HDI-PA-0001136, (1 Page).

General Magic, Inc., "Portico—network operations," 1997-1998, Capture timestamp (UTC): Tue, Nov. 5, 2019, GOOGLE-HDI-PA-0001137, (1 Page).

General Magic, Inc., "Portico—overview," 1997-1998, Capture timestamp (UTC): Tue, Nov. 5, 2019,GOOGLE-GOOGLE-HDI-PA-0001138, (1 Page).

General Magic, Inc., "Portico—what it is," 1997-1998, Capture timestamp (UTC): Tue, Nov. 5, 2019,GOOGLE-GOOGLE-HDI-PA-0001139, (1 Page).

Voxeo Corporation, "2004 Overview," GOOGLE-HDI-PA-0001157, (15 Pages).

Voxeo Corporation, "Voxeo Unveils Prophecy, a Powerful Telephony Platform to Enable Cost-Effective Speech Application Development and Deployment," Jan. 31, 2006, GOOGLE-HDI-PA-0001172, (2 Pages).

Voxeo Corporation, "Pancyber," Capture timestamp (UTC): Wed, Nov. 6, 2019, , GOOGLE-HDI-PA-0001174, (1 Page).

Voxeo Corporation, "Unlock the Power of Open Standards," VoipCenter™ SIP Platform, GOOGLE-HDI-PA-0001202, (2 Pages).

Voxeo Corporation, Reliable, On-Demand IVR, 2002-2005, GOOGLE-HDI-PA-0001204, (1 Page).

Voxeo Corporation, "Over 14,000 Companies Reply on Voxeo for flexible, scalable IVR & VOIP," IVR Developers, Capture timestamp (UTC): Wed, Nov. 6, 2019, GOOGLE-HDI-PA-0001205, (2 Pages).

Voxeo Corporation, "How does it work?," Quick Start Guide, 2002-2005, GOOGLE-HDI-PA-0001207, (1 Page).

Voxeo Corporation, "VoiceXML and CCXML Platforms and Hosting Datasheet," Capture timestamp (UTC): Wed, Nov. 6, 2019, Capture URL: https://web.archive.org/web/20051213211846/http://www.voxeo.com/products/voicexml-ivr-datasheet.jsp, GOOGLE-HDI-PA-0001209, (2 Pages).

Voxeo Corporation, "VoipCenter SIP VOiP Platforms and Services," Capture timestamp (UTC): Wed, Nov. 6, 2019, Capture URL: https://web.archive.org/web/20051212031319/http://www.voxeo.com/products/voip-home.jsp, GOOGLE-HDI-PA-0001211, (2 Pages).

Tweb, "Dimension Data signs distribution agreement with Intervoice-Brite," Capture timestamp (UTC): Thu, Oct. 24, 2019, GOOGLE-HD I-PA-0003655, (2 Pages).

Intervoice-Brtie, Inc., "InterSoft Version 2 for Windows NT," GOOGLE-HDI-PA-0003659, (2 Pages).

Intervoice-Brtie, Inc., "2002 Annual Report," 2002, GOOGLE-HDI-PA-0003661, (104 Pages).

Intervoice-Brtie, Inc., "Intervoice-Brite IVR, Call Center, and Telephony Network Products and Services," Capture timestamp (UTC): Thu, Oct. 24, 2019, GOOGLE-HDI-PA-0003765, (1 Page).

Intervoice-Brtie, Inc., "Intervoice-Brite IVR, Call Center, and Telephony Network Products and Services," Capture timestamp (UTC): Thu, Oct. 24, 2019, GOOGLE-HDI-PA-0003766, (1 Page).

Palm, Inc., "Handbook for the Palm™ Tungsten™ T3 Handheld," 1998-2003, IPR Petition—U.S. Pat. No. 9,264,483, Amazon Exhibit 1021, (3 Pages).

Palm, Inc., "Palm, Inc., Using Your Palm® Treo™ 700w Smartphone," 2005, IPR Petition—U.S. Pat. No. 9,264,483, Amazon Exhibit 1022, (3 Pages).

3GPP, "3GPP TS 22.057 v6.0.0," Technical Specification, Jan. 2011, IPR Petition—U.S. Pat. No. 9,264,483, Amazon Exhibit 1023, (22 Pages).

The Institute of Electrical and Electronics Engineers, Inc., "Proceedings," Dec. 8-9, 1994, © 1995, IPR Petition—U.S. Pat. No. 9,264,483, Amazon Exhibit 1025, (9 Pages).

Todd Courtois, "Portal: A PDA-To-World-Wide-Web Interface," reprinted from the Jan./Feb. 1995 issue of PDA Developers 3.1, © 1995-1997, Creative Digital Publishing Inc., IPR Petition—U.S. Pat. No. 9,264,483, Amazon Exhibit 1026, (3 Pages).

Michael Moeller, "Motorola Newton device set to take wireless Notes. (SkyNotes Inc's PDA client software, middleware platform

(56) References Cited

OTHER PUBLICATIONS and suite of client-server Notes apps)," vol. 8, No. 42, ISSN: 0892-8118, Oct. 24, 1994, Ziff Davis Publishing, IPR Petition—U.S. Pat. No. 9,264,483, Amazon Exhibit 1027, (2 Pages).
GloMop Group, "GloMop: Global Mobile Computing by Proxy," Sep. 13, 1995, IPR Petition—U.S. Pat. No. 9,264,483, Amazon Exhibit 1028, (12 Pages).
Tim Berners-Lee, et al., "World-Wide Web: The Information Universe," 2007, Emerald Backfiles, IPR Petition—U.S. Pat. No. 9,264,483, Amazon Exhibit 1031, (7 Pages).
Tim Berners-Lee, et al., "The World-Wide Web," Aug. 1994, vol. 37 No. 8, Communications of the ACM, IPR Petition—U.S. Pat. No. 9,264,483, Amazon Exhibit 1032, (7 Pages).
Steve R. White, et al., "ABYSS: A Trusted Architecture for Software Protection," CH2416-6/87/0000/0038S0 © 1987, IEEE, IPR Petition—U.S. Pat. No. 9,264,483, Amazon Exhibit 1033, (14 Pages).
Bruce Lucas, "VoiceXML for Web-Based Distributed Conversational Applications," Sep. 2000, vol. 43, No. 9, Communications of the ACM, IPR Petition—U.S. Pat. No. 9,264,483, Amazon Exhibit 1038, (5 Pages).
Michael F. McTear, "Spoken Dialogue Technology: Enabling the Conversational User Interface," University of Ulster, Mar. 2002, vol. 34, No. 1, ACM Computing Surveys, IPR Petition—U.S. Pat. No. 9,264,483, Amazon Exhibit 1039, (80 Pages).
Philip R. Cohen, et al., "The role of voice input for human-machine communication," Colloquium Paper, vol. 92, Oct. 1995, Proc. Natl. Acad. Sci. USA, IPR Petition—U.S. Pat. No. 9,264,483, Amazon Exhibit 1040, (7 Pages).
"Jazz greats will be performing . . . ," Sep. 12, 1997, USA Today, IPR Petition—U.S. Pat. No. 9,264,483, Amazon Exhibit 1041, (1 Page).
"Stability of Control Systems with Time Delay," Oct. 1965, vol. 1 No. 8, Electronic Letters, IPR Petition—U.S. Pat. No. 9,264,483, Amazon Exhibit 1042, (2 Pages).
Brain Dear, "The friendly Orange Glow," 2017, Pantheon Books, USA, IPR Petition—U.S. Pat. No. 9,264,483, Amazon Exhibit 1043, (4 Pages).
"Oracle: Oracle announces Oracle8i Release 2; cites Oracle8i adoption as fastest of any previous release," Nov. 16, 1999, M2 Presswire, M2 Communications, Ltd., IPR Petition—U.S. Pat. No. 9,264,483, Amazon Exhibit 1044, (2 Pages).
IBM, "Simon Says Here's How!," Part No. 82G2557, User's Manual from BellSouth, Designed by IBM, Feb. 1994 (First Edition), USA, IPR Petition—U.S. Pat. No. 9,264,483, Amazon Exhibit 1045, (48 Pages).
Joel F. Bartlett, Experience with a Wireless World Wide Web Client, WRL Technical Note TN-46, Mar. 1995, Western Research Laboratory, IPR Petition—U.S. Pat. No. 9,264,483, Amazon Exhibit 1047, (10 Pages).
Petition for Inter Partes Review; *Amazon.com, Inc. v. Hammond Development International, Inc.*; U.S. Pat. No. 9,264,483, Case No. IPR2020-00460, filed Jan. 21, 2020, (89 Pages).
Petitioners Power of Attorney; *Amazon.com, Inc. v. Hammond Development International, Inc.*; U.S. Pat. No. 9,264,483, Case No. IPR2020-00460, filed Jan. 21, 2020, (3 Pages).
Open Mobile Alliance, Ltd., "Multimedia Messaging Service Encapsulation Protocol," Approved Version 1.1, OMA-WAP-MMS-ENC-V1_1-20040715-A, Jul. 15, 2004, IPR Petition—U.S. Pat. No. 9,264,483, Amazon Exhibit 1017, (68 Pages).
Defendant Google LLC's Preliminary Invalidity Disclosure of Invalidity Contentions, "Exhibit B26"—claim chart citing Prody Parrot™ by Mindmaker, Ltd. ("Prody Parrot"), Dec. 23, 2019, (21 Pages).
Defendant Google LLC's Preliminary Invalidity Disclosure of Invalidity Contentions, "Exhibit B27"—claim chart citing HAL2000, HAL Voice Portal, and HAL Deluxe by Home Automated Living ("HAL2000"), Dec. 23, 2019, (17 Pages).
Defendant Google LLC's Preliminary Invalidity Disclosure of Invalidity Contentions, "Exhibit C1"—claim chart citing U.S. Patent App. Pub. No. 2003/0216923 to Gilmore et al. (published Nov. 20, 2003) ("Gilmore"), Dec. 23, 2019, (51 Pages).
Defendant Google LLC's Preliminary Invalidity Disclosure of Invalidity Contentions, "Exhibit C2"—claim chart citing U.S. Patent App. Pub. No. 2003/0202504 A1 (published Oct. 30, 2003) ("Dhara"), Dec. 23, 2019, (30 Pages).
Defendant Google LLC's Preliminary Invalidity Disclosure of Invalidity Contentions, "Exhibit C3"—claim chart citing U.S. Patent App. Pub. No. 2004/0122941 A1, (published Jun. 24, 2004) ("Creamer") and/or U.S. Patent App. Pub. No. 2004/0120479 A1 (published Jun. 24, 2004) ("Creamer II"), Dec. 23, 2019, (20 Pages).
Defendant Google LLC's Preliminary Invalidity Disclosure of Invalidity Contentions, "Exhibit C4"—claim chart citing U.S. Pat. No. 6,269,336 B1 (issued Jul. 31, 2001) ("Ladd"), Dec. 23, 2019, (29 Pages).
Defendant Google LLC's Preliminary Invalidity Disclosure of Invalidity Contentions, "Exhibit C5"—claim chart citing U.S. Pat. No. 6,766,298 to Dodrill et al. (issued Jul. 20, 2004) ("Dodrill"), Dec. 23, 2019, (22 Pages).
Defendant Google LLC's Preliminary Invalidity Disclosure of Invalidity Contentions, "Exhibit C6"—claim chart citing U.S. Patent App. Pub. No. 2006/0256950 to Patel et al. (published Nov. 16, 2006) ("Patel"), Dec. 23, 2019, (14 Pages).
Defendant Google LLC's Preliminary Invalidity Disclosure of Invalidity Contentions, "Exhibit C7"—claim chart citing U.S. Patent Publication No. 2004/0071275 A1 to Bowater et al. (published Apr. 15, 2004) ("Bowater"), Dec. 23, 2019, (21 Pages).
Defendant Google LLC's Preliminary Invalidity Disclosure of Invalidity Contentions, "Exhibit C8"—claim chart citing U.S. Pat. No. 7,303,474 to Anderson et al. (published Dec. 30, 2004) ("Anderson"), Dec. 23, 2019, (17 Pages).
Defendant Google LLC's Preliminary Invalidity Disclosure of Invalidity Contentions, "Exhibit C9"—claim chart citing U.S. Pat. No. 8,073,697 to Cross, Jr. et al. (filed Sep. 12, 2006) ("Cross"), Dec. 23, 2019, (17 Pages).
Defendant Google LLC's Preliminary Invalidity Disclosure of Invalidity Contentions, "Exhibit C10"—claim chart citing TellMe Voice Portal (2000) ("TellMe Voice Portal system"), Dec. 23, 2019, (46 Pages).
Defendant Google LLC's Preliminary Invalidity Disclosure of Invalidity Contentions, "Exhibit C11"—claim chart citing HeyAnita system ("HeyAnita"), Dec. 23, 2019, (33 Pages).
Defendant Google LLC's Preliminary Invalidity Disclosure of Invalidity Contentions, "Exhibit C12"—claim chart citing Auburn University Research system (2003), Dec. 23, 2019, (29 Pages).
Defendant Google LLC's Preliminary Invalidity Disclosure of Invalidity Contentions, "Exhibit C13"—claim chart citing General Magic Portico (a.k.a. "Serengeti") system (1998) ("General Magic system"), Dec. 23, 2019, (52 Pages).
Defendant Google LLC's Preliminary Invalidity Disclosure of Invalidity Contentions, "Exhibit C14"—claim chart citing Voxeo Prophecy Interactive Voice Response (IVR) Platform and/or VoiceCenter IVR Platform (1999) ("Voxeo system"), Dec. 23, 2019, (40 Pages).
Defendant Google LLC's Preliminary Invalidity Disclosure of Invalidity Contentions, "Exhibit C15"—claim chart citing Genesys Voice Platform 7.0 (2004) ("GVP system"), Dec. 23, 2019, (57 Pages).
Defendant Google LLC's Preliminary Invalidity Disclosure of Invalidity Contentions, "Exhibit C17"—claim chart citing IBM Websphere Voice Server and Platform, and Related Systems ("IBM Websphere") and Kempny et al., IBM Websphere Voice Systems Solutions (Redbooks 2003) ("Kempny"), Dec. 23, 2019, (31 Pages).
Defendant Google LLC's Preliminary Invalidity Disclosure of Invalidity Contentions, "Exhibit C18"—claim chart citing OneVoice by InterVoice-Brite ("OneVoice"), Dec. 23, 2019, (19 Pages).
Defendant Google LLC's Preliminary Invalidity Disclosure of Invalidity Contentions, "Exhibit C19"—claim chart citing Nuance Voice Platform 3.0 ("Nuance Voice Platform"), Dec. 23, 2019, (21 Pages).
Defendant Google LLC's Preliminary Invalidity Disclosure of Invalidity Contentions, "Exhibit C20"—claim chart citing Avaya Voice Portal by Avaya Inc. ("Avaya Voice Portal"), Dec. 23, 2019, (41 Pages).

(56) References Cited

OTHER PUBLICATIONS

Defendant Google LLC's Preliminary Invalidity Disclosure of Invalidity Contentions, "Exhibit C21"—claim chart citing Cisco iOS VoiceXML Gateway and VoiceXML Solution Infrastructure ("Cisco VoiceXML Gateway"), Dec. 23, 2019, (26 Pages).

Defendant Google LLC's Preliminary Invalidity Disclosure of Invalidity Contentions, "Exhibit C22"—claim chart citing VeraServ system by Verascape, Inc. ("VeraServ"), Dec. 23, 2019, (24 Pages).

Defendant Google LLC's Preliminary Invalidity Disclosure of Invalidity Contentions, "Exhibit C23"—claim chart citing TuVox voice applications platform including CVR ("TuVox"), Dec. 23, 2019, (17 Pages).

Defendant Google LLC's Preliminary Invalidity Disclosure of Invalidity Contentions, "Exhibit C24"—claim chart citing The Open Agent Architecture™ by Stanford Research Institute ("OAA"), Dec. 23, 2019, (26 Pages).

Defendant Google LLC's Preliminary Invalidity Disclosure of Invalidity Contentions, "Exhibit C25"—claim chart citing BeVocal system (2002) ("BeVocal"), Dec. 23, 2019, (33 Pages).

Defendant Google LLC's Preliminary Invalidity Disclosure of Invalidity Contentions, "Exhibit C26"—Prody Parrot™ by Mindmaker, Ltd. ("Prody Parrot"), Dec. 23, 2019, (26 Pages).

Defendant Google LLC's Preliminary Invalidity Disclosure of Invalidity Contentions, "Exhibit C27"—claim chart citing HAL2000, HAL Voice Portal, and HAL Deluxe by Home Automated Living ("HAL2000"), Dec. 23, 2019, (18 Pages).

Defendant Google LLC's Preliminary Invalidity Disclosure of Invalidity Contentions, "Exhibit D1"—claim chart citing U.S. Patent App. Pub. No. 2003/0216923 to Gilmore et al. (published Nov. 20, 2003) ("Gilmore"), Dec. 23, 2019, (50 Pages).

Defendant Google LLC's Preliminary Invalidity Disclosure of Invalidity Contentions, "Exhibit D2"—claim chart citing U.S. Patent App. Pub. No. 2003/0202504 A1 (published Oct. 30, 2003) ("Dhara"), Dec. 23, 2019, (42 Pages).

Defendant Google LLC's Preliminary Invalidity Disclosure of Invalidity Contentions, "Exhibit D3"—claim chart citing U.S. Patent App. Pub. No. 2004/0122941 A1, (published Jun. 24, 2004) ("Creamer") and/or U.S. Patent App. Pub. No. 2004/0120479 A1 (published Jun. 24, 2004) ("Creamer II"), Dec. 23, 2019, (26 Pages).

Defendant Google LLC's Preliminary Invalidity Disclosure of Invalidity Contentions, "Exhibit D4"—claim chart citing U.S. Pat. No. 6,269,336 B1 (issued Jul. 31, 2001) ("Ladd"), Dec. 23, 2019, (39 Pages).

Defendant Google LLC's Preliminary Invalidity Disclosure of Invalidity Contentions, "Exhibit D5"—claim chart citing U.S. Pat. No. 6,766,298 to Dodrill et al. (issued Jul. 20, 2004) ("Dodrill"), Dec. 23, 2019, (25 Pages).

Defendant Google LLC's Preliminary Invalidity Disclosure of Invalidity Contentions, "Exhibit D6"—claim chart citing U.S. Patent App. Pub. No. 2006/0256950 to Patel et al. (published Nov. 16, 2006) ("Patel"), Dec. 23, 2019, (18 Pages).

Defendant Google LLC's Preliminary Invalidity Disclosure of Invalidity Contentions, "Exhibit D7"—claim chart citing U.S. Patent Publication No. 2004/0071275 A1 to Bowater et al. (published Apr. 15, 2004) ("Bowater"), Dec. 23, 2019, (23 Pages).

Defendant Google LLC's Preliminary Invalidity Disclosure of Invalidity Contentions, "Exhibit D8"—claim chart citing U.S. Pat. No. 7,303,474 to Anderson et al. (published Dec. 30, 2004) ("Anderson"), Dec. 23, 2019, (26 Pages).

Defendant Google LLC's Preliminary Invalidity Disclosure of Invalidity Contentions, "Exhibit D9"—claim chart citing U.S. Pat. No. 8,073,697 to Cross, Jr. et al. (filed Sep. 12, 2006) ("Cross"), Dec. 23, 2019, (25 Pages).

Defendant Google LLC's Preliminary Invalidity Disclosure of Invalidity Contentions, "Exhibit D10"—claim chart citing TellMe Voice Portal (2000) ("TellMe Voice Portal system"), Dec. 23, 2019, (50 Pages).

Defendant Google LLC's Preliminary Invalidity Disclosure of Invalidity Contentions, "Exhibit D11"—claim chart citing HeyAnita system ("HeyAnita"), Dec. 23, 2019, (45 Pages).

Defendant Google LLC's Preliminary Invalidity Disclosure of Invalidity Contentions, "Exhibit D12"—claim chart citing Auburn University Research system (2003), Dec. 23, 2019, (35 Pages).

Defendant Google LLC's Preliminary Invalidity Disclosure of Invalidity Contentions, "Exhibit D13"—claim chart citing General Magic Portico (a.k.a. "Serengeti") system (1998) ("General Magic system"), Dec. 23, 2019, (65 Pages).

Defendant Google LLC's Preliminary Invalidity Disclosure of Invalidity Contentions, "Exhibit D14"—claim chart citing Voxeo Prophecy Interactive Voice Response (IVR) Platform and/or VoiceCenter IVR Platform (1999) ("Voxeo system"), Dec. 23, 2019, (48 Pages).

Defendant Google LLC's Preliminary Invalidity Disclosure of Invalidity Contentions, "Exhibit D15"—claim chart citing Genesys Voice Platform 7.0 (2004) ("GVP system"), Dec. 23, 2019, (65 Pages).

Defendant Google LLC's Preliminary Invalidity Disclosure of Invalidity Contentions, "Exhibit D17"—claim chart citing IBM Websphere Voice Server and Platform, and Related Systems ("IBM Websphere") and Kempny et al., IBM Websphere Voice Systems Solutions (Redbooks 2003) ("Kempny"), Dec. 23, 2019, (39 Pages).

Defendant Google LLC's Preliminary Invalidity Disclosure of Invalidity Contentions, "Exhibit D18"—claim chart citing OneVoice by InterVoice-Brite ("OneVoice"), Dec. 23, 2019, (21 Pages).

Defendant Google LLC's Preliminary Invalidity Disclosure of Invalidity Contentions, "Exhibit D19"—claim chart citing Nuance Voice Platform 3.0 ("Nuance Voice Platform"), Dec. 23, 2019, (25 Pages).

Defendant Google LLC's Preliminary Invalidity Disclosure of Invalidity Contentions, "Exhibit D20"—claim chart citing Avaya Voice Portal by Avaya Inc. ("Avaya Voice Portal"), Dec. 23, 2019, (42 Pages).

Defendant Google LLC's Preliminary Invalidity Disclosure of Invalidity Contentions, "Exhibit D21"—claim chart citing Cisco iOS VoiceXML Gateway and VoiceXML Solution Infrastructure ("Cisco VoiceXML Gateway"), Dec. 23, 2019, (38 Pages).

Defendant Google LLC's Preliminary Invalidity Disclosure of Invalidity Contentions, "Exhibit D22"—claim chart citing VeraServ system by Verascape, Inc. ("VeraServ"), Dec. 23, 2019, (30 Pages).

Defendant Google LLC's Preliminary Invalidity Disclosure of Invalidity Contentions, "Exhibit D23"—claim chart citing TuVox voice applications platform including CVR ("TuVox"), Dec. 23, 2019, (19 Pages).

Defendant Google LLC's Preliminary Invalidity Disclosure of Invalidity Contentions, "Exhibit A1"—claim chart citing U.S. Patent App. Pub. No. 2003/0216923 to Gilmore et al. (published Nov. 20, 2003) ("Gilmore"), Dec. 23, 2019, (60 Pages).

Defendant Google LLC's Preliminary Invalidity Disclosure of Invalidity Contentions, "Exhibit A2"—claim chart citing U.S. Patent App. Pub. No. 2003/0202504 A1 (published Oct. 30, 2003) ("Dhara"), Dec. 23, 2019, (38 Pages).

Defendant Google LLC's Preliminary Invalidity Disclosure of Invalidity Contentions, "Exhibit A3"—claim chart citing U.S. Patent App. Pub. No. 2004/0122941 A1 (published Jun. 24, 2004) ("Creamer") and/or U.S. Patent App. Pub. No. 2004/0120479 A1 (published Jun. 24, 2004) ("Creamer II"), Dec. 23, 2019, (24 Pages).

Defendant Google LLC's Preliminary Invalidity Disclosure of Invalidity Contentions, "Exhibit A4"—claim chart citing U.S. Pat. No. 6,269,336 B1 (issued Jul. 31, 2001) ("Ladd"), Dec. 23, 2019, (33 Pages).

Defendant Google LLC's Preliminary Invalidity Disclosure of Invalidity Contentions, "Exhibit A5"—claim chart citing U.S. Pat. No. 6,766,298 to Dodrill et al. (issued Jul. 20, 2004) ("Dodrill"), Dec. 23, 2019, (25 Pages).

Defendant Google LLC's Preliminary Invalidity Disclosure of Invalidity Contentions, "Exhibit A6"—claim chart citing U.S. Patent App. Pub. No. 2006/0256950 to Patel et al. (published Nov. 16, 2006) ("Patel"), Dec. 23, 2019, (16 Pages).

Defendant Google LLC's Preliminary Invalidity Disclosure of Invalidity Contentions, "Exhibit A7"—claim chart citing U.S. Patent Publication No. 2004/0071275 A1 to Bowater et al. (published Apr. 15, 2004) ("Bowater"), Dec. 23, 2019, (24 Pages).

Defendant Google LLC's Preliminary Invalidity Disclosure of Invalidity Contentions, "Exhibit A8"—claim chart citing U.S. Pat.

(56) References Cited

OTHER PUBLICATIONS

No. 7,303,474 to Anderson et al. (published Dec. 30, 2004) ("Anderson"), Dec. 23, 2019, (20 Pages).
Defendant Google LLC's Preliminary Invalidity Disclosure of Invalidity Contentions, "Exhibit A9"—claim chart citing U.S. Pat. No. 8,073,697 to Cross, Jr. et al. (filed Sep. 12, 2006) ("Cross"), Dec. 23, 2019, (19 Pages).
Defendant Google LLC's Preliminary Invalidity Disclosure of Invalidity Contentions, "Exhibit A10"—claim chart citing TellMe Voice Portal (2000) ("TellMe Voice Portal system"), Dec. 23, 2019, (46 Pages).
Defendant Google LLC's Preliminary Invalidity Disclosure of Invalidity Contentions, "Exhibit A11"—claim chart citing HeyAnita system ("HeyAnita"), Dec. 23, 2019, (41 Pages).
Defendant Google LLC's Preliminary Invalidity Disclosure of Invalidity Contentions, "Exhibit A12"—claim chart citing TAuburn University Research system (2003), Dec. 23, 2019, (36 Pages).
Defendant Google LLC's Preliminary Invalidity Disclosure of Invalidity Contentions, "Exhibit A13"—claim chart citing General Magic Portico (a.k.a. "Serengeti") system (1998) ("General Magic system"), Dec. 23, 2019, (62 Pages).
Defendant Google LLC's Preliminary Invalidity Disclosure of Invalidity Contentions, "Exhibit A14"—claim chart citing Voxeo Prophecy Interactive Voice Response (IVR) Platform and/or VoiceCenter IVR Platform (1999) ("Voxeo system"), Dec. 23, 2019, (34 Pages).
Defendant Google LLC's Preliminary Invalidity Disclosure of Invalidity Contentions, "Exhibit A15"—claim chart citing Genesys Voice Platform 7.0 (2004) ("GVP system"), Dec. 23, 2019, (65 Pages).
Defendant Google LLC's Preliminary Invalidity Disclosure of Invalidity Contentions, "Exhibit A17"—claim chart citing IBM Websphere Voice Server and Platform, and Related Systems ("IBM Websphere") and Kempny et al., IBM Websphere Voice Systems Solutions (Redbooks 2003) ("Kempny"), Dec. 23, 2019, (35 Pages).
Defendant Google LLC's Preliminary Invalidity Disclosure of Invalidity Contentions, "Exhibit A18"—claim chart citing OneVoice by InterVoice-Brite ("OneVoice"), Dec. 23, 2019, (20 Pages).
Defendant Google LLC's Preliminary Invalidity Disclosure of Invalidity Contentions, "Exhibit A19"—claim chart citing Nuance Voice Platform 3.0 ("Nuance Voice Platform"), Dec. 23, 2019, (22 Pages).
Defendant Google LLC's Preliminary Invalidity Disclosure of Invalidity Contentions, "Exhibit A20"—claim chart citing Avaya Voice Portal by Avaya Inc. ("Avaya Voice Portal"), Dec. 23, 2019, (43 Pages).
Defendant Google LLC's Preliminary Invalidity Disclosure of Invalidity Contentions, "Exhibit A21"—claim chart citing Cisco iOS VoiceXML Gateway and VoiceXML Solution Infrastructure ("Cisco VoiceXML Gateway"), Dec. 23, 2019, (26 Pages).
Defendant Google LLC's Preliminary Invalidity Disclosure of Invalidity Contentions, "Exhibit A22"—claim chart citing VeraServ System by Verascape, Inc. ("VeraServ"), Dec. 23, 2019, (34 Pages).
Defendant Google LLC's Preliminary Invalidity Disclosure of Invalidity Contentions, "Exhibit A23"—claim chart citing TuVox voice applications platform including CVR ("TuVox"), Dec. 23, 2019, (18 Pages).
Defendant Google LLC's Preliminary Invalidity Disclosure of Invalidity Contentions, "Exhibit A24"—claim chart citing the Open Agent Architecture™ by Stanford Research Institute ("OAA"), Dec. 23, 2019, (31 Pages).
Defendant Google LLC's Preliminary Invalidity Disclosure of Invalidity Contentions, "Exhibit A25"—claim chart citing TBeVocal system (2002) ("BeVocal"), Dec. 23, 2019, (30 Pages).
Defendant Google LLC's Preliminary Invalidity Disclosure of Invalidity Contentions, "Exhibit A26"—claim chart citingclaim chart citing Prody Parrot™ by Mindmaker, Ltd. ("Prody Parrot"), Dec. 23, 2019, (29 Pages).
Defendant Google LLC's Preliminary Invalidity Disclosure of Invalidity Contentions, "Exhibit A27"—claim chart citing HAL2000, HAL Voice Portal, and HAL Deluxe by Home Automated Living ("HAL2000"), Dec. 23, 2019, (21 Pages).
Defendant Google LLC's Preliminary Invalidity Disclosure of Invalidity Contentions, "Exhibit B1"—claim chart citing U.S. Patent App. Pub. No. 2003/0216923 to Gilmore et al. (published Nov. 20, 2003) ("Gilmore"), Dec. 23, 2019, (41 Pages).
Defendant Google LLC's Preliminary Invalidity Disclosure of Invalidity Contentions, "Exhibit B2"—claim chart citing U.S. Patent App. Pub. No. 2003/0202504 A1 (published Oct. 30, 2003) ("Dhara"), Dec. 23, 2019, (25 Pages).
Defendant Google LLC's Preliminary Invalidity Disclosure of Invalidity Contentions, "Exhibit B3"—claim chart citing U.S. Patent App. Pub. No. 2004/0122941 A1 (published Jun. 24, 2004) ("Creamer") and/or U.S. Patent App. Pub. No. 2004/0120479 A1 (published Jun. 24, 2004) ("Creamer II"), Dec. 23, 2019, (21 Pages).
Defendant Google LLC's Preliminary Invalidity Disclosure of Invalidity Contentions, "Exhibit B4"—claim chart citing U.S. Pat. No. 6,269,336 B1 (issued Jul. 31, 2001) ("Ladd"), Dec. 23, 2019, (21 Pages).
Defendant Google LLC's Preliminary Invalidity Disclosure of Invalidity Contentions, "Exhibit B5"—claim chart citing U.S. Pat. No. 6,766,298 to Dodrill et al. (issued Jul. 20, 2004) ("Dodrill"), Dec. 23, 2019, (17 Pages).
Defendant Google LLC's Preliminary Invalidity Disclosure of Invalidity Contentions, "Exhibit B6"—claim chart citing U.S. Patent App. Pub. No. 2006/0256950 to Patel et al. (published Nov. 16, 2006) ("Patel"), Dec. 23, 2019, (14 Pages).
Defendant Google LLC's Preliminary Invalidity Disclosure of Invalidity Contentions, "Exhibit B7"—claim chart citing U.S. Patent Publication No. 2004/0071275 A1 to Bowater et al. (published Apr. 15, 2004) ("Bowater"), Dec. 23, 2019, (17 Pages).
Defendant Google LLC's Preliminary Invalidity Disclosure of Invalidity Contentions, "Exhibit B8"—claim chart citing U.S. Pat. No. 7,303,474 to Anderson et al. (published Dec. 30, 2004) ("Anderson"), Dec. 23, 2019, (15 Pages).
Defendant Google LLC's Preliminary Invalidity Disclosure of Invalidity Contentions, "Exhibit B9"—claim chart citing U.S. Pat. No. 8,073,697 to Cross, Jr. et al. (filed Sep. 12, 2006) ("Cross"), Dec. 23, 2019, (16 Pages).
Defendant Google LLC's Preliminary Invalidity Disclosure of Invalidity Contentions, "Exhibit B10"—claim chart citing UTellMe Voice Portal (2000) ("TellMe Voice Portal system"), Dec. 23, 2019, (42 Pages).
Defendant Google LLC's Preliminary Invalidity Disclosure of Invalidity Contentions, "Exhibit B11"—claim chart citing HeyAnita system ("HeyAnita"), Dec. 23, 2019, (30 Pages).
Defendant Google LLC's Preliminary Invalidity Disclosure of Invalidity Contentions, "Exhibit B12"—claim chart citing Auburn University Research system (2003), Dec. 23, 2019, (25 Pages).
Defendant Google LLC's Preliminary Invalidity Disclosure of Invalidity Contentions, "Exhibit B13"—claim chart citing General Magic Portico (a.k.a. "Serengeti") system (1998) ("General Magic system"), Dec. 23, 2019, (49 Pages).
Defendant Google LLC's Preliminary Invalidity Disclosure of Invalidity Contentions, "Exhibit B14"—claim chart citing Voxeo Prophecy Interactive Voice Response (IVR) Platform and/or VoiceCenter IVR Platform (1999) ("Voxeo system"), Dec. 23, 2019, (28 Pages).
Defendant Google LLC's Preliminary Invalidity Disclosure of Invalidity Contentions, "Exhibit B15"—claim chart citing Genesys Voice Platform 7.0 (2004) ("GVP system"), Dec. 23, 2019, (51 Pages).
Defendant Google LLC's Preliminary Invalidity Disclosure of Invalidity Contentions, "Exhibit B17"—claim chart citing IBM Websphere Voice Server and Platform, and Related Systems ("IBM Websphere") and Kempny et al., IBM Websphere Voice Systems Solutions (Redbooks 2003) ("Kempny"), Dec. 23, 2019, (29 Pages).
Defendant Google LLC's Preliminary Invalidity Disclosure of Invalidity Contentions, "Exhibit B18"—claim chart citing OneVoice by InterVoice-Brite ("OneVoice"), Dec. 23, 2019,(16 Pages).
Defendant Google LLC's Preliminary Invalidity Disclosure of Invalidity Contentions, "Exhibit B19"—claim chart citing Nuance Voice Platform 3.0 ("Nuance Voice Platform"), Dec. 23, 2019, (15 Pages).

(56) References Cited

OTHER PUBLICATIONS

Defendant Google LLC's Preliminary Invalidity Disclosure of Invalidity Contentions, "Exhibit B20"—claim chart citing Avaya Voice Portal by Avaya Inc. ("Avaya Voice Portal"), Dec. 23, 2019, (38 Pages).
Defendant Google LLC's Preliminary Invalidity Disclosure of Invalidity Contentions, "Exhibit B21"—claim chart citing Cisco iOS VoiceXML Gateway and VoiceXML Solution Infrastructure ("Cisco VoiceXML Gateway"), Dec. 23, 2019, (20 Pages).
Defendant Google LLC's Preliminary Invalidity Disclosure of Invalidity Contentions, "Exhibit B22"—claim chart citing the VeraServ system by Verascape, Inc. ("VeraServ"), Dec. 23, 2019, (25 Pages).
Defendant Google LLC's Preliminary Invalidity Disclosure of Invalidity Contentions, "Exhibit B23"—claim chart citing TuVox voice applications platform including CVR ("TuVox"), Dec. 23, 2019, (13 Pages).
Defendant Google LLC's Preliminary Invalidity Disclosure of Invalidity Contentions, "Exhibit B24"—claim chart citing The Open Agent Architecture™ by Stanford Research Institute ("OAA"), Dec. 23, 2019, (22 Pages).
Defendant Google LLC's Preliminary Invalidity Disclosure of Invalidity Contentions, "Exhibit B25"—claim chart citing BeVocal system (2002) ("BeVocal"), Dec. 23, 2019, (27 Pages).
Philip Greenspun, "Chapter 2: So You Want to Join the World's Grubbiest Club: Internet Entrepreneurs," part of Database-backed Web Sites, 2nd Edition, AMZN_HDI_022765, (13 Pages).
Philip Greenspun, "Chapter 8: Java and Shockwave—The <BLINK> Tag Writ Large," part of Database-backed Web Sites, AMZN_HDI_022778, (8 Pages).
Philip Greenspun, "Chapter 14: Sites That Don't Work (And How to Fix Them)," part of Database-backed Web Sites, AMZN_HDI_022792, (8 Pages).
Philip Greenspun, "Chapter 7: Learning from Server Logs," part of Database-backed Web Sites, 2nd Edition, AMZN_HDI_022800, (11 Pages).
Philip Greenspun, "Chapter 3: Learn to Program HTML in 21 Minutes," part of Database-backed Web Sites, 2nd Edition, AMZN_HDI_022811, (8 Pages).
Philip Greenspun, "Chapter 9: Sites That Are Really Programs," part of Database-backed Web Sites, 2nd Edition, AMZN_HDI_022819, (11 Pages).
Philip Greenspun, "Chapter 5: Publicizing Your Site (Without Irritating Everyone on the Net)," part of Database-packed Web Sites, 2nd Edition, AMZN_HDI_022830, (8 Pages).
Philip Greenspun, "Chapter 13: Case Studies," part of Database-backed Web Sites, 2nd Edition, AMZN_HDI_022838, (20 Pages).
Philip Greenspun, "Chapter 10: When is a Site Really a Database?," part of Database-backed Web Sites, 2nd Edition, AMZN_HDI_022858, (6 Pages).
Philip Greenspun, "Chapter 13: Interfacing a Relational Database to the Web," part of Philip and Alex's Guide to Web Publishing, AMZN_HDI_022864, (19 Pages).
Philip Greenspun, "Chapter 8: So You Want to Run Your Own Server," part of Philip and Alex's Guide to Web Publishing, Revised May 2008, AMZN_HDI_022883, (12 Pages).
Daniel M. Dias, et al., "A Scalable and Highly Available Web Server," IBM Research Division, 1996, Computer Science, Published in COMPCON '96, AMZN_HDI_023276, (8 Pages).
IBM, "IBM Embedded ViaVoice Mobility Suite," 2001, AMZN_HDI_023325, (2 Pages).
Paul Robertson, "Flash and database communication Part 1: Using URL Variables and Flash Vars," Feb. 14, 2005, AMZN_HDI_023327, (12 Pages).
John F. McGowan, "AVI Overview: AVI and the Worldwide Web," 2000, AMZN_HDI_023348, (24 Pages).
James A. Larson, "Speech-enabled Appliances," Nov./Dec. 2000, AMZN_HDI_024536, (7 Pages).
IBM, "IBM Embedded ViaVoice," 2007, AMZN_HDI_024543, (2 Pages).

James H. Pence, "How to Do Everything with HTML," Osborne/McGraw-Hill, 2001, AMZN_HDI_024582, (529 Pages).
WAP™ WSP, "Wireless Application Protocol Wireless Session Protocol Specification," WAP-230-WSP, Approved Version Jul. 5, 2001, publisher Wireless Application Protocol Forum, Ltd., AMZN_HDI_019672, (131 Pages).
R. Fielding, et al., "Hypertext Transfer Protocol—HTTP/1.1," RFC 2616, Network Working Group, Jun. 1999, AMZN_HDI_012874, (176 Pages).
Information Sciences Institute University of Southern California, "Transmission Control Protocol," RFC: 793, Darpa Internet Program, Protocol Specification, Sep. 1981, AMZN_HDI_013050, (176 Pages).
E. Rescorla, "HTTP Over TLS," RFC 2818, Network Working Group, 2000, AMZN_HDI_012704, (8 Pages).
Open Mobile Alliance, Ltd., "MMS Conformance Document," Approved Version 1.2, OMA-M MS-CONF-V1_2-20050301-A, Mar. 1, 2005, AMZN_HDI_00894, (48 Pages).
Information Sciences Institute University of Southern California, "Internet Protocol," RFC 791, Darpa Internet Program, Protocol Specification, Sep. 1981, AMZN_HDI_013226, (97 Pages).
J. Rosenberg, et al., "SIP: Session Initiation Protocol," Network Working Group, Jun. 2002, AMZN_HDI_013324, (pp. 269).
J. Lazzaro, "Framing Real-time Transport Protocol (RTP) and RTP Control Protocol (RTCP) Packets over Connection-Oriented Transport," RFC 4571, Network Working Group, Jul. 2006, AMZN_HDI_012865, (9 Pages).
HTML 4.01 Chapter 13, "13 Objects, Images, and Applets," AMZN_HDI_008296, (20 Pages).
W3C®, "Voice Extensible Markup Language (VoiceXML) Version 2.0," W3C Recommendation Mar. 16, 2004, AMZN_HDI_019351, (159 Pages).
TCP/IP Network Administration, "Delivering the Data," Chapter 2, AMZN_HDI_021317, (4 Pages).
T. Lemon, "Node-specific Client Identifiers for Dynamic Host Configuration Protocol Version Four (DHCPv4)," RFC 4361, Network Working Group, Feb. 2006, AMZN_HDI_023375, (12 Pages).
Dejan Sunderic, et al., "SQL Server 2000," 2001, publisher Osborne/McGraw-Hill, HDI_014455, (752 Pages).
W3C®, "Extensible Markup Language (XML) 1,0 (Fourth Edition)," W3C Recommendation Aug. 16, 2006, edited in place Sep. 29, 2006, AMZN_HDI_023284, (39 Pages).
W3C®, "HTML 4001 Specification," W3C Proposed Recommendation, Aug. 24, 1999, AMZN_HDI_023452, (389 Pages).
T. Berners-Lee, et al., "Uniform Resource Identifier (URI): Generic Syntax," RFC 3986, Network Working Group, Jul. 2006, AMZN_HDI_023391, (61 Pages).
Daniel Coffman, et al., "Conversational Browser and Virtual Machine," U.S. Appl. No. 60/102,957, filed Oct. 2, 1998, AMZN_HDI_014148, (75 Pages).
Daniel Coffman, et al., "Conversational Browser and Virtual Machine," U.S. Appl. No. 60/102,957, filed Oct. 2, 1998, and PCT Application No. PCT/US99/23008, AMZN_HDI_018034, (76 Pages).
Daniel Coffman, et al., "Conversational Browser and Virtual Machine," U.S. Appl. No. 60/117,595, filed Jan. 27, 1999, AMZN_HDI_018172, (114 Pages).
Intervoice-Brtie, Inc., "Intervoice-Brite IVR, Call Center, and Telephony Network Products and Services," Capture timestamp (UTC): Thu, Oct. 24, 2019, GOOGLE-HDI-PA-0003767, (1 Page).
Intervoice-Brtie, Inc., "System Management Tools," 2002, GOOGLE-HDI-PA-0003768, (2 Pages).
Nuance, "Nuance Application Environment™," 2005, GOOGLE-HDI-PA-0003770, (1 Page).
Nuance, "Nuance Flexible Application Suites™ (Nuance FASt™)," 2005, GOOGLE-HDI-PA-0003771, (1 Page).
Nuance, "Nuance V-Builder™ 2.0," 2004, GOOGLE-HDI-PA-0003772, (1 Page).
Nuance, "Nuance V-Builder™ 2.0 Technical Data Sheet," GOOGLE-HDI-PA-0003773, (2 Pages).
Nuance, "Nuance Verifier™ 3.5 Data Sheet," GOOGLE-HDI-PA-0003775, (2 Pages).
Nuance, "Nuance Vocalizer™ 4.0 Data Sheet," GOOGLE-HDI-PA-0003777, (2 Pages).

(56) References Cited

OTHER PUBLICATIONS

Nuance, "Nuance Voice Platform™ 3.0 Data Sheet," GOOGLE-HDI-PA-0003779, (7 Pages).
Nuance, "Nuance Voice Platform™ 3.0," 2005, GOOGLE-HDI-PA-0003786, (2 Pages).
Verascape, Inc., "Verascape Advantages," 2004, GOOGLE-HDI-PA-0004149, (2 Pages).
Verascape, Inc., "Typical Voice-Enabled Applications," GOOGLE-HDI-PA-0004151, (1 Page).
Verascape, Inc., "VeraServ™ Call Push," GOOGLE-HDI-PA-0004152, (2 Pages).
Verascape, Inc., "Verascape Vertical Catalog Industry Self-Service Voice Applications," GOOGLE-HDI-PA-0004154, (1 Page).
Verascape, Inc., "Frequently Asked Questions," Capture timestamp (UTC): Thu, Oct. 24, 2019, GOOGLE-HDI-PA-0004155, (2 Pages).
Verascape, Inc., "VeraServ Fast Start™ Platform," 2004, GOOGLE-HDI-PA-0004157, (2 Pages).
Verascape, Inc., "Financial Services Solutions," GOOGLE-HDI-PA-0004159, (1 Page).
Verascape, Inc., "Hosted Solutions," GOOGLE-HDI-PA-0004160, (1 Page).
Verascape, Inc., "Partners," Capture timestamp (UTC): Thu, Oct. 24, 2019, GOOGLE-HDI-PA-0004161, (2 Page).
Verascape, Inc., "Premise-Based Solutions," Capture timestamp (UTC): Thu, Oct. 24, 2019, GOOGLE-HDI-PA-0004163, (1 Page).
Verascape, Inc., "VeraServ™ Platform," 2004, GOOGLE-HDI-PA-0004164, (2 Pages).
Verascape, Inc., "Programming Interface," GOOGLE-HDI-PA-0004166, (1 Page).
TuVox, Inc., "TuVox and Veraacape Establish Strategic Alliance; Partnership Leverages Best of Breed Speech Application and VXML Platform Technologies to Deliver Packaged Solutions," Mar. 25, 2004, GOOGLE-HDI-PA-0004167, (1 Page).
Verascape, Inc., "VeraServ Components," GOOGLE-HDI-PA-0004168, (1 Page).
TuVox, Inc., "With TuVox, Gift Advisor Spend More Time on Revenue-Generating Calls," 2005, GOOGLE-HDI-PA-0004169, (2 Pages).
TuVox, Inc., "TuVox's Speech Application Paid for Itself in the First Month—and Handles Greater Call Volumes," 2005, GOOGLE-HDI-PA-0004171, (2 Pages).
TuVox, Inc., "Retail Banking," TuVox Speech Applications for Financial Services, Capture timestamp (UTC): Fri, Oct. 18, 2019, GOOGLE-HDI-PA-0004174, (1 Page).
TMC News, "Tuvox Announces CVR 3.0 Conversational Speech Applications," Oct. 1, 2003, GOOGLE-HDI-PA-0004175, (2 Pages).
TuVox, Inc., "TuVox CVR (Consersational Voice Response)—Lifecycle Management Tools," Capture timestamp (UTC): Fri, Oct. 18, 2019, GOOGLE-HDI-PA-0004177, (1 Page).
TuVox, Inc., "TuVox—Enterprise Speech Applications," Capture timestamp (UTC): Fri, Oct. 18, 2019, GOOGLE-HDI-PA-0004178, (1 Page).
TuVox, Inc., "Different Approaches to IVR," Capture timestamp (UTC): Fri, Oct. 18, 2019, GOOGLE-HDI-PA-0004179, (1 Page).
TuVox, Inc., "Four Key Advantages," Capture timestamp (UTC): Fri, Oct. 18, 2019, GOOGLE-HDI-PA-0004180, (1 Page).
TuVox, Inc., "TuVox—On Demand," Capture timestamp (UTC): Fri, Oct. 18, 2019, GOOGLE-HDI-PA-0004181, (1 Page).
TuVox, Inc., "On Premiss or on Demand," Capture timestamp (UTC): Fri, Oct. 18, 2019, GOOGLE-HDI-PA-0004182, (1 Page).
TuVox, Inc., "TuVox Product Summary," Capture timestamp (UTC): Fri, Oct. 18, 2019, GOOGLE-HDI-PA-0004183, (1 Page).
TuVox, Inc., "Leading U.S. Telecommunications Company Dials Up TuVox Enterprise Speech Solutions to Improve Service and Reduce Costs," GOOGLE-HDI-PA-0004184, (2 Pages).
David R. Butcher, "TuVox Launches Voice-Enabled Knowledge Base Speech Applications," Aug. 15, 2005, GOOGLE-HDI-PA-0004186, (1 Page).
Kurt Konolige, et al, "Report on the SRI Pioneer Robot Team at AAAI96 Robotics Competition and Exhibition," Swiss Federal Institute of Technology, Aug. 22, 1996, GOOGLE-HDI-PA-0004187, (1 Page).
Adam Cheyer, "About this document . . . ," Aug. 12, 1996, SRI International, GOOGLE-HDI-PA-0004188, (1 Page).
Adam Cheyer, "Comparison with Other Agent Architectures," Aug. 12, 1996, SRI International, GOOGLE-HDI-PA-0004214, (1 Page).
Adam Cheyer, "Agent Architecture," Aug. 12, 1996, SRI International, GOOGLE-HDI-PA-0004189, (1 Page).
"Agent Development Tools (ADI)," Capture timestamp (UTC): Wed, Nov. 13, 2019, GOOGLE-HDI-PA-0004190, (1 Page).
John Dowding, et al., "Interpreting Language in Context in Command Talk," Feb. 5, 1999, GOOGLE-HDI-PA-0004192, (4 Pages).
Nuance Communications, "ATIS Demonstration," Version 1.6, 1996, GOOGLE-HDI-PA-0004196, (1 Pages).
Philip R. Cohen, et al., "An Open Agent Architecture," Aug. 12, 1996, GOOGLE-HDI-PA-0004197, (1 Pages).
SRI International, "Collabrative Home e-Fridge," GOOGLE-HDI-PA-0004199, (1 Page).
SRI International, "CommandTalk," GOOGLE-HDI-PA-0004202, Capture timestamp (UTC): Wed, Nov. 13, 2019, capture URL: http://www.ai.sri.com/~lesaf/commandtalk.html, GOOGLE-HDI-PA-0004202, (1 Page).
SRI International, "Spoken Language Interface to the Leathernet System," Capture timestamp (UTC): Wed, Nov. 13, 2019, GOOGLE-HDI-PA-0004203, (1 Page).
Robert Moore, et al., "CommandTalk: A Spoken-Language Interface for Battlefield Simulations," SRI International, Oct. 23, 1997, GOOGLE-HDI-PA-0004204, (9 Pages).
Adam Cheyer, "Communication Language," Aug. 12, 1996, SRI International, GOOGLE-HDI-PA-0004213, (1 Page).
Petitioners Power of Attorney and Designation of Lead and Backup Counsel; *Google LLC* v. *Hammond Development International, Inc.*; U.S. Pat. No. 10,264,032, Case No. IPR2020-00080, filed Nov. 4, 2019, 2019, (2 Pages).
Petition for Inter Partes Review; *Google LLC* v. *Hammond Development International, Inc.*; U.S. Pat. No. 10,264,032, Case No. IPR2020-00080, filed Nov. 4, 2019, (99 Pages).
Declaration of Leonard Forys, PH.D., filed in *Google LLC* v. *Hammond Development International, Inc.*; U.S. Pat. No. 10,264,032, Case No. IPR2020-00080, filed Oct. 31, 2019, (123 Pages).
W3C®, "Voice Extensible Markup Language (VoiceXML™) Version 2.0," W3C Recommendation Mar. 16, 2004, (148 Pages), publisher Copyright © 2004 W3C® (MIT, ERCIM, Keio), Sep. 29, 2019, Google Exhibit 1013, avaliable at http://www.w3.org/TR/2004/REC-voicexml20-20040316/.
Petition for Inter Partes Review; *Google LLC* v. *Hammond Development International, Inc.*; U.S. Pat. No. 10,270,816, Case No. IPR2020-00081, filed Nov. 26, 2019, 2019, (98 Pages).
Petitioners Power of Attorney and Designation of Lead and Backup Counsel; *Google LLC* v. *Hammond Development International, Inc.*, U.S. Pat. No. 10,270,816, Case No. IPR2020-00081, filed Nov. 25, 2019, (2 Pages).
Declaration of Leonard Forys, PH.D., filed in *Google LLC* v. *Hammond Development International, Inc.*, U.S. Pat. No. 10,264,032, Case No. IPR2020-00081, filed Nov. 25, 2019, (117 Pages).
Petition for Inter Partes Review; *Google LLC* v. *Hammond Development International, Inc.*; U.S. Pat. No. 9,716,732, Case No. IPR2020-00214, filed Dec. 4, 2019, 2019, (100 Pages).
Declaration of Leonard Forys, PH.D., filed in *Google LLC* v. *Hammond Development International, Inc.*; U.S. Pat. No. 9,716,732, Case No. IPR2020-00214, filed Dec. 4, 2019, (119 Pages).
Petitioners Power of Attorney and Designation of Lead and Backup Counsel; *Google LLC* v. *Hammond Development International, Inc.*; U.S. Pat. No. 9,716,732, Case No. IPR2020-00214, filed Dec. 3, 2019, (2 Pages).
Petitioners Power of Attorney and Designation of Lead and Backup Counsel; *Google LLC* v. *Hammond Development International, Inc.*; U.S. Pat. No. 9,456,040, Case No. IPR2020-00298, filed Dec. 19, 2019, (2 Pages).

(56) References Cited

OTHER PUBLICATIONS

Petition for Inter Partes Review; *Google LLC* v. *Hammond Development International, Inc.*; U.S. Pat. No. 9,456,040, Case No. IPR2020-00298, filed Dec. 20, 2019, (92 Pages).
Declaration of Leonard Forys, PH.D., filed in *Google LLC* v. *Hammond Development International, Inc.*; U.S. Pat. No. 9,456,040, Case No. IPR2020-00298, filed Dec. 20, 2019, (120 Pages).
Petition for Inter Partes Review; *Google LLC* v. *Hammond Development International, Inc.*, U.S. Pat. No. 9,716,732, Case No. IPR2020-00305, filed Dec. 19, 2019, (90 Pages).
Petitioner's Supplemental Paper and Notice Ranking Petitions; *Google LLC* v. *Hammond Development International, Inc.*, U.S. Pat. No. 9,716,732, Case No. IPR2020-00305, filed Dec. 19, 2019, (6 Pages).
Declaration of Leonard Forys, PH.D., filed in *Google LLC* v. *Hammond Development International, Inc.*, U.S. Pat. No. 9,716,732, Case No. IPR2020-00305, filed Dec. 16, 2019, (116 Pages).
Petitioners Power of Attorney and Designation of Lead and Backup Counsel; *Google LLC* v. *Hammond Development International, Inc.*, U.S. Pat. No. 9,716,732, Case No. IPR2020-00305, filed Dec. 3, 2019, (2 Pages).
Petitioners Power of Attorney and Designation of Lead and Backup Counsel; *Google LLC* v. *Hammond Development International, Inc.*; U.S. Pat. No. 10,193,935, Case No. IPR2020-00306, filed Dec. 16, 2019, (2 Pages).
Petition for Inter Partes Review; *Google LLC* v. *Hammond Development International, Inc.*; U.S. Pat. No. 10,193,935, Case No. IPR2020-00306, filed Dec. 20, 2019, (92 Pages).
Declaration of Leonard Forys, PH.D., filed in *Google LLC* v. *Hammond Development International, Inc.*; U.S. Pat. No. 10,193,935, Case No. IPR2020-00306, filed Dec. 19, 2019, (118 Pages).
Petitioners Power of Attorney and Designation of Lead and Backup Counsel; *Google LLC* v. *Hammond Development International, Inc.*; U.S. Pat. No. 9,420,011, Case No. IPR2020-00411, filed Jan. 14, 2020, (2 Pages).
Petition for Inter Partes Review; *Google LLC* v. *Hammond Development International, Inc.*; U.S. Pat. No. 9,420,011, Case No. IPR2020-00411, filed Jan. 15, 2020, (98 Pages).
Daniel D. Hammond, "File History," U.S. Pat. No. 9,420,011, Aug. 16, 2016, Google Exhibit 1002, (308 Pages).
Declaration of Leonard Forys, PH.D., filed in *Google LLC* v. *Hammond Development International, Inc.*; U.S. Pat. No. 9,420,011, Case No. IPR2020-00411, filed Jan. 15, 2020, Goggle Exhibit 1003, (133 Pages).
W3C®, "Voice eXtensible Markup Language (VoiceXML™) version 1.0," W3C Note May 5, 2000, (115 Pages), publisher Copyright © 2000 VoiceXML Forum, Sep. 29, 2019, Google Exhibit 1014, available at https://www.w3.org/TR/2000/NOTE-voicexml-20000505/.
Petition for Inter Partes Review; *Google LLC* v. *Hammond Development International, Inc.*; US. Pat. No. 9,456,040, Case No. IPR2020-00412, filed Jan. 14, 2020 (93 Pages).
Petitioner's Supplemental Paper and Notice Ranking Petitions; *Google LLC* v. *Hammond Development International, Inc.*; U.S. Pat. No. 9,456,040, Case No. IPR2020-00412, filed Jan. 14, 2020, (6 Pages).
Petitioners Power of Attorney and Designation of Lead and Backup Counsel; *Google LLC* v. *Hammond Development International, Inc.*; U.S. Pat. No. 9,456,040, Case No. IPR2020-00412, filed Dec. 19, 2019, (2 Pages).
Daniel D. Hammond, "File History," U.S. Pat. No. 9,456,040, Sep. 27, 2016, Google Exhibit 1002, (346 Pages).
Declaration of Leonard Forys, PH.D., filed in *Google LLC* v. *Hammond Development International, Inc.*; U.S. Pat. No. 9,456,040, Case No. IPR2020-00412, filed Jan. 14, 2020, Goggle Exhibit 1003, (118 Pages).
Petitioners Power of Attorney and Designation of Lead and Backup Counsel; *Google LLC* v. *Hammond Development International, Inc.*; U.S. Pat. No. 10,193,935, Case No. IPR2020-00413, filed Dec. 19, 2019, (2 Pages).

Petition for Inter Partes Review; *Google LLC* v. *Hammond Development International, Inc.*; U.S. Pat. No. 10,193,935, Case No. IPR2020-00413, filed Jan. 17, 2020, (94 Pages).
Petitioner's Supplemental Paper and Notice Ranking Petitions; *Google LLC* v. *Hammond Development International, Inc.*; U.S. Pat. No. 10,193,935, Case No. IPR2020-00413, filed Jan. 17, 2020, (7 Pages).
Daniel D. Hammond, "File History," U.S. Pat. 10,193,935, Jan. 29, 2019, Google Exhibit 1002, (356 Pages).
Declaration of Leonard Forys, PH.D., filed in *Google LLC* v. *Hammond Development International, Inc.*; U.S. Pat. No. 10,193,935, Case No. IPR2020-00413, filed Jan. 17, 2020, Goggle Exhibit 1003, (124 Pages).
Petition for Inter Partes Review; *Google LLC* v. *Hammond Development International, Inc.*; U.S. Pat. No. 9,705,937, Case No. IPR2020-00414, filed Jan. 15, 2020, (94 Pages).
Petitioner's Supplemental Paper and Notice Ranking Petitions; *Google LLC* v. *Hammond Development International, Inc.*; U.S. Pat. No. 9,705,937, Case No. IPR2020-00414, filed Jan. 15, 2020, (6 Pages).
Daniel D. Hammond, "File History," U.S. Pat. No. 9,705,937, Jul. 11, 2017, Google Exhibit 1002, (240 Pages).
Declaration of Leonard Forys, PH.D., filed in *Google LLC* v. *Hammond Development International, Inc.*; U.S. Pat. No. 9,705,937, Case No. IPR2020-00414, filed Jan. 15, 2020, Goggle Exhibit 1003, (122 Pages).
Petitioners Power of Attorney and Designation of Lead and Backup Counsel; *Google LLC* v. *Hammond Development International, Inc.*; U.S. Pat. No. 9,705,937, Case No. IPR2020-00414, filed Jan. 14, 2020, (2 Pages).
Petition for Inter Partes Review; *Google LLC* v. *Hammond Development International, Inc.*; U.S. Pat. No. 9,705,937, Case No. IPR2020-00415, filed Jan. 15, 2020, (92 Pages).
Petitioner's Supplemental Paper and Notice Ranking Petitions; *Google LLC* v. *Hammond Development International, Inc.*; U.S. Pat. No. 9,705,937, Case No. IPR2020-00415, filed Jan. 15, 2020, (6 Pages).
Declaration of Leonard Forys, PH.D., filed in *Google LLC* v. *Hammond Development International, Inc.*; U.S. Pat. No. 9,705,937, Case No. IPR2020-00415, filed Jan. 15, 2020, Goggle Exhibit 1003, (125 Pages).
Petitioners Power of Attorney and Designation of Lead and Backup Counsel; *Google LLC* v. *Hammond Development International, Inc.*; U.S. Pat. No. 9,705,937, Case No. IPR2020-00413, filed Jan. 14, 2020, (2 Pages).
Daniel D. Hammond, U.S. Appl. No. 11/779,722, filed Jul. 18, 2007, "File History," IPR Petition—U.S. Pat. No. 9,264,483, Amazon Exhibit 1002, (280 Pages).
Declaration of Philip Greenspun, Ph.D., in Support of Petition for Inter Partes Review of U.S. Pat. No. 9,264,483, *Amazon.com, Inc.* v. *Hammond Development International, Inc.*; filed Jan. 21, 2020, IPR Petition—U.S. Pat. No. 9,264,483, Amazon Exhibit 1003, (160 Pages).
Philip Greenspun, Ph.D., "Resume," updated Feb. 2018, IPR Petition—U.S. Pat. No. 9,264,483, Amazon Exhibit 1004, (6 Pages).
Plaintiff Hammond Development International, Inc.'s Disclosure of Asserted Claims and Infringement Contentions and Identification of Document Production; Jury Trial Demanded, *Hammond Development International, Inc.* v. *Amazon.com, Inc., et al.*, Civil Action No. 6:19-CV-00355-ADA, Sep. 30, 2019, IPR Petition—U.S. Pat. No. 9,264,483, Amazon Exhibit 1018, (34 Pages).
Bruce Schwartz, "Microsoft has the edge in battle of the browsers," Aug. 21, 1996, USA Today, IPR Petition—U.S. Pat. No. 9,264,483, Amazon Exhibit 1019, (2 Pages).
James H. Pence, "How to Do Everything with HTML," Osborne/McGraw-Hill, 2001, IPR Petition—U.S. Pat. No. 9,264,483, Amazon Exhibit 1020, (5 Pages).
Petition for Inter Partes Review of U.S. Pat. No. 10,264,032, *Amazon.com, Inc.* v. *Hammond Development International, Inc.*; Case No. IPR2020-01029, Before the Patent Trial and Appeal Board of the Untied States Patent and Trademark Office, filed Jun. 2, 2020, 95 pages.

(56) References Cited

OTHER PUBLICATIONS

Daniel D. Hammond, USPTO File History of U.S. Pat. No. 9,264,483 for "Method and System for Enabling a Communication Device to Remotely Execute an Application," 280 pages, Amazon Exhibit 1002.
Declaration of Philip Greenspun, Ph.D., In Support of Petition for Inter Partes Review of U.S. Pat. No. 10,264,032, filed in *Amazon. com, Inc.* v. *Hammond Development International, Inc.*, Before the Patent Trial and Appeal Board of the Untied States Patent and Trademark Office, filed Jun. 1, 2020, 152 pages, Amazon Exhibit 1001.
Curriculum Vitae of Philip Greenspun, Ph.D., Resume, updated Feb. 2018, 6 pages, Amazon Exhibit 1004.
Plaintiff Hammond Development International, Inc.'s Disclosure of Asserted Claims and Infringement Contentions and Identification of Document Production, *Hammond Development International, Inc.* v. *Amazon.com, Inc. et al.*, Civil Action No. 6:19-cv-00355-ADA in the U.S. District Court for the Western District of Texas, Waco Division, filed Sep. 30, 2019, 34 pages, Amazon Exhibit 1018.
The Institute of Electrical and Electronics Engineer's, Inc., "Workshop on Mobile Computing Systems and Applications," Proceedings, Dec. 8-9, 1994, IEEE Computer Society Press, Los Alamitos, CA, 9 pages, Amazon Exhibit 1025.
Todd Courtois, et al., "Portal: A PDA-To-World-Wide-Web Interface," 3 PDA Developers, Jan./Feb. 1995, 3 pages, Amazon Exhibit 1026.
E. A. Johnson, "Touch display—a novel input/output device for computers," Electronics Letters, Oct. 1965, vol. 1 No. 8, 2 pages, Amazon Exhibit 1042.
Daniel D. Hammond, Excerpts from USPTO File History of U.S. Pat. No. 10,264,032 for "Method and System for Enabling a Communication Device to Remotely Execute an Application," 15 pages, Amazon Exhibit 1048.
Plaintiff's Responsive Claim Construction Brief, *Hammond Development International, Inc.* v. *Amazon.com, Inc. et al.*, and *Hammond Development International, Inc.* v. *Google LLC*, Civil Action Nos. 1:20-CV-00342-ASA and 6:19-CV-00356-ADA in the U.S. District Court for the Western District of Texas, Waco Division, filed Apr. 3, 2020, 38 pages, Amazon Exhibit 1053.
R. Srinivasan, "RPC: Remote Procedure Call Protocol Specification Version 2," Request for Comments: 1831, Standards Track, Sun Microsystems, Aug. 1995, 18 pages, Amazon Exhibit 1054.
Plaintiff Hammond Development International, Inc.'s Disclosure of Asserted Claims and Infringement Contentions and Identification of Document Production, *Hammond Development International, Inc.* v. *Amazon.com, Inc. et al.*, Civil Action No. 6:19-CV-00355-ADA in the U.S. District Court for the Western District of Texas, Waco Division, Sep. 30, 2019, 66 pages, Amazon Exhibit 1056.
Congressional Record—Senate, S5402, (daily ed. Sep. 8, 2011), 42 pages, Amazon Exhibit 1057.
Plaintiff's Preliminary Election of Asserted Claims, *Hammond Development International, Inc.* v. *Amazon.com, Inc. et al.*, and *Hammond Development International, Inc.* v. *Google LLC*, Civil Action Nos. 6:19-CV-00355-ADA and 6:19-CV-00356-ADA in the U.S. District Court for the Western District of Texas, Waco Division, Jan. 17, 2020, 4 pages, Amazon Exhibit 1058.
3rd Generation Partnership Project, Technical Specification Group Terminals, Multimedia Messaging Service (MMS) Functional description, 3GPP TS 23.140 V4.2.0, Stage 2, (Release 4), 2001, 73 pages, Amazon Exhibit 1062.
Petition for Inter Partes Review of U.S. Pat. No. 9,716,732, *Amazon. com, Inc.* v. *Hammond Development International, Inc.*; Case No. IPR2020-01043, Before the Patent Trial and Appeal Board of the Untied States Patent and Trademark Office, filed Jun. 3, 2020, 106 pages.
Declaration of Philip Greenspun, Ph.D., In Support of Petition for Inter Partes Review of U.S. Pat. No. 9,716,732, filed in *Amazon. com, Inc.* v. *Hammond Development International, Inc.*, Before the Patent Trial and Appeal Board of the Untied States Patent and Trademark Office, filed Jun. 2, 2020, 185 pages, Amazon Exhibit 1003.
3rd Generation Partnership Project, Technical Specification Group Services and System Aspects; Mobile Execution Environment (MExE), Service description, 33GPP TS 22.057 V6.0.0, Stage 1, (Release 6), 2005, 22 pages, Amazon Exhibit 1023.
Daniel D. Hammond, Excerpts from USPTO File History of U.S. Pat. No. 9,716,732 for "Method and System for Enabling a Communication Device to Remotely Execute an Application," 50 pages, Amazon Exhibit 1063.
D. Robinson, et al., "The Common Gateway interface (CGI) Version 1.1," Request for Comments: 3875, The Internet Society, Oct. 2004, 32 pages, Amazon Exhibit 1068.
J. Franks, et al., "An Extension to HTTP: Digest Access Authentication," Request for Comments: 2069, Standards Track, Jan. 1997, 18 pages, Amazon Exhibit 1079.
Petition for Inter Partes Review of U.S. Pat. No. 9,456,040, *Amazon. com, Inc.* v. *Hammond Development International, Inc.*; Case No. IPR2020-01051, Before the Patent Trial and Appeal Board of the Untied States Patent and Trademark Office, filed Jun. 4, 2020, 105 pages.
Declaration of Philip Greenspun, Ph.D., In Support of Petition for Inter Partes Review of U.S. Pat. No. 9,456,040, filed in *Amazon. com, Inc.* v. *Hammond Development International, Inc.*, Before the Patent Trial and Appeal Board of the Untied States Patent and Trademark Office, filed Jun. 3, 2020, 168 pages, Amazon Exhibit 1003.
Daniel D. Hammond, Excerpts from the USPTO File History of U.S. Pat. No. 9,456,040 for "Method and System for Enabling a Communication Device to Remotely Execute an Application," 19 pages, Amazon Exhibit 1080.
Sun Microsystems, Inc., "Java™ Speech API Programmer's Guide," Version 1.0, Oct. 26, 1998, 26 pages, Amazon Exhibit 1082.
G. Winfield Treese, et al., "Designing Systems for Internet Commerce," Second Edition, Pearson Education, Inc., 2003, 4 pages, Amazon Exhibit 1083.
Petition for Inter Partes Review of U.S. Pat. No. 9,420,011, *Amazon. com, Inc.* v. *Hammond Development International, Inc.*; Case No. IPR2020-01058, Before the Patent Trial and Appeal Board of the Untied States Patent and Trademark Office, filed Jun. 5, 2020, 98 pages.
Declaration of Philip Greenspun, Ph.D., In Support of Petition for Inter Partes Review of U.S. Pat. No. 9,420,011, filed in *Amazon. com, Inc.* v. *Hammond Development International, Inc.*, Before the Patent Trial and Appeal Board of the Untied States Patent and Trademark Office, filed Jun. 5, 2020, 146 pages, Amazon Exhibit 1003.
Daniel D. Hammond, Excerpts from USPTO File History of U.S. Pat. No. 9,420,011 for "Method and System for Enabling a Communication Device to Remotely Execute an Application," 25 pages, Amazon Exhibit 1084.
Plaintiff Hammond Development International, Inc.'s Disclosure of Asserted Claims and Infringement Contentions and Identification of Document Production, *Hammond Development International, Inc.* v. *Amazon.com, Inc. et al.*, Civil Action No. 6:19-CV-00355-ADA in the U.S. District Court for the Western District of Texas, Waco Division, Sep. 30, 2019, 20 pages, Amazon Exhibit 1086.
Petition for Inter Partes Review of U.S. Pat. No. 10,193,935, *Amazon.com, Inc.* vs. *Hammond Development International, Inc.*; Case No. IPR2020-01064, Before the Patent Trial and Appeal Board, Before the Patent Trial and Appeal Board of the Untied States Patent and Trademark Office, filed Jun. 9, 2020, 105 pages.
Declaration of Philip Greenspun, Ph.D., In Support of Petition for Inter Partes Review of U.S. Pat. No. 10,193,935, filed in *Amazon. com, Inc.* v. *Hammond Development International, Inc.*, Before the Patent Trial and Appeal Board of the Untied States Patent and Trademark Office, filed Jun. 8, 2020, 219 pages, Amazon Exhibit 1003.
Daniel D. Hammond, Excerpts from USPTO File History of U.S. Pat. No. 10,193,935 for "Method and System for Enabling a Communication Device to Remotely Execute an Application," 26 pages, Amazon Exhibit 1087.

(56) References Cited

OTHER PUBLICATIONS

International Telecommunication Union, "Series H: Audiovisual and Multimedia Systems Infrastructure of audiovisual services—Communication procedures," Excerpts from H.245 Control protocol of multimedia communication, May 2006, 48 pages, Amazon Exhibit 1091.
Michael Kristler, "Workload balancing with Domino clusters," IBM DeveloperWorks, Dec. 1, 1997, 9 pages, Amazon Exhibit 1092.
R. Droms, "Dynamic Host Configuration Protocol," Request for Comments: 2131, Standards Track, Mar. 1997, 45 pages, Amazon Exhibit 1093.
Petition for Inter Partes Review of U.S. Pat. No. 9,705,937, *Amazon. com, Inc.* vs. *Hammond Development International, Inc.*; Case No. IPR2020-01066, Before the Patent Trial and Appeal Board of the Untied States Patent and Trademark Office, filed Jun. 9, 2020, 103 pages.
Declaration of Philip Greenspun, Ph.D., In Support of Petition for Inter Partes Review of U.S. Pat. No. 9,705,937, filed in *Amazon. com, Inc.* v. *Hammond Development International, Inc.*, Before the Patent Trial and Appeal Board of the Untied States Patent and Trademark Office, filed Jun. 9, 2020, 166 pages, Amazon Exhibit 1003.
Daniel D. Hammond, Excerpts from USPTO File History of U.S. Pat. No. 9,705,937 for "Method and System for Enabling a Communication Device to Remotely Execute an Application," 51 pages, Amazon Exhibit 1098.
Microsoft Press, Computer Dictionary, Fifth Edition, 2002, definition for "transaction," 4 pages, Amazon Exhibit 1099.
Petition for Inter Partes Review of U.S. Pat. No. 10,270,816, *Amazon.com, Inc.* v. *Hammond Development International, Inc.*; Case No. IPR2020-01067, Before the Patent Trial and Appeal Board of the Untied States Patent and Trademark Office, filed Jun. 9, 2020, 118 pages.
Declaration of Philip Greenspun, Ph.D., In Support of Petition for Inter Partes Review of U.S. Pat. No. 10,270,816, filed in *Amazon. com, Inc.* v. *Hammond Development International, Inc.*, Before the Patent Trial and Appeal Board of the Untied States Patent and Trademark Office, filed Jun. 9, 2020, 185 pages, Amazon Exhibit 1003.
Daniel D. Hammond, Excerpts from USPTO File History of U.S. Pat. No. 10,270,816 for "Method and System for Enabling a Communication Device to Remotely Execute an Application," 17 pages, Amazon Exhibit 1096.
Plaintiff Hammond Development International, Inc.'s Disclosure of Asserted Claims and Infringement Contentions and Identification of Document Production, *Hammond Development International, Inc.* v. *Amazon.com, Inc. et al.*, Civil Action No. 6:19-cv-00355-ADA in the U.S. District Court for the Western District of Texas, Waco Division, filed Sep. 30, 2019, 56 pages, Amazon Exhibit 1097.
Defendant Google LLC's Preliminary Invalidity Disclosure of Invalidity Contentions, "Exhibit H19"—claim chart citing Nuance Voice Platform 3.0 ("Nuance Voice Platform"), Dec. 23, 2019, (82 Pages).
Defendant Google LLC's Preliminary Invalidity Disclosure of Invalidity Contentions, "Exhibit H20"—claim chart citing Avaya Voice Portal by Avaya Inc. ("Avaya Voice Portal"), Dec. 23, 2019, (186 Pages).
Defendant Google LLC's Preliminary Invalidity Disclosure of Invalidity Contentions, "Exhibit H21"—claim chart citing Cisco iOS VoiceXML Gateway and VoiceXML Solution Infrastructure ("Cisco VoiceXML Gateway"), Dec. 23, 2019, (115 Pages).
Defendant Google LLC's Preliminary Invalidity Disclosure of Invalidity Contentions, "Exhibit H22"—claim chart citing VeraServ system by Verascape, Inc. ("VeraServ"), Dec. 23, 2019, (131 Pages).
Defendant Google LLC's Preliminary Invalidity Disclosure of Invalidity Contentions, "Exhibit H23"—claim chart citing TuVox voice applications platform including CVR ("TuVox"), Dec. 23, 2019, (79 Pages).
Defendant Google LLC's Preliminary Invalidity Disclosure of Invalidity Contentions, "Exhibit H24"—claim chart citing The Open Agent Architecture™ by Stanford Research Institute ("OAA"), Dec. 23, 2019, (135 Pages).
Defendant Google LLC's Preliminary Invalidity Disclosure of Invalidity Contentions, "Exhibit H25"—claim chart citing BeVocal system (2002) ("BeVocal"), Dec. 23, 2019, (156 Pages).
Defendant Google LLC's Preliminary Invalidity Disclosure of Invalidity Contentions, "Exhibit H26"—claim chart citing Prody Parrot™ by Mindmaker, Ltd. ("Prody Parrot"), Dec. 23, 2019, (124 Pages).
Defendant Google LLC's Preliminary Invalidity Disclosure of Invalidity Contentions, "Exhibit H27"—claim chart citing HAL2000, HAL Voice Portal, and HAL Deluxe by Home Automated Living ("HAL2000"), Dec. 23, 2019, (69 Pages).
Avaya, "Planning for Avaya Voice Portal 3.0.1.1," Jun. 2006, GOOGLE-HDI-PA-0003788, (60 Pages).
Avaya, "Planning for Avaya Voice Portal 4.0," Jun. 2007, GOOGLE-HDI-PA-0003848, (42 Pages).
Guy Kempny, et al., "IBM WebSphere Voice Systems Solutions," SG24-6259-00, ISBN 0738422568, Jan. 13, 2003, An IBM Redbooks publication, ibm.com/redbooks, GOOGLE-HDI-PA-0000173, (602 Pages).
Peter Kovari, et al., "Mobile Applications with IBM WebSphere Everyplace Access Design and Development," Oct. 2001, An IBM Redbooks publication, ibm.com/redbooks, GOOGLE-HDI-PA-0002597,(456 Pages).
Guy Kempny, et al., "IBM WebSphere Voice Systems Solutions," SG24-6884-00, ISBN 073842773X, Jan. 2003, An IBM Redbooks publication, ibm.com/redbooks, GOOGLE-HDI-PA-0003053, (602 Pages).
Wikipedia, "Google Voice Search," Oct. 22, 2019, GOOG-HDI-00006542, (2 Pages).
David Pogue, "Geniuses at Play, on the Job," Feb. 25, 2009, The New York Times Company, GOOG-HDI-00006903, (4 Pages).
Michiel Bacciani, et al., "Deploying GOOG-411: Early Lessons in Data, Measurement, and Testing," 2008, Google, Inc., GOOGLE-HDI-PA-0002555, (4 Pages).
YouTube, "1-800-GOOG-411: Google's 411 Service," GOOGLE-HDI-PA-0002576, Capture timestamp (UTC): Wed, Dec. 18, 2019, Capture URL: https://www.youtube.com/watch?v=cNOq8SvlQAk, (2 Pages).
Goggle, "1-800-GOOG-411: Find and connect with local businesses for free from your phone," Google-HDI-PA-0002578, Capture timestamp (UTC): Wed, Dec. 18, 2019, Capture URL: https://web.archive.org/web/20080411003124/http:/www.google.com:80/goog411/, (1 Page).
Goggle, Google Revenues Up, Up, Up, Oct. 19, 2006, Screenwerk, GOOGLE-HD I-PA-0002579, (4 Pages).
Michael Arrington, "Google Launches Free 411 Service," TechCrunch, GOOGLE-HD I-PA-0002583, (6 Pages).
Charl Van Heerden, et al., "Exploring Language Modeling Alternatives With GOOG-411," Google, Inc., GOOGLE-HD I-PA-0002589, (4 Pages).
Genesys, "Genesys Voice Platform 7.6, " Deployment Guide, © 2002-2011, GOOGLE-HDI-PA-0001213, (540 Pages).
Olav Wilke, "Product Sales Training," Genesys Sales Academy, GOOGLE-HDI-PA-0001753, (147 Pages).
Genesys, "Genesys Voice Platform," Dec. 2, 2019, GOOGLE-HDI-PA-0001900, (12 Pages).
Business Wire, "Metaphor Teams Up with Genesys to Provide Low Cost, High Quality Speech IVR Solutions on the Genesys Voice Platform," Capture timestamp (UTC): Wed, Nov. 6, 2019, Capture URL: https://www.businesswire.com/news/home/20041101005835/en/Metaphor-Teams-Genesys-Provide-Cost-High-Quality, GOOGLE-HDI-PA-0001912, (1 Page).
Genesys, "Genesys Voice Platform 7.6," Reference Manual, © 2006-2011, GOOGLE-HDI-PA-0001913, (472 Pages).
Genesys, "Genesys Voice Platform 7.6," Studio, Deployment Guide, © 2002-2008, GOOGLE-HDI-PA-0002385, (26 Pages).
Genesys, "Genesys Voice Platform 7.6," VoiceXM L 2A, Reference Manual, © 2006-2010, GOOGLE-HDI-PA-0002411, (144 Pages).

(56) References Cited

OTHER PUBLICATIONS

H. Schulzrinne, et al., "Session Initiation Protocol (SIP)-H.323 Interworking Requirements," Network Working Group, The Internet Society, Jul. 2005, GOOGLE-HDI-PA-0003890, (7 Pages).
Saravanan Shanmugham, et al., "A Media Resource Control Protocol Developed by Cisco, Nuance, and Speechworks," Internet Engineering Task Force, May 1, 2003, GOOGLE-HDI-PA-0003897, (69 Pages.).
H. Schulzrinne, et al., "RTP: A Transport Protocol for Real-Time Applications," Network Working Group, Standards Track, Jan. 1996, GOOGLE-HDI-PA-0003966, (31 Pages).
J. Rosenberg, et al., "SIP: Session Initiation Protocol," Network Working Group, The Internet Society, Jun. 2002, GOOGLE-HDI-PA-0003997, (109 Pages).
Cisco Systems, Inc., "IOS Voice XML Gateway to CVP Call Flow using MRCPv1 ASR / TTS," Document ID: 97213, updated Jun. 27, 2007, © 2013-2014, GOOGLE-HDI-PA-0004106, (27 Pages).
Cisco Systems, Inc., "Cisco Customer Response Applications Developer Guide (3.0)—Developing and Deploying VoiceXML Applications," [Cisco IPCC Express Edition], Capture timestamp (UTC): Sun, Dec. 1, 2019, Capture URL: https://web.archive.org/web/20050313104424/https://www.cisco.com/en/US/products/sw/custcosw/ps1846/. . . , GOOGLE-HDI-PA-0004133, (6 Pages).
Cisco Systems, Inc., "Introduction," Capture timestamp (UTC): Sun, Dec. 1, 2019, Capture URL: http://web.archive.org/web/20070208094428/https://www.cisco.com/univercd/cc/td/doc/product/access/sc/rel7/soln/vxml_uc/ov/intro.htm, GOOGLE-HDI-PA-0004139, (3 Pages).
Cisco Systems, Inc., "Solution Architecture," © 1992-2002, Capture timestamp (UTC): Sun, Dec. 1, 2019, Capture URL: http ://web.archive .org/we b/20070203131430/http://www.cisco.com/u nive rcd/cc/td/doc/prod uct/access/sc/re17 /sol n/vxml_uc/ ov /arch. htm#88421, GOOGLE-HDI-PA-0004142, (7 Pages).
Kathleen A. Pierz, "The Evolution of Information Service," Jan. 25, 2008, GOOG-HDI-00006909, (149 Pages).
Matthew Booth, "AT&T Sets Stage to Take Free DA Market by Storm," Document: Advisory #06-16, The Kelsey Group, Inc., 2006, GOOG-HDI-00007066, (4 Pages).
The Kelsey Group, "Global Yellow Pages™ 2005: The Kelsey Group's Outlook & Forecast," A Special Report by The Kelsey Report® Analyst Team, Europe, May 2005, GOOG-HDI-00007093, (194 Pages).
Matt Booth, "Wireless Voice Search: The Multi-Modal Revolution," DA, Free DA and Permission-Based Mobile Marketing, 2006, The Kelsey Group, GOOG-HDI-00007320, (44 Pages).
David Pogue, "Cell Services Keep It Easy, and Free," Jun. 5, 2008, GOOG-HD1-00007396, (4 Pages).
Eve Astrid Andersson, et al., "Early Adopter VoiceXML," © 2001 Wrox Press, GOOGLE-HDI-PA-0000775, (112 Pages).
H. Schulzrinne, et al., "Real Time Streaming Protocol (RTSP)," Network Working Group, The Internet Society, Standards Track, 1998, GOOGLE-HDI-PA-0006864, (92 Pages.).
J. Rosenberg, et al., "SIP: Session Initiation Protocol," Network Working Group, The Internet Society, Jun. 2002, GOOGLE-HDI-PA-0006956, (269 Pages).
H. Schulzrinne, et al., "RTP: A Transport Protocol for Real-Time Applications," Network Working Group, The Internet Society, Standards Track, Jul. 2003, GOOGLE-HDI-PA-0007225 , (89 Pages).
S. Shanmugham, et al., "A Media Resource Control Protocol (MRCP) Developed by Cisco, Nuance, and Speechworks," Network Working Group, Apr. 2006, GOOGLE-HDI-PA-0007314, (86 Pages.).
Cisco Systems, Inc., "SALT—Speech Application Language Tags (SALT) 1.0 Specification," Document SALT.1.0.doc, Jul. 15, 2002, GOOGLE-HDI-PA-0007400, (112 Pages).
W3C®, "Voice extensible Markup Language (VoiceXML™) version 1.0," VoiceXML Forum, May 5, 2000, GOOGLE-HDI-PA-0007512, (115 Pages).
W3C®, "Voice Extensible Markup Language (VoiceXML) Version 2.0," Mar. 16, 2004, GOOGLE-HDI-PA-0007627, (148 Pages).

Diagenix Corporation, "Press Release," Feb. 6, 2004, GOOGLE-HDI-PA-0006634, (1 Page).
Angel.com, "IVR University," 2006, GOOGLE-HDI-PA-0006635, (1 Page).
Cision, "Angel.com Selects Newfound Communications to Power Ad-hoc Call Recording for the Angel Call Analyzer," Aug. 8, 2006, GOOGLE-HDI-PA-0006636, (1 Page).
Sahil Gambhir, "Angel.com Voice Suites," May 21, 2004, GOOGLE-HDI-PA-0006637, (4 Pages).
Angel.com, "Site Builder," 2006, GOOGLE-HDI-PA-0006641, (1 Page).
Angel.com, "Angel.com Transaction Page Reference Guide," GOOGLE-HDI-PA-0006642, (27 Pages).
Angel.com, "Transaction Page User Guide," GOOGLE-HDI-PA-0006669, (12 Pages).
Angel.com, "Introduction to Web & System Integration," 2006, GOOGLE-HDI-PA-0006681, (1 Page).
Angel.com, "3 Tips to Secure Your Voice Site Transactions," 2006, GOOGLE-HDI-PA-0006682, (1 Page).
Bnamericas, "Comverse introduces voice recognition platform," Aug. 22, 2003, GOOGLE-HDI-PA-0006683, (3 Pages).
Business Wire, "Comverse Announces Its Media Server for Delivering Next-Generation VoiceXML Speech Recognition Applications to Carrier Networks," Aug. 11, 2003, GOOGLE-HDI-PA-0006686, (2 Pages).
Comverse Inc., "Network IVR," 2003, GOOGLE-HDI-PA-0006688, (1 Page).
Comverse Inc., "Media Server," 2003, GOOGLE-HDI-PA-0006689, (1 Page).
Comverse Inc., "Comverse announces media server for delivering next-generation VoiceXML speech recognition," Aug. 15, 2003, ITWeb, (3 Pages).
IP Unity, "Solutions," 2005, GOOGLE-HDI-PA-0006693, (1 Page).
IP Unity, "IP Unity's Harmony5000 Release 2.0 Wins Internet Telephony Product of the Year Award," Press Release, Dec. 22, 2003, GOOGLE-HDI-PA-0006694, (1 Page).
IP Unity, "IP Unity's Hamiony6000 Enhanced Services Platform Speaks Out," Press Release, Feb. 4, 2003, GOOGLE-HDI-PA-0006695, (1 Page).
IP Unity, "Mereon™ Application Server," 1999-2005, GOOGLE-HDI-PA-0006696, (2 Pages).
IP Unity, "Solutions," 2005, GOOGLE-HDI-PA-0006698, (1 Page).
Venture Development Corporation, "IP Multimedia Subsystems (IMS) for Wireline and Wireless Applications: A Global Market Analysis," Marker Research Report, Jul. 2005, GOOGLE-HDI-PA-0006699, (115 Pages).
Syntellect Inc., "Syntellect Launches New Version of Flagship Product—Vista 4.1," Mar. 31, 2003, GOOGLE-HDI-PA-0006814, (1 Page).
Syntellect Inc., "Computer Telephony Integration (CTI) Using Syntellect's Vista Interaction Server," 2002, GOOGLE-HDI-PA-0006815, (2 Pages).
Syntellect, "Syntellect launches Vista—it's next-generation computer telephony platform based on open software standards," Aug. 28, 1999, GOOGLE-HDI-PA-0006817, (3 Pages).
Syntellect, "Syntellect Announces Vista 5.0," Sep. 1, 2004, Speech Technology News, GOOGLE-HDI-PA-0006820, (2 Pages).
Syntellect, "Vista (4.1) Product Guide," Mar. 27, 2003, GOOGLE-HDI-PA-0006822, (35 Pages).
Visibridge, "Products," 2003, GOOGLE-HDI-PA-0006857, (1 Page).
Kirusa, "Voxpilot and Kirusa to Showcase Kirusa Voice SMS Multimodal Application Deployed on Voxpilot's Carrier-Grade Open Media," Capture timestamp (UTC): Mon, Dec. 16, 2019, GOOGLE-HDI-PA-0006858, (1 Page).
411.PerfectXML.com, "Voxpilot Limited," 2004, GOOGLE-HDI-PA-0006859, (1 Page).
Voxpilot Limited, "Open Media Platform 3.2," Aug. 2007, GOOGLE-HDI-PA-0006860, (4 Pages).
Defendant Google LLC's Preliminary Invalidity Contentions, *Hammond Development International, Inc.* v. *Google LLC*; Civil Action No. 6:19-cv-00356-ADA (Consolidated under Lead Case Civ. Action No. 6:19-cv-00355-ADA) in the U.S. District Court for the Western District of Texas, Waco Division, filed Dec. 23, 2019 (147 pages).

(56) References Cited

OTHER PUBLICATIONS

Bacchiani, et al., "Deploying GOOG-411: Early Lessons in Data, Measurement, and Testing," 2008 IEEE International Conference on Acoustics, Speech and Signal, 2008, GOOGLE-HDI-PA-0002555, (4 Pages), available at https://static.googleusercontent.com/media/research.google.com/en//archive/goog411.pdf.

Google LLC, "GOOG-411," 2008, (1 Page), available at https://web.archive.org/web/20080411003124/http:/www.google.com:80/goog411/.

Google LLC, "1-800-GOOG-411: Google's 411 service," YouTube video, Sep. 16, 2007, available at: https://www.youtube.com/watch?v=cN0q8SvlQAk.

Google LLC, "Google Revenues Up, Up, Up," Oct. 19, 2006, Sterling Word Press Screenwerk, available at https://gesterling.wordpress.com/2006/10/19/.

Carolina Wiring Service, Inc., "HAL2000 Home Automation System," 1999-2004, GOOGLE-HDI-PA-0004930, (1 Page).

Home Automated Living, Inc., "Welcome to Home Automated Living and HAL," Capture timestamp (UTC): Fri, Oct. 25, 2019, Capture URL: https://web.archive.org/web/20060111104454/http://www.automatedliving.com/default.htm, GOOGLE-HDI-PA-0004931, (1 Page).

Home Automated Living, Inc., "Download FAQs: Is there a demo of the software available?," Capture timestamp (UTC): Fri, Oct. 25, 2019, Capture URL: https://web.archive.org/web/20060320201902/http://www.automatedliving.com/popups_faqs/demo.htm, GOOGLE-HD I-PA-0004932, (1 Page).

Home Automated Living, Inc., "Downloads," 2001-2005, GOOGLE-HDI-PA-0004933, (1 Page).

Home Automated Living, Inc., "Features List," 2001-2003, GOOGLE-HDI-PA-0004934, (1 Page).

Home Automated Living, Inc., "HAL deluxe," Capture timestamp (UTC): Fri, Oct. 25, 2019, Capture URL: https://web.archive.org/web/20060207203124/http://www.automatedliving.com/products_haldel.shtml, GOOGLE-HDI-PA-0004935, (1 Page).

Home Automated Living, Inc., "HAL2000," Capture timestamp (UTC): Fri, Oct. 25, 2019, GOOGLE-HDI-PA-0004936, (1 Page).

Home Automated Living, Inc., "HAL Voice Portals," Capture timestamp (UTC): Fri, Oct. 25, 2019, GOOGLE-HDI-PA-0004937, (1 Page).

Binary Slave, "Hal2000 Home Automation pt1—YouTube," Jan. 24, 2011, GOOGLE-HDI-PA-0004938, (2 Pages).

Binary Slave, "Hal2000 Home Automation pt 2—YouTube," Jan. 22, 2011, GOOGLE-HDI-PA-0004940, (2 Pages).

ComradeSch, "LGR Plays With HAL 2000—YouTube," Aug. 12, 2018, GOOGLE-HDI-PA-0004942, (2 Pages).

Jay Romano, "Your Home; Computers That Tend the Home," Mar. 15, 1996, The New York Times, GOOGLE-HDI-PA-0004944, (4 Pages).

Assistive Technology Australia, "HAL2000 Voice Operated System," Capture timestamp (UTC): Thu, Nov. 21, 2019, Capture URL: https://at-aust.org/items/7425#product_details, GOOGLE-HDI-PA-0004948, (2 Pages).

Home Automated Living, Inc., "HAL2000 v2.0 Home Operation System," 2019, Messe Frankfurt New Era Business Media Ltd., GOOGLE-HDI-PA-0004950, (1 Page).

Home Automated Living, Inc., "Products," Capture timestamp (UTC): Fri, Oct. 25, 2019, GOOGLE-HDI-PA-0004951, (1 Page).

Tim Shriver, "HAL2000—YouTube," Nov. 15, 2012, GOOGLE-HDI-PA-0004952, (2 Pages).

TCS61, "Tim's House with HAL2000—YouTube," Jan. 11, 2012, GOOGLE-HDI-PA-0004954, (2 Pages).

Home Automated Living, Inc., "HAL2000 Version 1.2.2," Oct. 1, 1998, GOOGLE-HDI-PA-0004956, (4 Pages).

Home Automated Living, Inc., "Version Technical Details," 2001-2005, GOOGLE-HDI-PA-0004960, (3 Pages).

Convergys Corp., "Product Announcement: Convergys SpeechPort Open Hosting Environment Delivers Unique Platform for Speech Solutions," Business Wire, Oct. 25, 2005, (1 Page).

I. V. Ramakrishana, et al., "Hearsay: Enabling Audio Browsing on Hypertext Content," May 17-22, 2004, WWW2004, GOOGLE-HDI-PA-0004964, (10 Pages).

Yevgen Borodin, et al., "The Hearsay Non-Visual Web Browser," May 7, 2007, Department of Computer Science, Stony Brook University, GOOGLE-HDI-PA-0004974, (2 Pages).

Nicole Yankelovich, et al., "Designing SpeechActs: Issues in Speech User Interfaces," May 7-11, 1995, Sun Microsystems Laboratories, CHI '95 Conference on Human Factors in Computing Systems, Denver, CO, GOOGLE-HDI-PA-0004976, (8 Pages).

Paul Martin, et al., "SpeechActs: A Testbed for Continuous Speech Applications," 1994, GOOGLE-HD I-PA-0004984, (7 Pages).

Nicole Yankelovich, et al., "SpeechActs: A Framework for Building Speech Applications," 1994, Sun Microsystems Laboratories, Inc., GOOGLE-HD I-PA-0004991, (10 Pages).

Lucent Technologies, "MiLife® VoiceXML Gateway for Service Providers," Capture timestamp (UTC): Mon, Dec. 16, 2019, GOOGLE-HD I-PA-0005001, (1 Page).

MATLAB®, "The Language of Technical Computing," Getting Started with MATLAB® Version 7, The MathWorks, GOOGLE-HDI-PA-0005002, (188 Pages).

MATLAB®, "MATLAB® Web Server," Version 1, GOOGLE-HDI-PA-0005190, The MathWorks, (80 Pages).

Alex Green, "Fluency Voice Technology," Sep. 1, 2003, GOOGLE-HDI-PA-0005270, (2 Pages).

Nuance, "Fluency Voice Technology and Nuance Team to Deliver Packaged Speech Applications for the Travel and Transportation Markets," Jun. 5, 2003, Business Wire, GOOGLE-HD I-PA-0005272, (2 Pages).

Fluency Voice Technology, "Standard Life Bank implements Fluency speech recognition technology," Feb. 9, 2006, GOOGLE-HD I-PA-0005278, (2 Pages).

Envox US LTD, "Envox Worldwide and Metaphor Solutions Partner to Deliver VoiceXML-Based Speech Solutions," Sep. 29, 2003, GOOGLE-HDI-PA-0005280, (2 Pages).

Envox US LTD, "Envox Worldwide Launches Envox 6.1 Communications Development Platform," Speech Technology, Apr. 1, 2005, GOOGLE-HD I-PA-0005282, (2 Pages).

Envox US LTD, "Envox Communications Development Platform 7.1," 2008, GOOGLE-HD I-PA-0005284, (4 Pages).

Genesys Telecommunications Laboratories, Inc., "Genesys Voice Platform 8.0," Deployment Guide, 2002-2008, GOOGLE-HDI-PA-0005288, (158 Pages).

Genesys Telecommunications Laboratories, Inc., "Genesys Voice Platform 8.1," Deployment Guide, 2002-2013, GOOGLE-HDI-PA-0005446, (522 Pages).

Genesys Telecommunications Laboratories, Inc., "Genesys Media Server 8.5," Deployment Guide, 2008-2013, GOOGLE-HDI-PA-0005968, (190 Pages).

Genesys Telecommunications Laboratories, Inc., "GVP Deployment Guide," Genesys Voice Platform 9.0.x, Nov. 22, 2019, GOOGLE-HDI-PA-0006158, (190 Pages).

Genesys, "Genesys Voice Platform," Release Notes, Capture timestamp (UTC): Mon, Dec. 16, 2019, GOOGLE-HDI-PA-0006568, (3 Pages).

Genesys, "Genesys Voice Platform," What's New, Capture timestamp (UTC): Mon, Dec. 16, 2019, GOOGLE-HDI-PA-0006571, (2 Pages).

Metaphor Solutions, Inc., "Metaphor Teams Up with Genesys to Provide Low Cost, High Quality Speech IVR Solutions on the Genesys Voice Platform," Nov. 1, 2004, Business Wire, GOOGLE-HDI-PA-0006573, (1 Page).

VoiceGenie Technologies, Inc., et al., "Open Standards-based Voice Services Platform," 2002, GOOGLE-HDI-PA-0006595, (15 Pages).

VoiceGenie Technologies, Inc., "The Complete Platform Offering Freedom to Choose," downloaded Oct. 11, 2019, GOOGLE-HDI-PA-0006610, (5 Pages).

VoiceGenie Technologies, Inc., "See VoiceGenie Application Now!," downloaded Oct. 11, 2019, GOOGLE-GOOGLE-HDI-PA-0006615, (4 Pages).

VoiceGenie Technologies, Inc., "VoiceGenie 7," downloaded Dec. 15, 2019, GOOGLE-HDI-PA-0006619, (1 Page).

(56) References Cited

OTHER PUBLICATIONS

VoiceGenie Technologies, Inc., "VoiceGenie VoiceXML Gateway Overview," GOOGLE-HDI-PA-0006620, (2 Pages).
VoiceGenie Technologies, Inc., "VoiceGenie 7—Introduction," GOOGLE-HDI-PA-0006622, (10 Pages).
VoiceGenie Technologies, Inc., "VoiceGenie Launches the VoiceGenie 7.0 VoiceXML Media Platform for Delivering Advanced Customer Contact Solutions and Next Generation Network Applications," Aug. 1, 2005, SpeechTEK, New York, GOOGLE-HDI-PA-0006632, (2 Pages).
M. Handley, et al. "SDP: Session Description Protocol," Network Working Group, The Internet Society, Apr. 1998, AMZN_HDI_012563, (42 Pages).
H. Schulzrinne, et al., "Real Time Streaming Protocol (RTSP)," Network Working Group, The Internet Society, Apr. 1998, AMZN_HDI_012605, (92 Pages).
"CVM features," Jan. 27, 1999, AMZN_HDI_012703, (1 Page).
M. Handley, et al., "SIP: Session Initiation Protocol," Network Working Group, The Internet Society, Mar. 1999, AMZN_HDI_012712, (153 Pages).
Microsoft, "Microsoft® SoftGrid® Application Virtualization: Under the Covers," Exploring the SoftGrid Platform1 v4.1, Feb. 2007, AMZN_HDI_013682, (32 Pages).
Judie Stanford, "HTC Universal Windows Mobile 5 Pocket PC Phone," The Gadgeteer, Mar. 10, 2006, AMZN_HDI_014223, (28 Pages).
Meni Meller, "Sun Virtual Desktop Infrastructure Solutions," Sun Microsystems, AMZN_HDI_014251, (37 Pages).
"UConnect Hands Free Communications?Complete Instructions," 300c Form, Jan. 28, 2007, AMZN_HDI_016910, (11 Pages).
"Introduction to Virtual Desktop Manager," vmware, Introduction to Virtual Desktop Manager, Revision: May 27, 2008, Item: VDM-ENG-QI 08-451, 2008, AMZN_HDI_019533, (32 Pages).
Lei Wang, et al. "Automatic Partitioning of Object-Oriented Programs for Resource-Constrained Mobile Devices with Multiple Distribution Objectives," Department of Computer Science, University of California, Irvine, 1521-9097/08, 2008, IEEE, DOI 10.1109/ICPADS.2008.84, AMZN_HDI_019600, (8 Pages).
"Windows Programming Environment Tools," AMZN_HDI_019669, (3 Pages).
Communications, Inc., "Supported Phone," EQO, AMZN_HDI_019803, Dec. 10, 2019, (1 Page).
Brian S. Madden, et al., "Terminal Services for Microsoft Windows Server 2003," Advanced Technical Design Guide, AMZN_HDI_021321, (511 Pages).
Eve Andersson, et al., "Introduction—Part of Software Engineering for Internet Applications," AMZN_HDI_022348, (4 Pages).
Eve Andersson, et al., "Distributed Computing with HTTP, XML, SOAP, and WSDL," Part of Software Engineering for Internet Applications, AMZN_HDI_022352, (7 Pages).
Eve Andersson, et al., "Discussion—Discussion Forum as Community," Part of Software Engineering for Internet Applications, Feb. 2005, AMZN_HDI_022359, (12 Pages).
Eve Andersson, et al., "Planing Redux," Part of Software Engineering for Internet Applications, AMZN_HDI_022371, (5 Pages).
Eve Andersson, et al., "Content Management," Part of Software Engineering for Internet Applications, Feb. 2005, AMZN_HDI_022376, (25 Pages).
Eve Andersson, et al., "Metadata (and Automatic Code Generation)," Part of Software Engineering for Internet Applications, AMZN_HDI_022401, (12 Pages).
Eve Andersson, et al., "Planning," Part of Software Engineering for Internet Applications, AMZN_HDI_022413, (9 Pages).
Eve Andersson, et al., "Scaling Gracefully," Part of Software Engineering for Internet Applications, Feb. 2005, AMZN_HDI_022422, (15 Pages).
Eve Andersson, et al., "Basics—Old-Style Communications Protocols," part of Software Engineering for Internet Applications, Feb. 2005, AMZN_HDI_022437, (23 Pages).

Eve Andersson, et al., "Software Engineering for Internet Applications," MIT Press ISBN 0262511916, 2006, AMZN_HDI_022460, (1 Page).
Eve Andersson, et al., "Writeup," part of Software Engineering for Internet Applications, AMZN_HDI_022461, (7 Pages).
Eve Andersson, et al., "User Activity Analysis ," part of Software Engineering for Internet Applications, AMZN_HDI_022468, (3 Pages).
Eve Andersson, et al., "Software Modularity," part of Software Engineering for Internet Applications, AMZN_HDI_022471, (12 Pages).
Eve Andersson, et al., "User Registration and Management," part of Software Engineering for Internet Applications, Apr. 2003, AMZN_HDI_022483, (12 Pages).
Eve Andersson, et al., "Software Structure," part of Software Engineering for Internet Applications, Feb. 2005, AMZN_HDI_022495, (7 Pages).
Eve Andersson, et al., "Adding Mobile Users to Your Community," part of Software Engineering for Internet Applications, Feb. 2005, AMZN_HDI_022502, (7 Pages).
Eve Andersson, et al., "Search," part of Software Engineering for Internet Applications, Feb. 2005, AMZN_HDI_022509, (11 Pages).
Philip Greenspun, "Chapter 6: Adding Images to Your Site," Philip and Alex's Guide to Web Publishing, Revised Jun. 2003, AMZN_HDI_022520, (9 Pages).
Eve Andersson, et al., "Voice (VoiceXML)," part of Software Engineering for Internet Applications, revised Feb. 2005, AMZN_HDI_022529, (8 Pages).
Philip Greenspun, "Chapter 3: Scalable Systems for Online Communities," Philip and Alex's Guide to Web Publishing, Revised Jun. 2003, AMZN_HDI_022537, (12 Pages).
Philip Greenspun, "Chapter 12: Database Management Systems," Philip and Alex's Guide to Web Publishing, Revised Jul. 2003, AMZN_HDI_022549, (19 Pages).
Philip Greenspun, "Chapter 17: A Future So Bright You'll Need to Wear Sunglasses ," Philip and Alex's Guide to Web Publishing, AMZN_HDI_022568, (13 Pages).
Philip Greenspun, "Chapter 5: Learn to Program HTML in 21 Minutes," Philip and Alex's Guide to Web Publishing, Revised Jun. 2003, AMZN_HDI_022581, (13 Pages).
Philip Greenspun, "Chapter 11: Sites that are really databases," Philip and Alex's Guide to Web Publishing, Revised Jun. 2003, AMZN_HDI_022607, (6 Pages).
Philip Greenspun, "Chapter 1: Envisioning a Site That Won't Be Featured in suck.com," Philip and Alex's Guide to Web Publishing, Revised Jun. 2003, AMZN_HDI_022613, (10 Pages).
Philip Greenspun, "Chapter 15: Case Studies," Philip and Alex's Guide to Web Publishing, very slightly revised to remove dead links in Sep. 2004, AMZN_HDI_022623, (17 Pages).
Philip Greenspun, "Chapter 7: Publicizing Your Site (Without Irritating Everyone on the Net)," Philip and Alex's Guide to Web Publishing, Revised Jun. 2003, AMZN_HDI_022640, (6 Pages).
Philip Greenspun, "Chapter 2: So You Want to Join the World's Grubbiest Club: Internet Entrepreneurs," Philip and Alex's Guide to Web Publishing, Revised Jun. 2003, AMZN_HDI_02264, (10 Pages).
Philip Greenspun, "Chapter 14: ecommerce," Philip and Alex's Guide to Web Publishing, AMZN_HDI_022657, (15 Pages).
Philip Greenspun, "Chapter 8: So You Want to Run Your Own Server," Philip and Alex's Guide to Web Publishing, Revised May 2008, AMZN_HDI_022672, (12 Pages).
Philip Greenspun, "Chapter 10: Sites That Are Really Programs ," Philip and Alex's Guide to Web Publishing, Revised Jul. 2003, AMZN_HDI_022684, (11 Pages).
Philip Greenspun, "Chapter 11: Choosing a Relational Database," part of Database-backed Web Sites, (New Edition), AMZN_HDI_022695, (19 Pages).
Philip Greenspun, "Chapter 1: Envisioning a Site That Won't Be Featured In suck.com," part of Database-backed Web Sites, (New Edition), AMZN_HDI_022613, (9 Pages).
Philip Greenspun, "Database-backed Web Sites," updated Mar. 1997, AMZN_HDI_022723, (8 Pages).

(56) References Cited

OTHER PUBLICATIONS

Philip Greenspun, "Chapter 9: User Tracking," Philip and Alex's Guide to Web Publishing, Revised (lightly) Jul. 2003, AMZN_HDI_022731, (7 Pages).
Philip Greenspun, "Chapter 15: A Future So Bright You'll Need to Wear Sunglasses," Database-backed Web Sites, (New Edition), AMZN_HDI_022738, (15 Pages).
Philip Greenspun, "Chapter 12: Interfacing a Relational Database to the Web," Database-backed Web Sites, (New Edition), AMZN_HDI_022753, (12 Pages).
Adam Cheyer, "Comparison with Other Mail Managers," Aug. 12, 1996, SRI International, GOOGLE-HDI-PA-0004215, (1 Page).
Adam Cheyer, "Definitions and Objectives," Aug. 12, 1996, SRI International, GOOGLE-HDI-PA-0004216, (1 Page).
Adam Cheyer, "Distributed Blackboard Architecture," Aug. 12, 1996, SRI International, GOOGLE-HDI-PA-0004217, (1 Page).
SRI International, "Natural User Interfaces for the Augmented World—Enhanced Multimodal—Conferencing Environment," GOOGLE-HDI-PA-0004218, (1 Page).
Adam Cheyer, "Example Scenario," Aug. 12, 1996, SRI International, GOOGLE-HDI-PA-0004219, (1 Page).
Adam Cheyer, "Example," Aug. 12, 1996, SRI International, GOOGLE-HDI-PA-0004220, (1 Page).
Adam Cheyer, "Future Plans," Aug. 12, 1996, SRI International, GOOGLE-HDI-PA-0004221, (1 Page).
"ICL Communication," Capture timestamp (UTC): Fri, Nov. 15, 2019, Capture URL: http://www.ai.sri.com/~oaa/distribution/v2.3//doc/tutorial/icl.html, GOOGLE-HDI-PA-0004222, (2 Pages).
Adam Cheyer, "Implementation," Aug. 12, 1996, SRI International, GOOGLE-HDI-PA-0004224, (1 Page).
Adam Cheyer, "InfoWiz Project," SRI International, Capture URL: http://www.ai.sri.com/~oaa/infowiz.html, GOOGLE-HDI-PA-0004225, (1 Page).
Adam Cheyer, "Introduction," Aug. 12, 1996, SRI International, GOOGLE-HDI-PA-0004227, (1 Page).
SRI International, Maestro, "A system for Orchestrating Multimedia Data," 1999, GOOGLE-HDI-PA-0004228, (1 Page).
SRI International, "Maestro.jpg (80Qx640)," Capture timestamp (UTC): Wed, Nov. 13, 2019, Capture URL: http://www.ai.sri.com/~oaa/chic/projects/images/Maestro.jpg, GOOGLE-HDI-PA-0004229, (1 Page).
SRI International, "Maestro: Conductor of Multimedia Analysis Technologies," GOOGLE-HDI-PA-0004230, (8 Pages).
Ze'ev Rivlin, "Maestro: Conductor of Multimedia Analysis Technologies," 1999, SRI International, GOOGLE-HDI-PA-0004239, (2 Pages).
Ze'ev Rivlin, et al., "Maestro: Conductor of Multimedia Analysis Technologies," 1999, SRI International, GOOGLE-HDI-PA-0004241, (7 Pages).
Adam Cheyer, "Mail Management," Aug. 12, 1996, SRI International, GOOGLE-HDI-PA-0004248, (1 Page).
SRI International, "Modular Video Imagery Exploitation Work Station," Capture timestamp (UTC): Wed, Nov. 13, 2019, Capture URL: http://www.ai.sri.com/~oaa/mviews/index.html, GOOGLE-HDI-PA-0004248, (2 Pages).
Adam Cheyer, "Multimodal Maps: Demonstration," Jun. 1995, SRI International, GOOGLE-HDI-PA-0004251, (1 Page).
Adam Cheyer, "Multimodal Maps: An Agent-based Approach," Feb. 19, 1995, SRI International, GOOGLE-HDI-PA-0004252, (1 Page).
SRI International, "Open Agent Architecture (OAA)—Developer's Guide," Version 2.3.1, Capture timestamp (UTC): Fri, Nov. 15, 2019, GOOGLE-HDI-PA-0004253, (16 Pages).
SRI International, "OAA News—What's happening in the world of OAA . . . ," OAA version 2.3.2, 1999-2002, GOOGLE-HDI-PA-0004269, (2 Pages).
SRI International, OAA Philosophy, Capture timestamp (UTC): Fri, Nov. 15, 2019, Capture URL: http://www.ai.sri.com/~oaa/distribution/v2.3//doc/tutorial/philosophy.html, GOOGLE-HDI-PA-0004271, (1 Page).
SRI International, "OAA Tutorial: What you need to know," Capture timestamp (UTC): Fri, Nov. 15, 2019, Capture URL: http://www.ai.sri.com/~oaa/distribution/v2.3//doc/tutorial/index.html, GOOGLE-HDI-PA-0004272, (1 Page).
SRI International, "Open Agent Architecture (OAA) v2.x FAQ," Capture timestamp (UTC): Fri, Nov. 15, 2019, Capture URL: http://www.ai.sri.com/~oaa/distribution/doc/oaa-faq-v2.html, GOOGLE-HDI-PA-0004273, (2 Pages).
Adam Cheyer, "Operational Agents," Aug. 12, 1996, SRI International, GOOGLE-HDI-PA-0004277, (1 Page).
Adam Cheyer, "References," Aug. 12, 1996, SRI International, GOOGLE-HDI-PA-0004278, (1 Page).
SRI International, "Running OAA Apps," Capture timestamp (UTC): Fri, Nov. 15, 2019, Capture URL: http://www.ai.sri.com/~oaa/distribution/v2.3//doc/tutorial/run_apps.html, GOOGLE-HDI-PA-0004280, (1 Page).
SRI International, "iwtimeln.jpg (80Qx2500)," Feb. 19, 1995, Capture timestamp (UTC): Wed, Nov. 13, 2019, Capture URL: http://www.ai.sri.com/~oaa/images/iwtimeln.jpg, GOOGLE-HDI-PA-0004281, (1 Page).
SRI International, "Speech-Enabled Web Access," Capture timestamp (UTC):Wed, Nov. 13, 2019, Capture URL: http://www.speech.sri.com/demos/announcement.html, GOOGLE-HDI-PA-0004282, (1 Page).
SRI International, "Natural User Interfaces for the Augmented World—Simple Ui to Retrieve Favorites," GOOGLE-HDI-PA-0004283, (1 Page).
SRI International, "The Open Agent Architecture (OAA)," Capture timestamp (UTC): Wed, Nov. 13, 2019, Capture URL: http://www.ai.sri.com/~oaa/, GOOGLE-HDI-PA-0004273, (1 Page).
SRI International, "maparchi.gif (64Qx480)," Feb. 19, 1995, Capture timestamp (UTC): Wed, Nov. 13, 2019, Capture URL: http://www.ai.sri.com/~cheyer/maparchi.gif, GOOGLE-HDI-PA-0004285, (1 Page).
SRI International, "Natural User Interfaces for the Augmented World—Multimedia Augmented Tutoring Environment for Travel," GOOGLE-HDI-PA-0004286, (1 Page).
SRI International, "Writing Agents," Capture timestamp (UTC): Fri, Nov. 15, 2019, Capture URL: http://www.ai.sri.com/~oaa/distribution/v2.3//doc/tutorial/make_agt.html, GOOGLE-HDI-PA-0004288, (3 Pages).
BeVocal Inc., VoiceXML Programmer's Guide, 2005, GOOGLE-HD I-PA-0004291, (396 Pages).
BeVocal Inc., "BeVocal Platform Service Quick Reference," Part No. 520-0031-01 R02, GOOGLE-HDI-PA-0004687, (4 Pages).
BeVocal Inc., "Using BeVocal Platform Services," Part No. 520-0021-01 R01, GOOGLE-HD I-PA-0004724, (8 Pages).
Duran Medine, "Prody Parrot 2.0 Desktop Assistant for Windows—YouTube," Jun. 25, 2019, GOOGLE-HDI-PA-0004732, (2 Pages).
Mindmaker, Inc., "FlexVoice," 2001, GOOGLE-HDI-PA-0004734, (1 Page).
Mindmaker, Inc., "Game Commander," 2003, GOOGLE-HDI-PA-0004735, (1 Page).
Mindmaker, Inc., "Machine Learning," 2001, GOOGLE-HDI-PA-0004736, (1 Page).
Mindmaker, Inc., "mindmaker for the Thinking World," 2001, GOOGLE-HDI-PA-0004737, (1 Page).
Mindmaker Ltd., "Prody Parrot™," Version 2.0, User's Guide, 1999, GOOGLE-HDI-PA-0004738, (186 Pages).
Mindmaker Inc., "Prody Parrot: Free Download, Borrow, and Streaming : Internet Archive," 1999, GOOGLE-HDI-PA-0004924, (1 Page).
Mindmaker, Inc., "Speech and Audio," 2001, GOOGLE-HDI-PA-0004925, (1 Page).
Mindmaker, Inc., "TiSento ASR," 2001, GOOGLE-HDI-PA-0004926, (1 Page).
RCT3Crashes100, "Prody Parrot on Windows XP!—YouTube," Dec. 8, 2015, GOOGLE-HDI-PA-0004927, (2 Pages).
ASIHome, "HAL2000 Voice Control Home Automation Software," Nov. 21, 2019, GOOGLE-HDI-PA-0004929, (1 Page).
Avaya, Inc., "Installing and Configuring Avaya Voice Portal 4.0," Jun. 2007, AMZN_HDI_008316 , (pp. 125).

(56) References Cited

OTHER PUBLICATIONS

Avaya, Inc., "Avaya IP Voice Quality Network Requirements," Issue 3.0, Apr. 2004, AMZN_HDI_008666, (30 Pages).
Avaya, Inc., "Application Notes for Loquendo Speech Suite with Avaya Voice Portal—Issue 1.0," Apr. 14, 2008, AMZN_HDI_008818, (23 Pages).
Avaya, Inc., "Troubleshooting Voice Portal," Jan. 2008, AMZN_HDI_014316, (139 Pages).
Avaya, Inc., "Configuring Avaya Voice Portal with Avaya Communication Manager and Designing a Sam pie Speech Application using Avaya Dialog Designer—Issue 1.0," Sep. 20, 2006, AMZN_HDI_019297, (54 Pages).
Avaya, Inc., "VP Agent Installation and Configuration," Magpie Telecom Insiders, Apr. 23, 2008, AMZN_HDI_019595, (5 Pages).
Avaya, Inc., "Avaya Voice Portal—Harness the Power of Self Service to Connect with Your Customers and lower Costs," Product Brief, AMZN_HDI_020037, 2009, (4 Pages).
"Nortel launches MCS 5100 worldwide," ComputerWeekly.com, Dec. 16, 2019, AMZN_HDI_022960,(3 Pages).
Nortel, "Nortel Global Product and Solution Reference Guide," Version 5, Jul. 2005, AMZN_HDI_022963, (267 Pages).
Tim Greene, "Nortel to integrate MCS with Microsoft Outlook," Networkworld, Jun. 6, 2005, AMZN_HDI_022958, (2 Pages).
Nortel, "Solution Integration Guide for Multimedia Communication Server 51 00/WLAN/Blackberry Enterprise Server," NN49000-302, May 24, 2007, AMZN_HDI_010124, (42 Pages).
"Nortel Multimedia Communication Server MCS 5100 Frequently Asked Questions," Oct. 1, 2007, AMZN_HDI_008925 (22 Pages).
Nortel, "Product Brief Communication Server 1000E," 2008, AMZN_HDI_004 789, (4 Pages).
Guy Kempny, et al., "IBM WebSphere Voice Systems Solutions," Jan. 2003, AMZN_HDI_025673, (602 Pages).
Carla Sadtler, et al., "WebSphere Application Server V6.1 Planning and Design," IBM, Redbooks, Oct. 2006, AMZN_HDI_024206, (330 Pages).
Aleksandr Nartovich, et al., "WebSphere Development Studio Client for iSeries Bringing New Life into 5250 Applications," IBM, Redbooks, Sep. 2002, AMZN_HDI_023906, (300 Pages).
IBM, "Multimodal Tools V4.1.2 I 4.1.2.2 Frequently Asked Questions," Jul. 2004, AMZN_HDI_008891, 9 pages.
IBM, "Developing X+V Applications Using the Multimodal Tools," IBM White Paper, May 2003, AMZN_HDI_006504, (15 Pages).
"Opera Multimodal Desktop Browser Supports XHTML+Voice (X+V) Specification.," Cover Stories, Mar. 23, 2004, AMZN_HDI_023339, (7 Pages).
Jonny Axelsson, et al., "XHTML+Voice Profile 1.0," W3C Note, Dec. 21, 2001, HDI_020497, (10 Pages).
Pal A. Hvistendahl, "Opera gets to talking: Developers Can Use Opera to Enable Speech in Multimodal Applications," Opera press, Jul. 26, 2004, AMZN_HDI_023372, (3 Pages).
"Multimodal Browser," Opera Software, AMZN_HDI_023346, (2 Pages).
Clinton Boulton, "Opera Will Create Multimodal Browser," InternetNews, Jul. 24, 2002, AMZN_HDI_023323, (2 Pages).
IBM, "About the IBM Software Development Platform," 2004, AMZN_HDI_023387, (4 Pages).
Linda Hirsch, "WebSphere Application Server for iSeries—Introduction," Feb. 2005, AMZN_HDI_023841, (54 Pages).
Opera, "Browse the way you want," AMZN_HDI_023895, (11 Pages).
Peter Kovari, et al., "IBM WebSphere V5.0 Security WebSphere Handbook Series," Redbooks, 2002, AMZN_HDI_025111, (562 Pages).
Google Voice Search, "Search on Google by voice with a simple telephone call," Jan. 3, 2020, (1 Page), available at https://web.archive.org/web/20021104230053/http://labs1.google.com/gvs.html.
Google Voice Search, "SafeSearch is ON," Jan. 3, 2020, 1 Page), available at https://web.archive.org/web/20021104230402/http://labs1.google.com/cgi-bin/gvs.
Genesys Telecommunications Laboratories, Inc., "About This Software," Genesys Voice Platform Release 8.1, 2013, AMZN_HDI_003851, (14 Pages).
Genesys Telecommunications Laboratories, Inc., "Genesys Voice Platform 8.0," User's Guide, 2008, AMZN_HDI_004353, (340 Pages).
Genesys Telecommunications Laboratories, Inc., "Genesys Voice Platform," 2008, AMZN_HDI_008288, (8 Pages).
Jonathan Davidson, et al., "Voice over IP Fundamentals," Cisco Press, Second Edition, 2007, AMZN_HDI_006625, (428 Pages).
Silvano Da Ros, "Content Networking Fundamentals," 2006, AMZN_HDI_007118, (577 Pages).
Mauricio Arregoces, et al., "Data Center Fundamentals," 2004, AMZN_HDI_008995, (1105 Pages).
Sybase, "Installation Guide," Adaptive Server® Enterprise 12.5.4, Jun. 2006, AMZN_HDI_008514, (152 Pages).
Sybase, "Client-Library™/C Reference Manual," Open Client™ 12.5.1, Sep. 2003, AMZN_HDI_015663, (618 Pages).
Oracle® Developer Suite, "Installation Guide," 10g Release 2 (10.1.2) for Solaris, Windows and Linux x86, B16012-04, Oct. 2006, AMZN_HDI_010166, (112 Pages).
Oracle®—Oracle9i Net Services, "Administrator's Guide," Release 2 (9.2), Part No. A96580-02, Oct. 2002, AMZN_HDI_010288, (602 Pages).
Oracle® Database, "Concepts," 10g Release 2 (10.2), B14220-02, Oct. 2005, AMZN_HDI_010890, (542 Pages).
Softricity, "Softricity® SoftGrid® Platform v4.0 Administrator's Guide," v1.0, 2006, AMZN_HDI_013593, (86 Pages).
Alon Y. Levy, et al., "Data Model and Query Evaluation in Global Information Systems," May 1, 1991, AMZN_HDI_003764, (23 Pages).
John Gaffney, "Illustra's Web DataBlade Module," An Illustra Technical White Paper, SIGMOD Record, vol. 25, No. 1, Mar. 1996, AMZN_HDI_007074, (8 Pages).
James Middleton, "EQO brings VoIP to mobile," Telecoms.com. May 23, 2007, available at https://telecoms.com/3979/eqo-brings-voip-to-mobile/, AMZN_HDI_007082, (3 Pages).
"Installing, Using, and Administering Remote Desktop Services," Chapter 25, 32867c25.indd 1067-1115, Dec. 14, 2009, AMZN_HDI_008464, (50 Pages).
Philip Greenspun, "Chapter 16: Better Living Through Chemistry," Philip and Alex's Guide to Web Publishing, Jul. 2003, AMZN_HDI_022594, (11 Pages).
Philip Greenspun, "Is it any good," Philip and Alex's Guide to Web Publishing, Apr. 1999, AMZN_HDI_022605, (2 Pages).
Shumao Ou, et al. "An Adaptive Multi-Constraint Partitioning Algorithm for Offloading in Pervasive Systems," University of Essex, Department of Electronic Systems Engineering, UK, Proceedings of the Fourth Annual IEEE International Conference on Pervasive Computing and Communications (PERCOM'06) 0-7695-2518-0/06, 2006, AMZN_HDI_010278, (10 Pages).
Fernando G. Guerrero, et al., "Microsoft SQL Server 2000 Programming by Example," Que® Corporation, 2001, AMZN_HDI_011529, (704 Pages).
"Philips Nino 500—handheld—Windows CE 2.11 Specs," Philips Nino 500—handheld—Windows CE 2.111 NINO500, CNET, AMZN_HDI_012272, (7 Pages).
Laing, John, "Client/Server Setup and Implementation: Web and non-Web Environments," Advanced Tutorials, Paper 19-25, SAS Institute (Canada) Inc., Toronto, ON, (date unknown), 10 pages, retrieved from http://www2.sas.com/proceedings/sugi25/25/aa/25p019.pdf on Jan. 19, 2016.
Peterson, Jon, "Securing Real-Time Communications", ITU-T IETF Workshop, May 2005, 13 Pages, Geneva.
Oracle, "Oracle Application Server TopLink Application Developer's Guide," (date unknown), 15 pages, retrieved from: http://docs.oracle.com/cd/B14099_19/web.1012/b15901/sessions008.htm on Jan. 19, 2016.
Nieh, et al., "A Comparison of Thin-Client Computing Architectures," Technical Report CUCS-022-00, Nov. 2000, Network Computing Laboratory, Columbia University.
Schmidt, et al., "The Interactive performance of SLIM: a stateless, thin-client architecture," SOSP '99 Proceedings of the seventeenth

(56) References Cited

OTHER PUBLICATIONS

ACM symposium on Operating systems principles, Dec. 12-15, 1999, pp. 32-47, Charleston, South Carolina, USA.

* cited by examiner

METHOD AND SYSTEM FOR ENABLING A COMMUNICATION DEVICE TO REMOTELY EXECUTE AN APPLICATION

CROSS-REFERENCE TO RELATED APPLICATIONS

This application is a continuation of U.S. application Ser. No. 16/389,170, filed Apr. 19, 2019, which is a continuation of U.S. application Ser. No. 16/193,532, filed Nov. 16, 2018, which is a continuation of U.S. application Ser. No. 15/613, 756, filed Jun. 5, 2017, now U.S. Pat. No. 10,193,935, which is a continuation of U.S. application Ser. No. 15/236,644, filed on Aug. 15, 2016, now U.S. Pat. No. 9,705,937, which is a continuation of U.S. application Ser. No. 14/975,747, filed on Dec. 19, 2015, now U.S. Pat. No. 9,420,011, which is a continuation of U.S. application Ser. No. 11/779,722, filed on Jul. 18, 2007, now U.S. Pat. No. 9,264,483, the disclosures of which are hereby incorporated by reference herein in their entirety.

TECHNICAL FIELD

This disclosure relates in general to the field of communication systems, and more particularly to a method and system that enables a communication device to remotely execute an application.

BACKGROUND

Communication systems often operate to collect information from and/or provide information to one or more users of the communication system. The communication systems typically employ one or more programs that guide the collection of information from and/or the presentation of information to a user. Conventional communication systems may, in some cases, require interaction with a remote input/output device to collect information from the user during the information collection process. For example, the input/output device may provide a communication path between the user of the device and a voice processing system (VPS). The VPS may include programs that respond to audio input, such as dual-tone multi-frequency (DTMF) or voice, and produce audio output back through the network to the user.

SUMMARY OF EXAMPLE EMBODIMENTS

In one embodiment, a communication system capable of enabling one or more communication devices to remotely execute one or more applications comprises one or more communication devices that are coupled to a first communication link that comprises a data connection. At least one of the one or more communication devices is adapted to communicate a request to establish a communication session over the first communication link. In one particular embodiment, the at least one communication device is a thin-client device that provides processing services to an application substantially executed at a location remote from the at least one communication device. The system also comprises one or more application servers that are coupled to the first communication link and are operable to receive the request communicated over the first communication link. The system further comprises one or more repositories that are coupled to at least one of the one or more application servers and are operable to communicate with the one or more application servers. At least one of the one or more repositories having access to one or more applications maintained in a database coupled to the at least one repository. The at least one repository adapted to communicate the identified application over a second communication link to the at least one application server. The at least one application server adapted to execute the identified application remote from the at least one communication device and to establish the communication session with the at least one communication device. In this particular embodiment, the at least one application server communicates a request for processing service to the at least one communication device. The request for processing service is communicated to the at least one communication device over the data connection.

In another embodiment, a communication system capable of enabling one or more communication devices to remotely execute one or more applications comprises one or more communication devices that are coupled to a data connection. At least one of the one or more communication devices is operable to communicate a request to establish a communication session over the data connection. The system also includes one or more application servers that are coupled to the data connection. At least one of the one or more application servers adapted to execute an application to establish the requested communication session with the at least one communication device. In this particular embodiment, the at least one application server resides at a location remote from the at least one communication device. The at least one application server communicates a request for processing service to the at least one communication device. The request for processing service is communicated to the at least one communication device over the data connection.

In one example of a method for enabling one or more communication devices to remotely execute one or more applications, the method comprises communicating a request to establish a communication session from at least one communication device over a data connection. The method also comprises executing an application to establish the requested communication session over the data connection. The application executed remotely from the at least one communication device. The method further comprises communicating a request for processing service to the at least one communication device. In this particular embodiment, the request for processing service is communicated to the at least one communication device over the data connection.

Depending on the specific features implemented, particular embodiments of the present invention may exhibit some, none, or all of the following technical advantages. For example, various embodiments may be capable of executing an application for a thin-client device. Some embodiments may be capable of improving the efficiency of a user's interaction with a communication system. Certain embodiments of the present disclosure provide improvements for voice processing applications, including cost, performance, and availability.

Other technical advantages will be readily apparent to one skilled in the art from the following figures, description and claims. Moreover, while specific advantages have been enumerated, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION

Figure 1A:
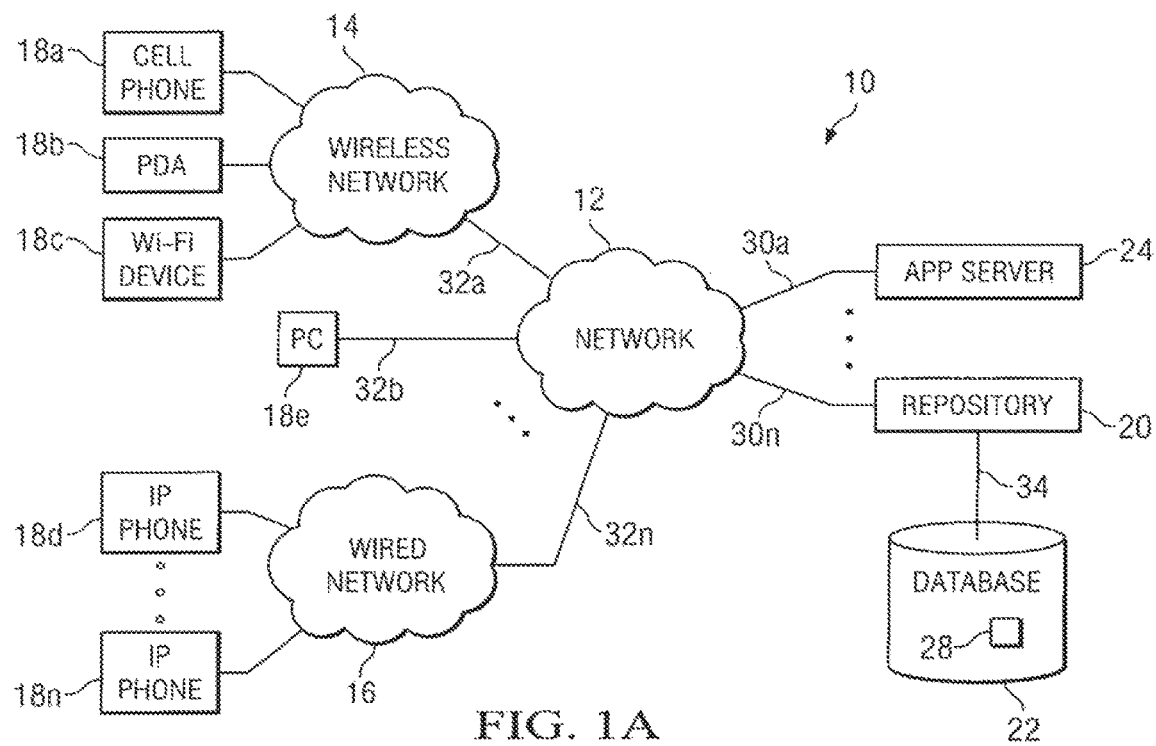
FIGS. 1A-1D illustrate example embodiments of a communication system capable of collecting information from one or more users of the system.

Particular examples and dimensions specified throughout this document are intended for exemplary purposes only, and are not intended to limit the scope of the present disclosure. In particular, this document is not intended to be limited to remote processing of voice-based applications, such as, Voice XML-based applications.

FIGS. 1A-1D are block diagrams of example embodiments of a communications system 10 capable of collecting information from one or more users of system 10. In various embodiments system 10 can comprise a network or communication system used by an entity, such as, for example, a hospital, a bank, or other business entity. It should be appreciated that other embodiments of system 10 may be used without departing from the scope of the present disclosure.

In these examples, system 10 includes one or more application servers 24 capable of performing a desired communicating and/or computing functionality, such as, for example, accessing, retrieving, and/or executing one or more system applications 28, or portions thereof. As non-limiting examples, application servers 24 could comprise some or all of a Voice XML-based system, an extensible interactive voice response (XIVR) system, an interactive web-based system, or a combination of these or other information systems. In particular embodiments, application servers 24 may include one or more software and/or firmware modules. In various embodiments, application servers 24 could comprise, for example, one or more software engines, one or more memory modules, and/or one or more speech recognition modules capable of processing Voice XML-based applications, XIVR-based applications, voice responses, text-to-speech translations, and/or speech-to-text translations.

In one particular embodiment, application servers 24 receive and/or communicate information, portions of an application, and/or one or more requests for processing service through a network 12 coupled to application server 24. As used throughout this document, the term "couple" and/or "coupled" refers to any direct or indirect communication between two or more elements, whether or not those elements are in physical contact with one another. In this example, application servers 24 couple to network 12 through one or more communications links 30. In other embodiments, application servers 24 operate to collect, store, and/or communicate information to and/or from network 12.

Network 12 may comprise any wireless network, wireline network, or combination of wireless and wireline networks capable of supporting communication between network elements using ground-based and/or space-based components.

In this particular embodiment, network 12 comprises at least a portion of the global computer network known as the Internet. In other embodiments, network 12 may comprise an information network, a public switched telephone network (PSTN), an integrated services digital network (ISDN), a local area network (LAN), a wide area network (WAN), a metropolitan area network (MAN), and/or other communication systems or combination of communication systems at one or more locations.

One or more clients 18a-18n may couple to network 12 through one or more communications links 32 and/or one or more networks 14, 16. Each client 18 may include any computing and/or communication device capable of enabling the communication of information to and/or from network 12. In some embodiments, clients 18a-18n may enable a user of system 10 to communicate information to and/or receive information from one or more of application servers 24. In other embodiments, clients 18a-18n can enable a user of system 10 to communicate information to and/or receive information from one or more repositories 20.

In various embodiments, clients 18 may comprise a thin-client. As used throughout this document the phrase "thin-client" refers to a device that provides processing services to an application executed at a location remote from the device. Each client 18 may include, for example, a wireless device, a voice over IP device, a desktop computer, a laptop computer, a personal digital assistant, a cell-phone, a Wi-Fi device, a workstation, a mainframe computer, a mini-frame computer, a web server, or any other computing and/or communicating device. Although these examples show clients 18 communicating with application servers 24 and/or repositories 20 over network 12, in other embodiments, some or all clients 18 could alternatively, or in addition, communicate with application server 24 and/or repositories 20 using direct links.

System 10 also includes one or more repositories 20 coupled to network 12 and capable of performing a desired communicating and/or computing functionality. In this particular embodiment, one or more repositories 20 include application logic adapted to identify a desired application 28. In various embodiments, repositories 20 may operate to identify a desired application 28 and to communicate application 28, or portions thereof, to one or more of application servers 24 for execution. In some cases, one or more repositories 20 may be capable of storing and/or having access to one or more applications 28.

In this particular embodiment, repository 20 accesses applications 28 stored in a database 22. As used throughout this document, the term "application" refers to functionality that is capable of facilitating the ability to collect information from and/or present information to one or more clients 18 or users of system 10. In one particular non-limiting example, application 28 comprises a series of queries requesting information from and/or presenting information to a user of client 18. In some cases, applications 28 may include, for example, a Voice XML-based application, an HTML-based application, an XML-based application, an XIVR-based application, or a combination of these or other application formats. Applications 28 may comprise, for example, software, firmware, code, portions of code, a program, a web-page, information compilations, and/or a combination of these or any other types of utilities. In other embodiments, database 22 may be capable of storing, for example, one or more functions and/or other information.

Database 22 may include any hardware, software, firmware, or combination thereof operable to store and facilitate retrieval of one or more applications 28 and/or information.

Database 22 may store information and applications 28 using any of a variety of information structures, arrangements, and/or compilations. In some embodiments, database 22 can also store a record of any interaction between a user of client 18 and system 10. Database 22 may, for example, include a dynamic random access memory (DRAM), a static random access memory (SRAM), a NAND flash memory, or any other suitable volatile or nonvolatile storage and retrieval device or combination of devices. Although this example depicts database 22 as a single medium, database 22 may comprise any additional number of storage media without departing from the scope of the present disclosure. Additionally, all or part of database 22 could reside locally within repository 20 or could reside in a location remote from and accessible to repository 20. Although these examples show repository 20 communicating with application servers 24 and/or clients 18 over network 12, in other embodiments, repository 20 could alternatively, or in addition, communicate with application server 24 and/or clients 18 using direct links.

In the illustrated embodiment, system 10 includes at least first communications links 30 and second communications links 32 operable to facilitate the communication of information to and/or from network 12. System 10 also includes a third communications link 34 operable to facilitate the communication of information between repositories 20 and database 22. Communications links 30, 32, and 34 may include any hardware, software, firmware, or combination thereof. In various embodiments, communications links 30, 32, and 34 may comprise communications media capable of assisting in the communication of analog and/or digital signals. Communications links 30, 32, and 34 may, for example, comprise a fiber optic line, a Digital Subscriber Line (DSL), a wireless link, a USB bus, a PCI bus, an ethernet interface, or any other suitable interface and/or medium operable to assist in the communication of information to and/or from network 12. In this particular embodiment, communication links 30, 32, and 34 comprise data connections. In this example, any data communicated between application servers 24 and clients 18 over communication links 30 and 32 is advantageously communicated asynchronously. Communicating the data asynchronously allows more than one user to connect to application servers 24 at the same time over a single data connection.

In this particular embodiment, communication link 32*a* is coupled to a wireless network 14 and communication link 32*n* is coupled to a wireline network 16. Although communication links 32*a* and 32*n* are coupled to wireless network 14 and wireline network 16, respectively, in this example, other embodiments may exclude wireless network 14 and/or wireline network 16 without departing from the scope of the present disclosure.

In some embodiments, clients 18 can be configured to initiate a connection with repositories 20 and/or application servers 24. In some cases, clients 18 can initiate a data connection with repositories 20 and/or application servers 24. For example, if client 18 is a mobile phone, a wireless connection can be processed through wireless network 14 to application server 24. After the client 18 connects to application server 24, application server 24 can initiate a preliminary communication session with the user of client 18. Through this initial communication session, information regarding the target address of client 18 can be established. Address information can be gathered automatically, for example by reading a unique identification number of the device, or by question and answer sequences with the user of device 18. Repository 20, database 22, and/or application server 24 can also store caller associated data, such as an IP address used to establish a data connection. In some cases, repository 20 and/or application server 24 can establish a data socket connection to communicate with client 18, or the repository 20 can notify the application server 24 to establish this connection with client 18. This connection can then be used for the duration of the communication session.

Landline phones and/or IP phones can also communicate with repository 20 and/or application server 24 in the same manner as mobile phones described above. Also, repository 20 and/or application server 24 may also use simultaneous or duplexed data connections with clients 18. This can allow repository 20 and/or application server 24 to simultaneously execute the initial communication session while also communicating over another data connection with client 18.

FIG. 1A is a block diagram of one example embodiment of communication system 10 that enables a client 18 to have one or more applications 28 executed remotely. In this particular embodiment, a user of client 18*a* initiates an information collection and/or retrieval process by communicating a request to application server 24. Although a user of client 18*a* initiates a communication session in this example with application server 24, any of clients 18*a*-18*n* could initiate the communication session with application server 24 and/or repository 20 without departing from the scope of the present disclosure. In other embodiments, a user of client 18*a* could initiate the information collection and/or retrieval process by connecting to repository 20. In some embodiments, one of applications server 24 and/or repository 20 could initiate the information collection process with client 18.

In this particular embodiment, client 18*a* comprises a thin-client. In this example, client 18*a* preferably has memory and some processing capabilities that enable client 18*a* to execute portions of code to assist with the interaction with remotely executed application 28. A remotely executed application is one in which a substantial portion of the code executes on a device other than client 18. In this example, application server 24 is addressed using an Internet Protocol (IP) layer address. In other embodiments, application server 24 could be addressed using any other addressing format, such as, for example, uniform resource locator (URL).

In this example, application server 24 notifies repository 20 that a communication session with client 18 has been requested. Repository 20 using its application logic operates to identify a desired application 28 and to communicate application 28, or portions thereof, to application server 24 for execution. Upon receipt of application 28, application server 24 executes application 28 and begins a communication session with client 18*a*. In this example, application server 24 begins the process of communicating information to and/or retrieving information from client 18*a*. In this particular embodiment, application server 24 executes a Voice XML-based application that enables application server 24 to interact with and collect information from client 18*a*. In other embodiments, the application executed by application server 24 may comprise, for example, an XIVR-based application, an HTML-based application, a VML-based application, or a combination of these or other application formats.

In this particular embodiment, application server 24 executes the Voice XML-based application 28 remote from client 18*a*. In this example, client 18*a* provides application independent processing services to Voice XML-based application 28 executing remotely. In some cases, application server 24 can communicate some programs to client 18*a* for downloading to assist application server 24 in interacting with client 18a. In most cases, any program downloaded to client 18a would assist with the collection of information from and/or the presentation of information to the user of client 18a. For example, application server 24 may communicate a voice recognition software program to client 18a for downloading, which will assist client 18a in executing one or more queries associated with the Voice XML-based application 28 being executed on application server 24.

Application server 24 interacts with the user of client 18a by requesting that the user of client 18a respond to a series of queries associated with application 28. To that end, application server 24 communicates information relating to portions of Voice XML-based code to client 18a for execution on client 18a, which enables the user of client 18a to interact with application server 24. In some embodiments, the user of client 18a can respond through a DTMF input, a voice input, a stylus input, a keyboard input, and/or any other device capable of receiving a response that is comprehensible to client 18a. In this particular embodiment, the user of client 18a responds to each of the series of queries by "speaking" a response to each query communicated to client 18a for execution. In this example, client 18a communicates the user's spoken response as a data communication. That is, the user's response is packetized and communicated in a packet based communication. By transmitting only data, problems associated with voice quality degradation are advantageously reduced.

In this particular embodiment, application server 24 receives and decodes the user's responses to each of the queries associated with the Voice XML-based application. Although application server 24 receives the responses to the queries in this example, repository 20 and/or database 22 could alternatively receive the responses without departing from the scope of the present disclosure. Upon receipt, application server 24 executes the next portion of Voice XML-based application 28 based at least in part on the user's response. Application server 24 will continue to interact with client 18a until the communication session is terminated. In this example, the user of client 18a interacts with application server 24 until the remaining information has been collected and/or presented to the user of client 18a. In other embodiments, application server 24 can associate the user of client 18a with another one of application servers 24 to collect another portion of information from and/or present another portion of information to the user of client 18a using, for example, another application 28.

In some embodiments, after the communication session between client 18a and application server 24 is terminated, any programs downloaded to client 18a could be deleted to free up the memory. In other embodiments, any programs downloaded to client 18a could be retained for use with a future request. Although the program is downloaded to client 18a in this example, in alternative examples the program may be pre-installed in client 18a without departing from the scope of the present disclosure. For example, a user may anticipate using client 18a for buying and selling stocks in real-time and may pre-install a program or interface for performing the necessary communication and/or computing functionality.

In yet another embodiment, client 18a could use an Internet browser to host one or more plug-ins that facilitates the processing of commands from the user or the device. In one embodiment, application servers 24 could host the application logic in an enhanced HTML format. A browser utilized by client 18 could read the logic and execute it. The internet browser could be used as an interface to input user information to application 28, and/or present information from application 28 executed on application server 24.

In yet another embodiment, application server 24 and/or repository 20 could package multiple queries or requests together and send them to client 18a in an executable for interaction with the user. In that embodiment, client 18a executes multiple queries or requests for information before communicating the user's responses to application server 24. When the multiple questions or requests are complete, the responses are sent to the application server 24 for processing, which could result in information being sent back to the user or further requests from the application server 24. The process can be repeated as necessary. In this example, the entire application 28 is not communicated sent to client 18, thus reducing the memory and processing power needed within the device.

Figure 1B:
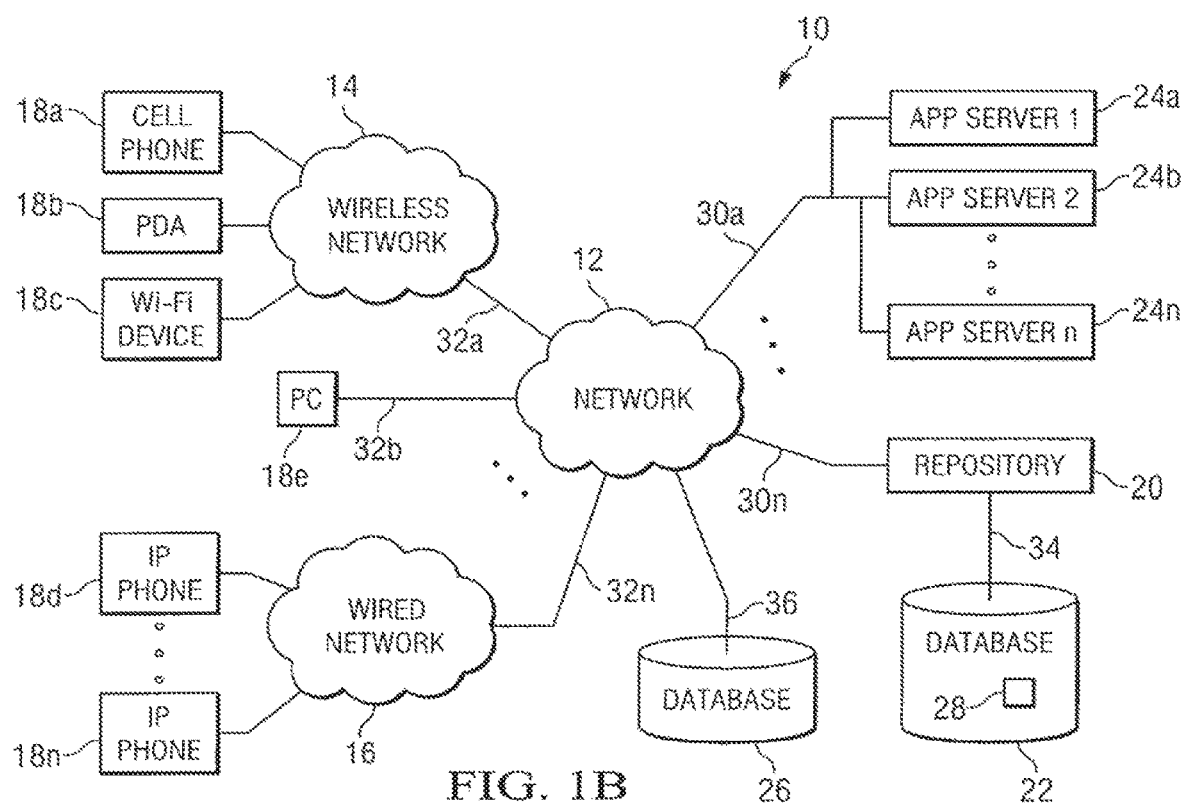

FIG. 1B is a block diagram of one example embodiment of communication system 10 that enables a client 18 to have one or more applications 28 executed remotely. FIG. 1B is similar to FIG. 1A; however, in this particular embodiment, system 10 includes a plurality of application servers 24a-24n coupled to network 12. Coupling multiple application servers 24 to system 10 advantageously allows system 10 to handle a larger number of simultaneous requests from users of clients 18a-18n.

In an alternative embodiment, system 10 could include a load balancer (not illustrated) that is coupled to network 12 and application servers 24a-24n. In that example, the load balancer can comprise logic that enables it to decide which application server 24a-24n can support a particular request or application 28. In some cases, the load balancer can perform a round-robin assignment. In other cases, the load balancer can choose a particular application server 24 based on dynamic information. For example, the load balancer could choose application server 24b since it just handled a similar request and already has the desired application downloaded.

In this example, system 10 also includes a database 26 coupled to network 12 by data connection 36. In various embodiments, the structure and function of database 26 can be substantially similar to the structure and function of database 22. Database 26 can contain a variety of information accessible through network 12. In some cases, database 26 can include user-specific information that can be retrieved by clients 18 or by application server 24, such as account information, credit information, medical information, insurance information, and/or any user-related information. In other cases, database 26 may include nonuser specific information that can be retrieved by clients 18 or application server 24, such as airline flight information, order status information, movie information, and/or any nonuser specific information.

In another alternative embodiment, system 10 could comprise a plurality of repositories 20 connected to a single database 22, or connected to multiple databases 22. In that embodiment, each of the plurality of repositories 20 could be coupled to a load balancer capable of balancing traffic between the plurality of repositories 20. The repositories could be assigned to perform different tasks, or they could perform tasks based on the order they are requested or based on any other allocation system.

In this example, a user of client 18b desires to check the balance of his bank account. Although the user of client 18b desires to check the balance in his bank account in this example, the user could use system 10 to retrieve and/or communicate any information without departing from the scope of the present disclosure. In this particular embodiment, client 18*b* is a thin-client device. Although client 18*b* is used in this example, any other of clients 18*a*-18*n* could be used without departing from the scope of the present disclosure.

Using client 18*b* the user initiates a communication session with application server 24*a* by communicating a request through network 12. In this embodiment, client 18*b* communicates with application server 24*a* over a data connection. Application server 24*a* notifies repository 20 of the request and repository 20 communicates with database 22 to retrieve application 28 that will assist the user of client 18*b* in performing the desired functionality. In some cases, database 22 may retrieve any information about the user maintained in database 22. In this particular embodiment, repository 22 identifies that client 18*b* is adapted to provide processing services for application 28 that will execute remote from client 18*b*. After receiving application 28 from database 22, repository 20 communicates application 28 and any user information to application server 24*a* for execution.

Application server 24*a* executes application 28 and initiates its communication session with client 18*b*. While the application server 24*a* executes application 28, client 18*b* is capable of locally executing commands related to application 28 and delivered via the data connection. By executing these commands, client 18*b* enables information to be communicated to the user, to be retrieved from the user, to be presented to the user, and to perform any other desired communicating and/or computing functionality with the user. In some cases, the locally executed commands enable client 18*b* to retrieve information from database 26. That is, the locally executed commands received from application server 24*a* direct client 18*b* to access database 26*b* and retrieve the desired information. In other cases, the locally executed commands enable client 18*b* to communicate any information provided by the user of client 18*b* to database 26 for storage.

To check a bank account balance, application 28 executing on application server 24*a* may send a first executable to client 18*b* for execution. This first executable may contain information relating to a portion of Voice XML code that requests the user to enter or speak an account number. Client 18*b* executes the executable by prompting the user to enter an account number. In some cases, client 18*b* can execute voice recognition software, text-to-speech software, and/or any other desired software that would assist with the collection of information from and/or the presentation of information to the user of client 18*b*. In this particular embodiment, the user of 18*b* enters the account number using a keypad. Although the user enters the account number using a keypad in this example, any other method may be used to enter the desired information without departing from the scope of the present disclosure. After the user enters the account number, client 18*b* communicates the information to application server 24*a* over the data communication link.

Upon receipt of the account number, application server 24*a* continues the execution of application 28. In this example, application 28 directs application server 24*a* to retrieve the account balance for the account number provided by the user of client 18*b* from database 22. In other embodiments, the account balance information may be received by application server 24*a* with receipt of application 28. In some cases, application server 24*a* may compare the account number received from the user of client 18*b* with the account number retrieved from database 22 for fraud protection purposes.

Once application server 24*a* has the account balance information, application server 24*a* can communicate an executable that contains the account balance information to client 18*b* for local execution. In some cases, the account balance could be sent as a data message for the user to view on a display associated with client 18*b* or the application server 24*a* could package a voice representation of the account balance as an executable, and transmit the executable to client 18*b*. In that case, client 18*b* would execute the executable, converting the data to voice, and the user hears his account balance from client 18*b*.

In the above embodiment, application server 24 retrieves information directly from database 22. In an alternative embodiment, application server 24 can send an executable to client 18*b* instructing client 18*b* to retrieve the desired information from database 22 and/or database 26, either directly or through a network connection. The executable can also instruct device 18 to send information to database 22 and/or 26. In various embodiments, database 22 and/or 26 can comprise user-specific information. For example, database 26 may include account information, credit information, medical information, and/or any other information of the user of client 18*b*. In other embodiments, database 22 and/or 26 can comprise generally available information. For example, database 26 can include airline flight information, stock quotes, weather information, sports ticket information, movie information, and/or any other desired information.

In some cases, the information retrieved by client 18*b* can be processed by client 18*b* using an executable received from application server 24*a*. In other cases, the information retrieved by client 18*b* can be processed by one or more software modules that assist with the collection of information from and/or the presentation of information to the user of client 18*b*. In other embodiments, the data sought by client 18*b* can be communicated to client 18*b* through application server 24*a*.

As an example, a user may want to check on the status of an airline flight. Client 18*d* connects to application server 24*b*, which requests the appropriate application 28 from repository 20. Application 28 is executed on application server 24*b*. Application 28 sends an executable from application server 24*b* to client 18*d* that instructs client 18*d* to retrieve the flight information from database 26, which in this example contains flight status information. Client 18*d* initiates a connection to database 26 through network 12 to retrieve the information. The information can be sent back through network 12 to client 18*d*. In this example, the executable then instructs client 18*d* to present the flight status information to the user using one of a variety of methods, such as by text or voice. The user can then end the connection, or continue with other business.

In another embodiment, the executable could instruct client 18*d* to retrieve the information from database 26, but instead of processing the information at client 18*d* for presentation to the user, the information could be sent through network 12 to application server 24*b* for further processing. Application server 24*b*, for example, may convert the data concerning the flight status into an easily-readable text format, and then transmit that information to client 18*d* for presentation to the user.

Figure 1C:
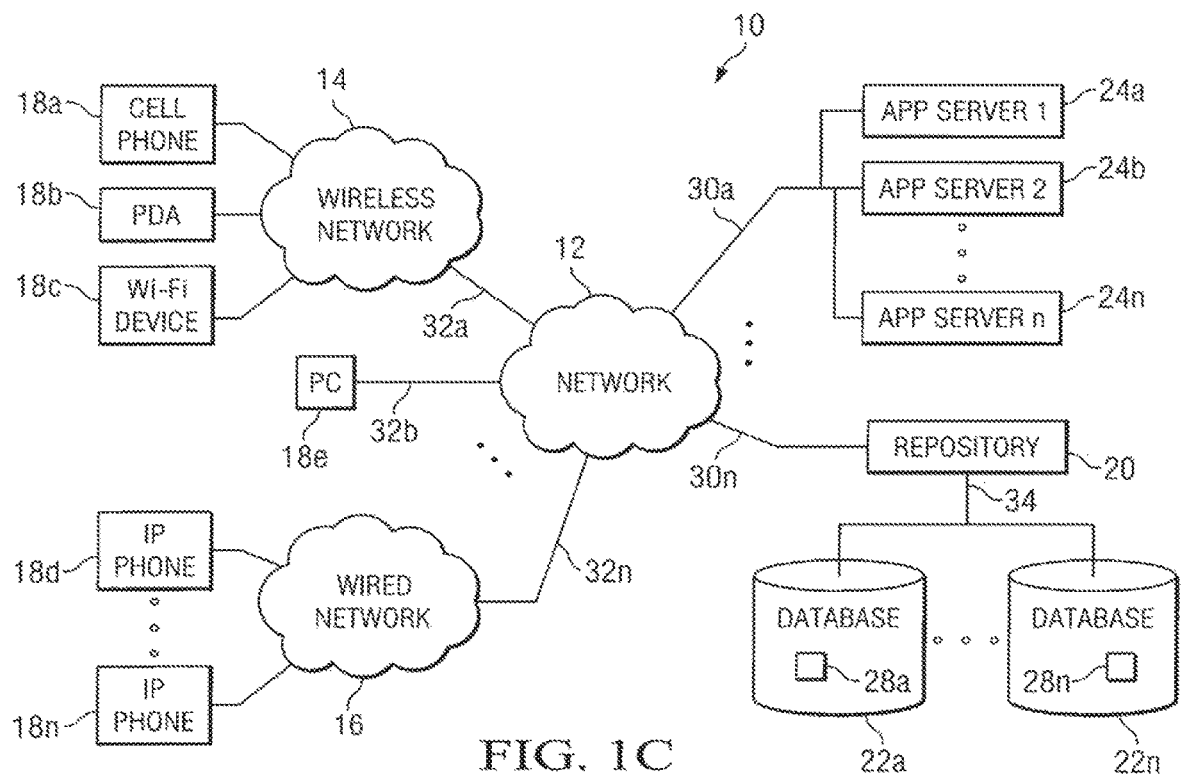

FIG. 1C is a block diagram of one example embodiment of communication system 10 that enables a client 18 to have one or more applications 28 executed remotely. FIG. 1C is similar to FIG. 1B; however, in this particular embodiment, system 10 includes a plurality of databases 22*a*-22*n* coupled to repository 20. Although a plurality of databases 22 are coupled to repository 20 in this example, system 10 could comprise a plurality of repositories 20 each including one or more databases 22 without departing from the scope of the present disclosure.

Figure 1D:
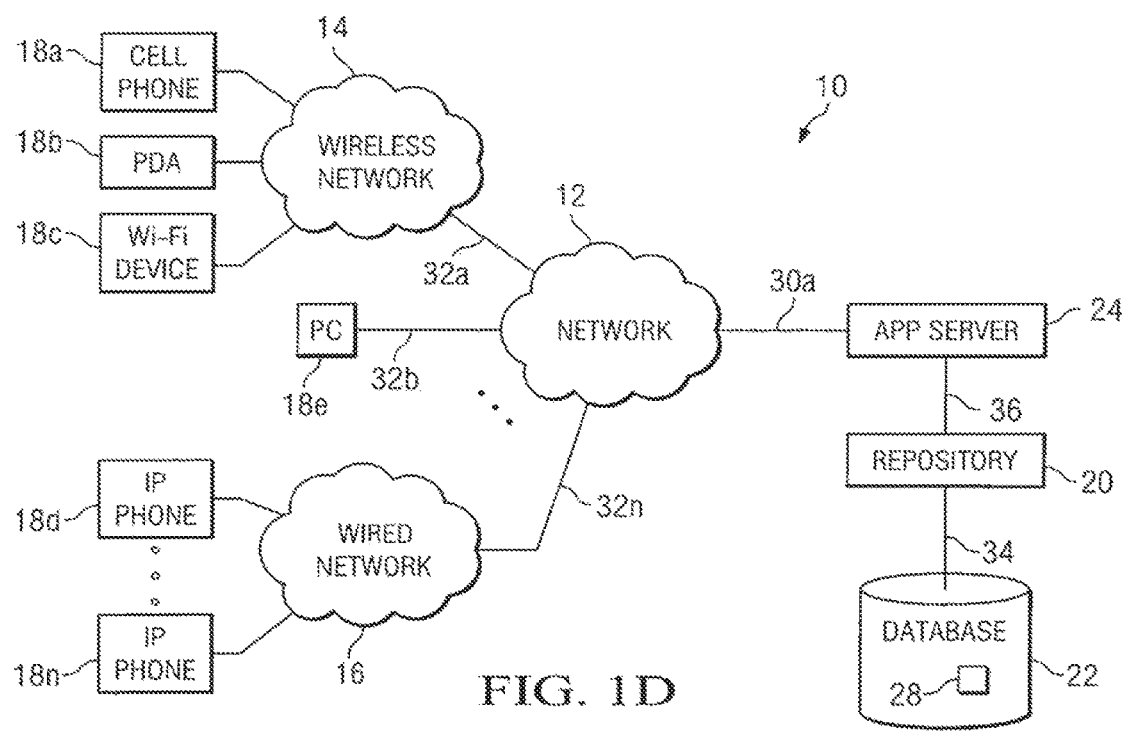

FIG. 1D is a block diagram of one example embodiment of communication system 10 that enables a client 18 to have an application 28 executed remotely. FIG. 1D is similar to FIG. 1A; however, in this particular embodiment, system 10 includes a direct communication link 36 between repository 20 and application server 24. Although one cluster that includes application server 24, repository 20, and database 22 is coupled to network 12 in this example, system 10 could comprise a plurality of clusters coupled to network 12 without departing from the scope of the present disclosure.

Figure 2:
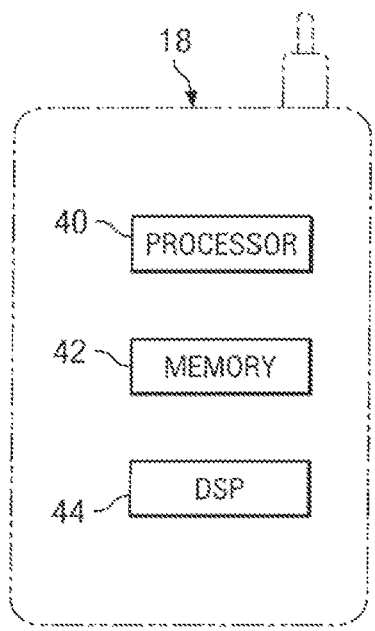
FIG. 2 illustrates one example of a client for use with a communication system that enables a client to have one or more applications executed remotely.

FIG. 2 illustrates one example embodiment of a client 18. In this particular embodiment, client 18 comprises a mobile telephone. Although client 18 comprises a mobile phone in this example, client 18 could comprise any other desired computing and/or communication device without departing from the scope of the present disclosure. For example, client 18 could comprise a voice over IP device, a desktop computer, a laptop computer, a personal digital assistant, a cell-phone, a Wi-Fi device, a workstation, a mainframe computer, a mini-frame computer, a web server, or any other computing and/or communicating device. In this particular embodiment, client 18 comprises a thin-client device that provides processing services to application 28 executing remotely from client 18.

In this example, client 18 comprises a processor 40, memory 42, and digital signal processor (DSP) 44. Client 18 also includes at least a display, input device, and speaker. Many communication devices already have processors and memory operable to interact with a communication system. Devices that use application server 24 to execute one or more executables associated with one or more applications 28, as described above, require less processing power and memory than a device that executes substantially all of applications 28.

Memory 42 provides storage for data, information, and/or programs to assist in communicating information to and/or receive information from application server 24 and/or the repository 20. The memory in the example embodiments is sufficient to handle the tasks that application servers 24 and/or repository 20 request of the device. Processing power also is sufficient to handle these, as well as the other tasks the device performs outside the context of the data collection system (such as making phone calls, sending and receiving text messages, other computing functions, etc.).

Figure 3:
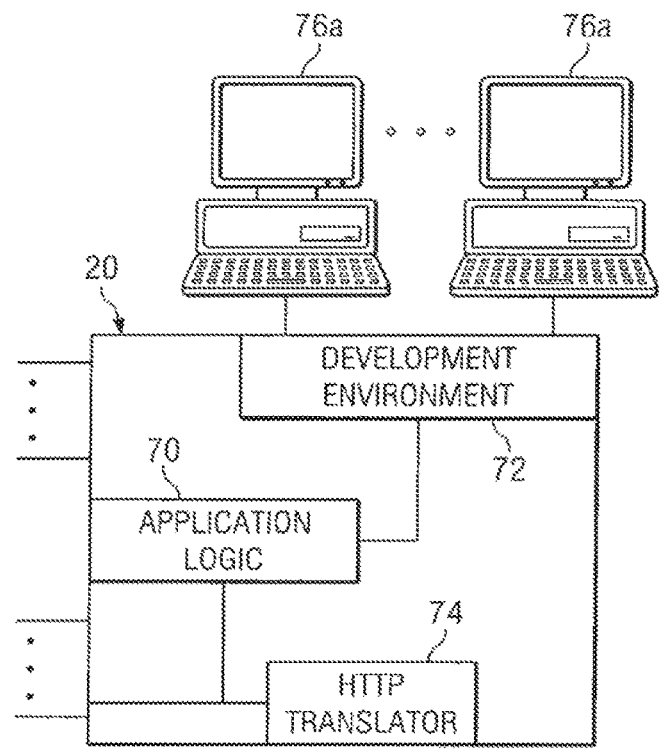
FIG. 3 illustrates one example embodiment of a repository for use in a communication system that that enables a client to have one or more applications executed remotely.

FIG. 3 shows one example of a repository for use in a communication system that enables a client to have one or more applications executed remotely. In this particular embodiment, repository 20 functions to communicate one or more applications and/or discrete programs to external devices, like application servers 24 and/or clients 18 of FIG. 1, for processing or execution.

In this example, repository 20 includes application logic 70 that is capable of performing a desired communicating and/or computing functionality, such as, for example, identifying a desired application and communicating the application, or portions thereof, to one or more of application servers for execution. In particular embodiments, application logic 70 may include one or more software and/or firmware modules, such as, for example, one or more software engines and/or one or more memory modules. Although application logic 70 is shown as being contained within repository 20 in this example, application logic could reside external to repository 20 without departing from the scope of the present disclosure.

In one particular example, application logic has access to one or more applications stored in a memory coupled to application logic 70. IN some cases, the memory can be substantially similar to the structure and function of database 22 of FIG. 1. In some cases, the one or more applications may include, for example, a Voice XML-based application, an HTML-based application, an XML-based application, an XIVR-based application, or a combination of these or other application formats.

In this particular example, repository 20 communicates an executable copy of a desired application to one or more application servers 24 for execution and establishment of a communication session with client 18. In various embodiments, the applications can be developed with development environment 72 through computer workstations 76*a*-76*n*. The applications can be programmed in proprietary languages requiring resident interpreters or compilers, or can use an extensible language, which can be transferable to a host processor (such as application servers 24) with the components used to run the given application. Languages such as hypertext markup language (HTML), extensible markup language (XML), Voice XML, and the like may be utilized in providing the extensibility to program applications for use with the present system.

Repository 20 may also facilitate browsing the Internet from a compatible client 18. In order to accomplish this, repository 20 includes an HTTP translator 74. Repository 20 can browse through the Internet, read the HTML web pages, and convert the HTML into a compatible format for communication to a user of client 18. Repository 20 can also direct application server 24 to perform these actions instead. The HTTP can then be converted into the appropriate transport protocol and the web pages, or portions thereof, can be sent to the client 18 by application server 24. In certain embodiments, the translation executed by HTTP translator 74 can convert text-to-speech and note hyperlinks as special cues to inform users of the executable links available. Additionally, or alternatively, portions of the web site may be visually presented as text or graphics on a display associated with client 18. These conversion components can be included in the application processed by application server 24, or, if small enough, can be sent to client 18 and executed there.

Figure 4:
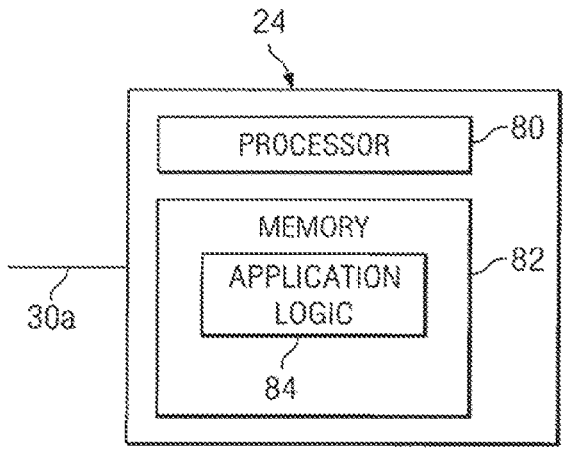
FIG. 4 illustrates one example embodiment of an application server for use in a communication system that that enables a client to have one or more applications executed remotely.

FIG. 4 shows one example of an application server for use in a communication system that that enables a client to have one or more applications executed remotely. In this example, application server 24 is capable of performing a desired communicating and/or computing functionality, such as, for example, accessing, retrieving, and/or executing one or more system applications, or portions thereof. As non-limiting examples, application server 24 could comprise some or all of a Voice XML-based system, an extensible interactive voice response (XIVR) system, an interactive web-based system, or a combination of these or other information systems. In particular embodiments, application server 24 may include one or more software and/or firmware modules. In various embodiments, application server 24 could comprise, for example, one or more software engines, one or more memory modules, and/or one or more speech recognition modules capable of processing Voice XML-based applications, XIVR-based applications, voice responses, text-to-speech translations, and/or speech-to-text translations.

In this particular embodiment, application server 24 includes a processor 80 and memory 82. Although application server 24 includes processor 80 and memory 82 in this example, any other desired computing and/or communication components may be included without departing from the scope of the present disclosure. In this example, processor 80 is capable of processing one or more requests received from a client and executing one or more applications. Processor 80 can comprise any computer processor, such a, for example, single-core, duel-core, and/or any other server processor that is capable of processing requests and executing applications.

In this example, memory 82 provides storage for data, information, and/or other programs to assist in the operation of application server 24. Memory 82 may include any hardware, software, firmware, or combination thereof operable to store and facilitate retrieval of one or more applications and/or information. Memory 82 may, for example, include a dynamic random access memory (DRAM), a static random access memory (SRAM), a NAND flash memory, or any other suitable volatile or nonvolatile storage and retrieval device or combination of devices. Although this example depicts memory 82 as a single medium, memory 82 may comprise any additional number of storage media without departing from the scope of the present disclosure. Additionally, all or part of memory 82 could reside at a location remote from and accessible to application server 24.

In this particular embodiment, memory 82 includes application logic 84 that is capable of processing a request received from a client and to determine the location of the application necessary to establish the requested communication session with the user of the client. Application logic 84 may comprise, for example, software, firmware, code, portions of code, a program, a web-page, information compilations, and/or a combination of these or any other types of utilities.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A communication device associated with a communication device IP address configured to communicate with an application server associated with at least one of an application server URL and an application server IP address, the application server residing at a location remote from the communication device, comprising:
    a speaker;
    an input device;
    one or more processors; and
    a memory having stored thereon one or more software programs that, when executed by the one or more processors, causes the communication device to:
    recognize at least one word spoken by a user;
    capture a voice input from the user via the input device;
    generate packetized voice data by packetizing at least a part of the voice input;
    transmit one or more first requests over a first communication link to the application server; wherein the first communication link comprises an asynchronous connection to the Internet; wherein the first communication link comprises at least one data socket connection; wherein the one or more first requests includes the communication device IP address, the application server URL or the application server IP address, and the packetized voice data; wherein the packetized voice data is used to identify an application; wherein the application server is configured to cause execution of the application; wherein information is derived by the execution of the application; wherein a packetized voice representation of at least a part of the information is created; wherein the application server is configured to communicate one or more second requests to the communication device; and wherein the one or more second requests comprise at least one computer code instruction and the packetized voice representation;
    receive the one or more second requests from the application server over the first communication link;
    execute the at least one computer code instruction to cause the packetized voice representation to be converted to audio for presentation to the user via the speaker;
    present the voice representation to the user via the speaker; and
    wherein the communication device does not include an internet browser or voice XML browser.

2. The communication device of claim 1, wherein the packetized voice data is processed by at least one of a speech-to-text application and a voice recognition application to identify the application.

3. The communication device of claim 2, wherein the voice representation comprises a query for information from the user; and wherein the communication device captures a second voice input from the user via the input device in response to the query.

4. The communication device of claim 2, wherein the application server is configured to cause execution of the application by sending one or more third requests over a second communication link to a second application server that executes the application; and wherein the second communication link comprises at least one data socket connection.

5. The communication device of claim 4, wherein the communication device further comprises a touchscreen.

6. The communication device of claim 4, wherein the application server comprises a plurality of servers and the second application server comprises a plurality of servers.

7. The communication device of claim 4, wherein a database maintains a record of the communication session; wherein the record comprises user-specific information; and wherein the user-specific information comprises the packetized voice data.

8. The communication device of claim 4, wherein the second application server receives the application from a repository over a third communication link.

9. A communication device associated with a communication device IP address configured to communicate with an application server associated with at least one of an application server URL and an application server IP address, the application server residing at a location remote from the communication device, comprising:
    a speaker;
    an input device;
    one or more processors;
    a display; and
    a memory having stored thereon one or more software programs that, when executed by the one or more processors, causes the communication device to:
    recognize at least one word spoken by a user;
    capture a voice input from the user via the input device;
    generate packetized voice data by packetizing at least a part of the voice input;
    transmit one or more first requests over a first communication link to the application server; wherein the first communication link comprises an asynchronous connection to the Internet; wherein the first communication link comprises at least one data socket connection; wherein the one or more first requests includes the communication device IP address, the application server URL or the application server IP address, and the packetized voice data; wherein the packetized voice data is used to identify an application; wherein the application server is configured to cause execution of the application; wherein information is derived by the execution of the application; wherein the application server is configured to communicate one or more second requests to the communication device; and wherein the one or more second requests comprise at least one computer code instruction and at least part of the information;

receive the one or more second requests from the application server over the first communication link;

execute the at least one computer code instruction to cause the communication device to present the at least a part of the information to the user via the display; and wherein the communication device does not include an internet browser or voice XML browser.

10. The communication device of claim 9, wherein the packetized voice data is processed by at least one of a speech-to-text application and a voice recognition application to identify the application.

11. The communication device of claim 10, wherein the application server is configured to cause execution of the application by sending one or more third requests over a second communication link to a second application server that executes the application; and wherein the second communication link comprises at least one data socket connection.

12. The communication device of claim 10, wherein a database maintains a record of the communication session; wherein the record comprises user-specific information; and wherein the user-specific information comprises the packetized voice data.

13. The communication device of claim 10, wherein the at least one computer code instruction is an executable.

14. The communication device of claim 10, wherein the application server comprises a plurality of servers and the second application server comprises a plurality of servers.

15. The communication device of claim 11, wherein the second application server receives the application from a repository over a third communication link.

16. A communication device associated with a communication device IP address configured to communicate with an application server associated with at least one of an application server URL and an application server IP address, the application server residing at a location remote from the communication device, comprising:

a speaker;
an input device;
one or more processors; and
a memory having stored thereon one or more software programs that, when executed by the one or more processors, causes the communication device to:
recognize at least one word spoken by a user;
capture a voice input from the user via the input device;
generate packetized voice data by packetizing at least a part of the voice input;
transmit one or more first requests over a first communication link to the application server; wherein the first communication link comprises an asynchronous connection to the Internet; wherein the first communication link comprises at least one data socket connection; wherein the one or more first requests includes the communication device IP address, the application server URL or the application server IP address, and the packetized voice data; wherein the packetized voice data is used to identify an application; wherein the application server is configured to cause execution of the application; wherein information is derived by the execution of the application, the information being used to create one or more second requests to the communication device; wherein the application server is configured to communicate the one or more second requests to the communication device; and wherein the one or more second requests comprise at least one computer code instruction to the communication device to retrieve content from a source located remote from the communication device;

receive the one or more second requests from the application server over the first communication link;

request the content from the source located remote from the communication device;

present, via the speaker, an audio output corresponding to the content from the source located remote from the communication device; and wherein the communication device does not include an internet browser or voice XML browser.

17. The communication device of claim 16, wherein the packetized voice data is processed by at least one of a speech-to-text application and a voice recognition application to identify the application.

18. The communication device of claim 17, wherein a database maintains a record of the communication session; wherein the record comprises user-specific information; and wherein the user-specific information comprises the packetized voice data.

19. The communication device of claim 17, wherein the content comprises audio.

20. The communication device of claim 17, wherein the content from the source located remote from the communication device is retrieved via a third communication link comprising at least one data socket connection.

21. The communication device of claim 17, wherein the application server is configured to cause execution of the application by sending one or more third requests over a second communication link to a second application server that executes the application; and wherein the second communication link comprises at least one data socket connection.

22. The communication device of claim 21, wherein the application server comprises a plurality of servers and the second application server comprises a plurality of servers.

23. The communication device of claim 22, further comprising a touchscreen.

24. The communication device of claim 23, wherein the content comprises video.

25. The communication device of claim 21, wherein the second application server receives the application from a repository over a third communication link.

26. The communication device of claim 2, wherein the packetized voice is translated to a text representation which is utilized to identify the application.

27. The communication device of claim 10, wherein the packetized voice is translated to a text representation which is utilized to identify the application.

28. The communication device of claim 17, wherein the packetized voice is translated to a text representation which is utilized to identify the application.

\* \* \* \* \*